United States Patent [19]

Moore et al.

[11] Patent Number: 5,784,584
[45] Date of Patent: Jul. 21, 1998

[54] HIGH PERFORMANCE MICROPROCESSOR USING INSTRUCTIONS THAT OPERATE WITHIN INSTRUCTION GROUPS

[75] Inventors: Charles H. Moore, Woodside; Russell H. Fish, III, Mt. View, both of Calif.

[73] Assignee: Patriot Scientific Corporation, San Diego, Calif.

[21] Appl. No.: 484,935

[22] Filed: Jun. 7, 1995

Related U.S. Application Data

[62] Division of Ser. No. 389,334, Aug. 3, 1989, Pat. No. 5,440,749.
[51] Int. Cl.⁶ .................................................. G06F 9/30
[52] U.S. Cl. ............................................................ 395/376
[58] Field of Search .................................. 395/376, 382, 395/384, 588, 800.23

[56] References Cited

U.S. PATENT DOCUMENTS 4,967,326  10/1990  May ......................................... 395/800
5,127,091  6/1992  Bonfaral et al. ....................... 395/375

Primary Examiner—David Y. Eng
Attorney, Agent, or Firm—Cooley Godward LLP

[57] ABSTRACT

A high-performance microprocessor system using instruction that access operands and instructions located relative to the current instruction group rather than located relative to the current instructions, as is the convention, is disclosed herein. The microprocessor system includes a central processing unit, memory, and a bus connecting the central processing unit and memory. An instruction fetching unit, connected to the bus, is provided for fetching instruction groups from the memory for use by the central processing unit and for storage within an instruction register. An instruction supplying unit operates to supply, in succession from the instruction register to the central processing unit, one or more instructions from each of the instruction groups. The system further includes an instruction decoder for configuring the instruction supplying unit to select, from the instruction register, operands associated with instructions from particular instruction groups.

29 Claims, 19 Drawing Sheets

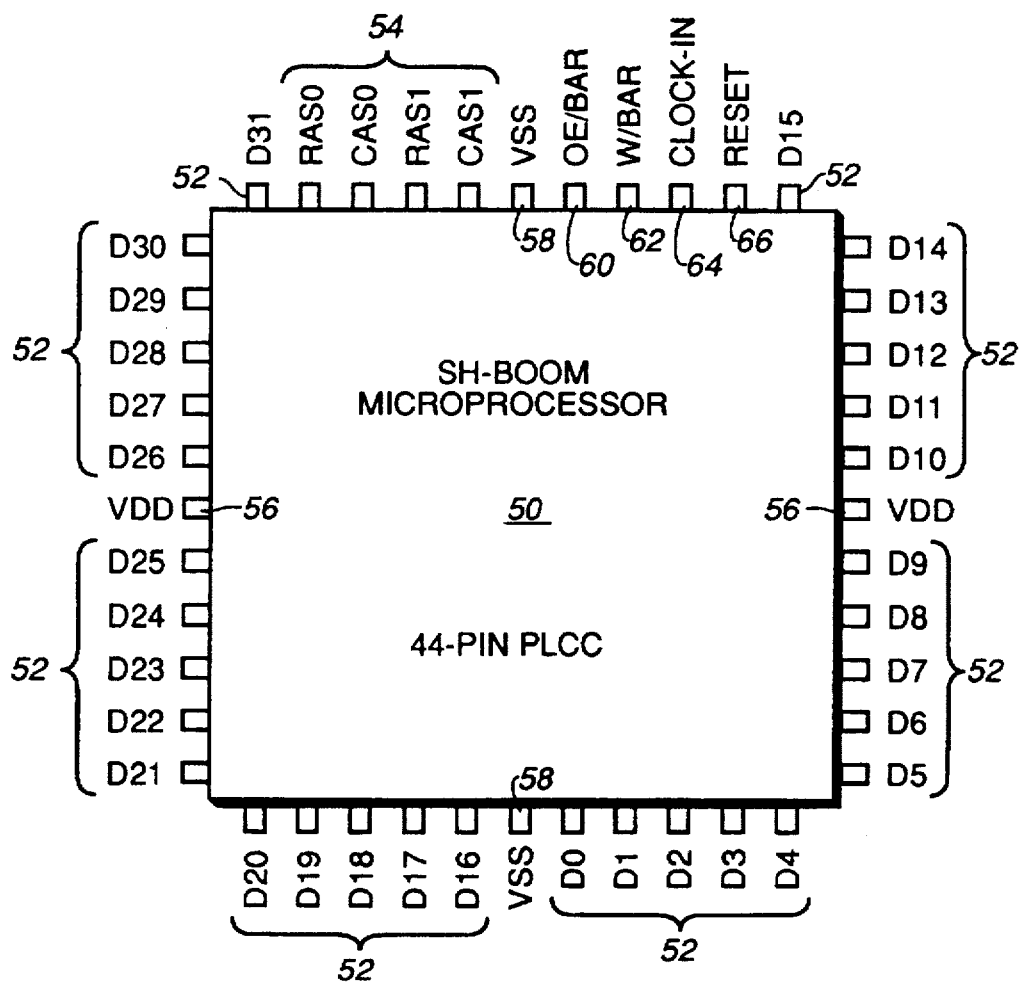
FIG._1

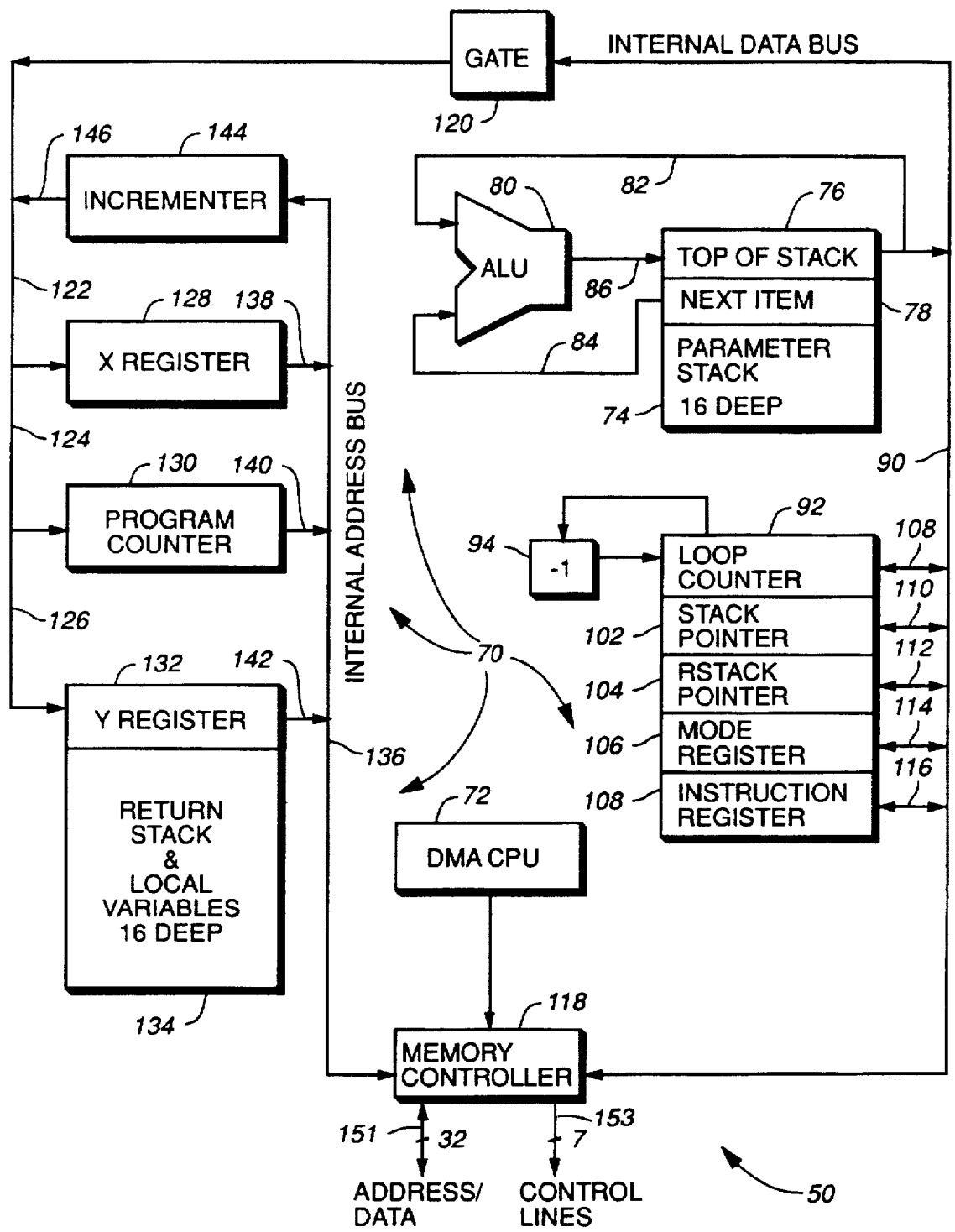
FIG._2

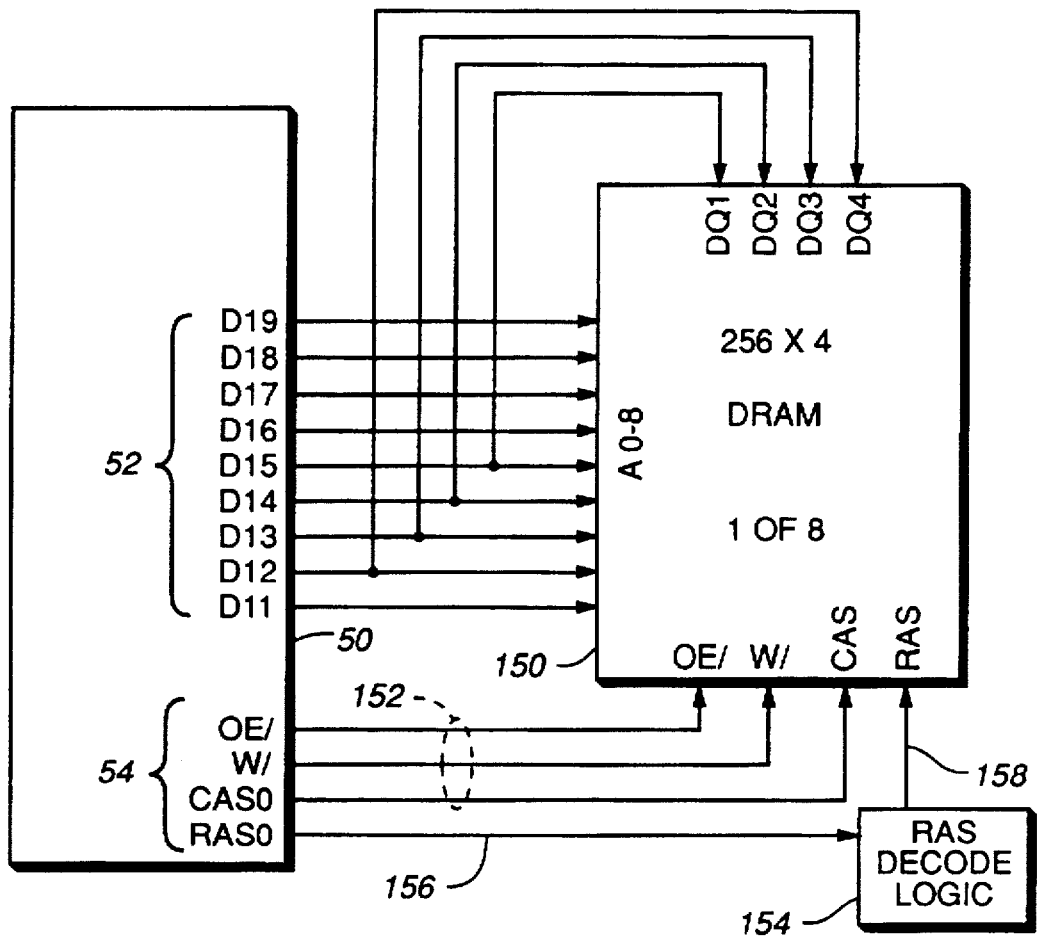
FIG._3

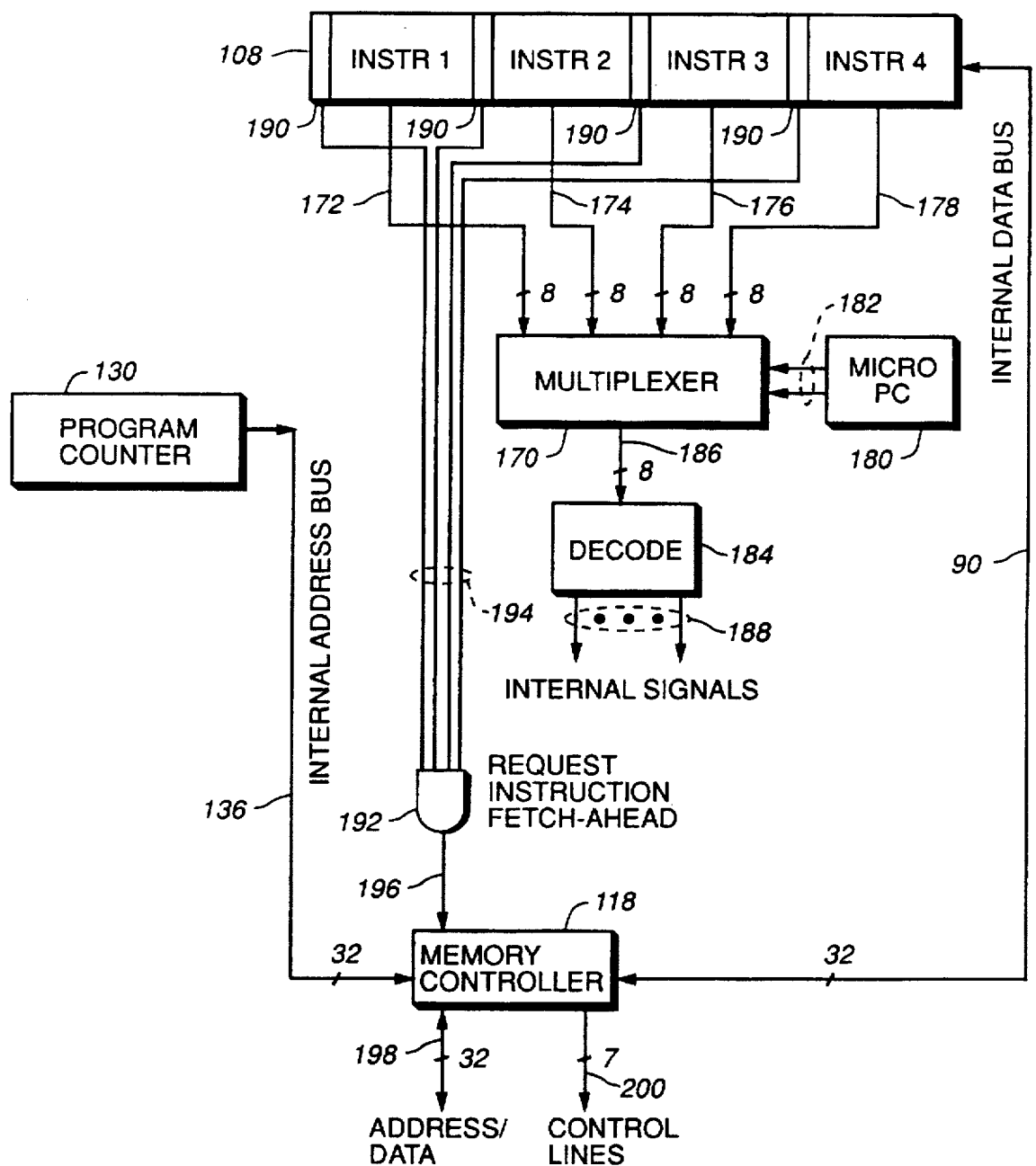
FIG._4

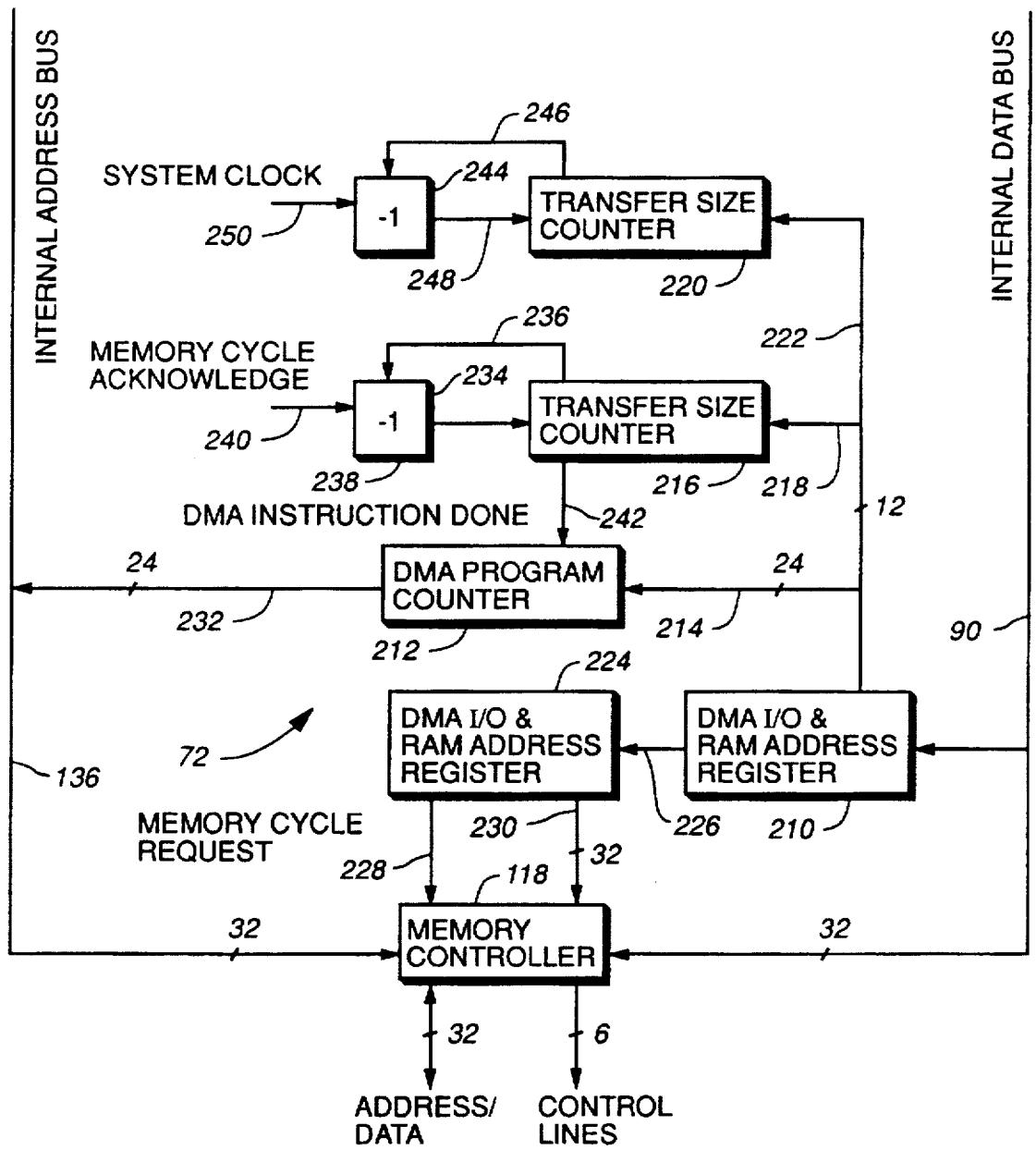
FIG._5

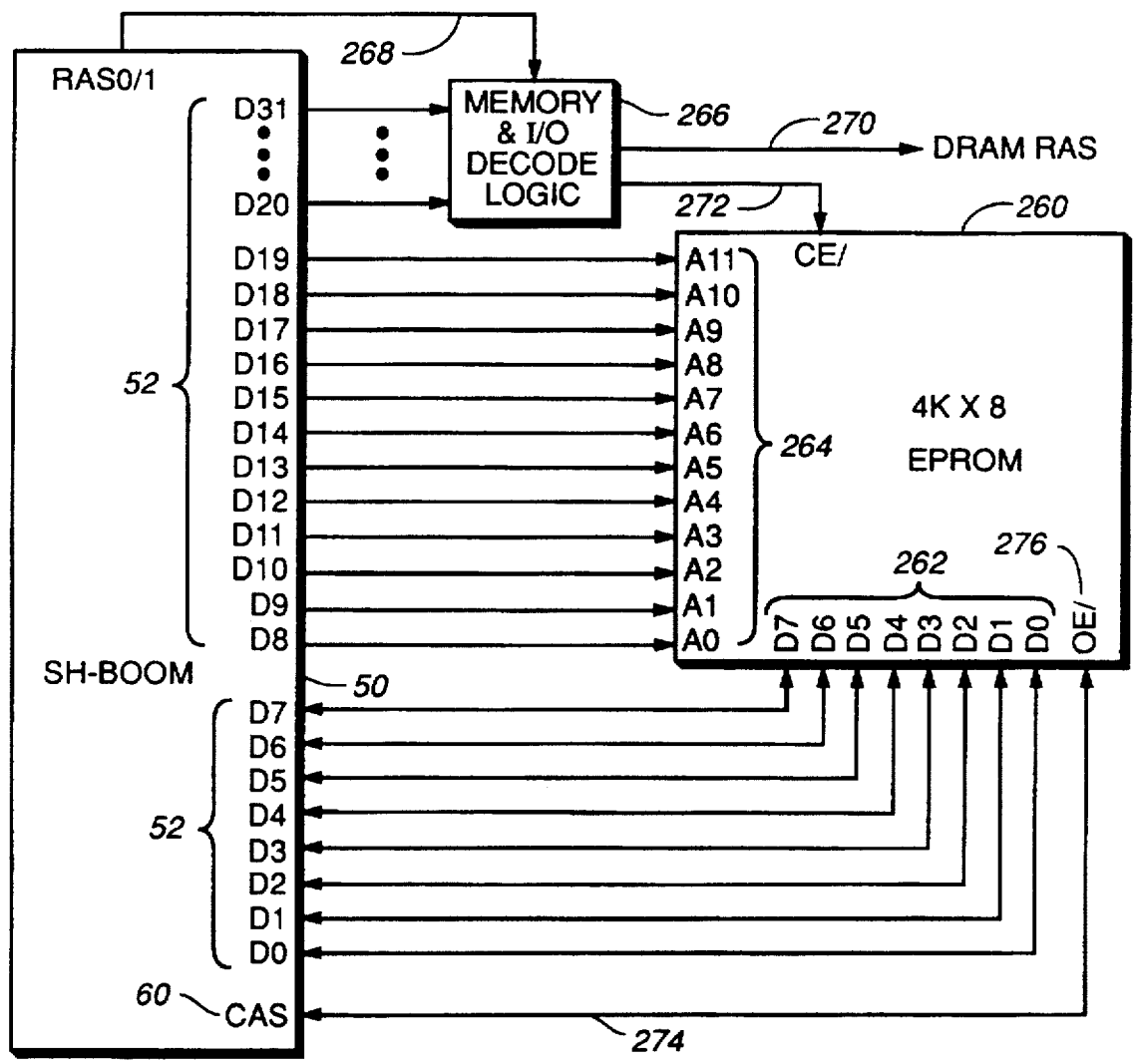
FIG._6

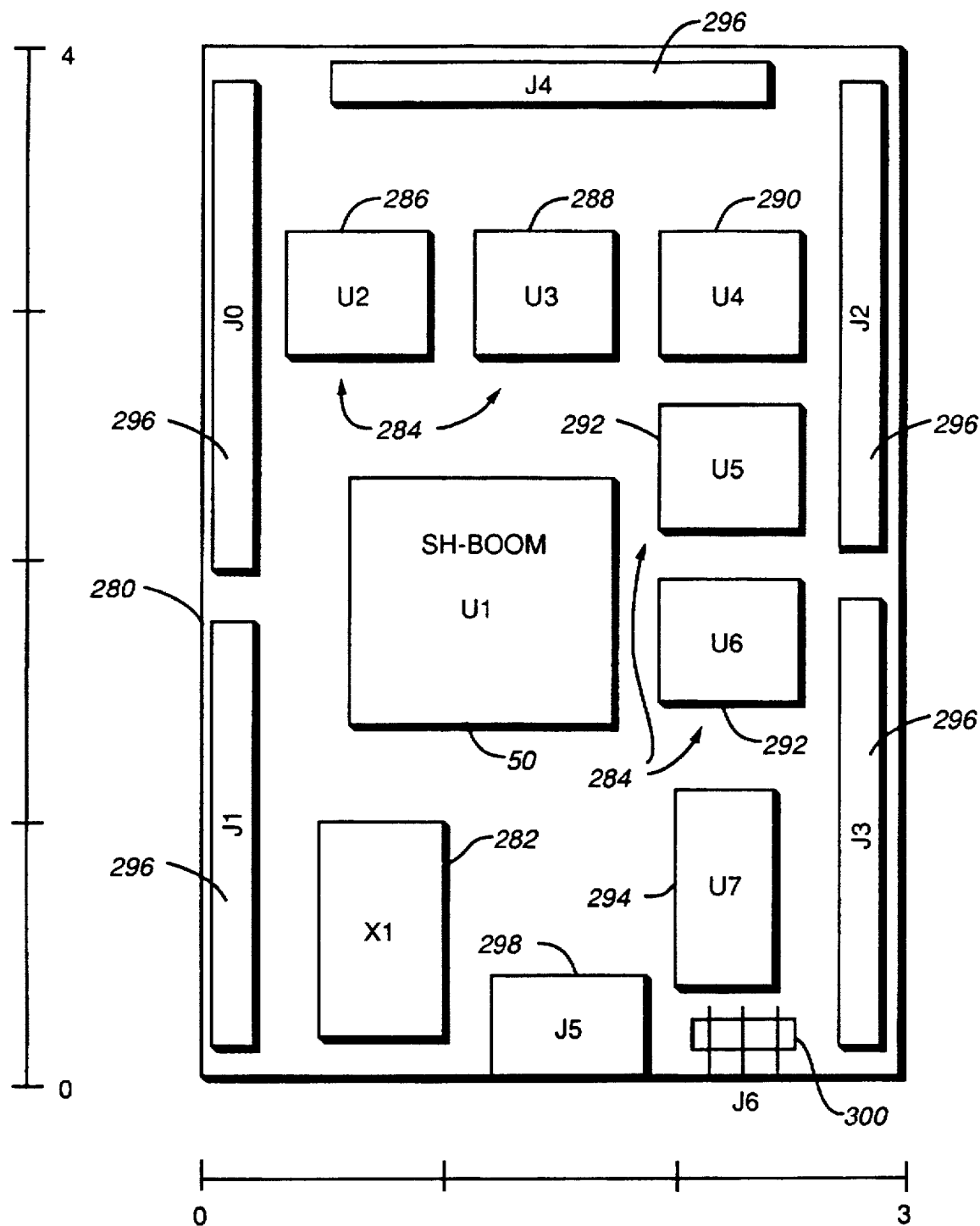
FIG._7

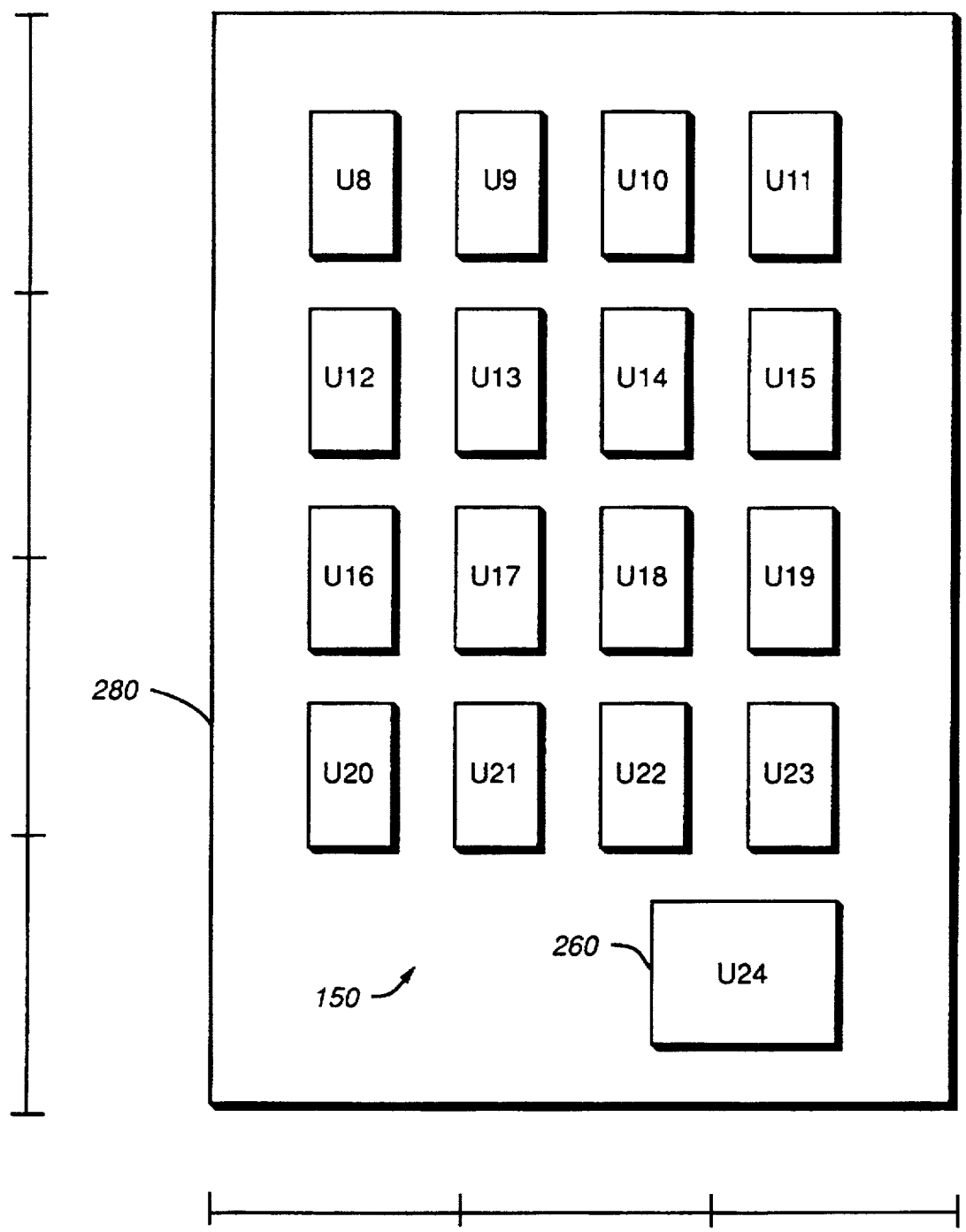
FIG._8

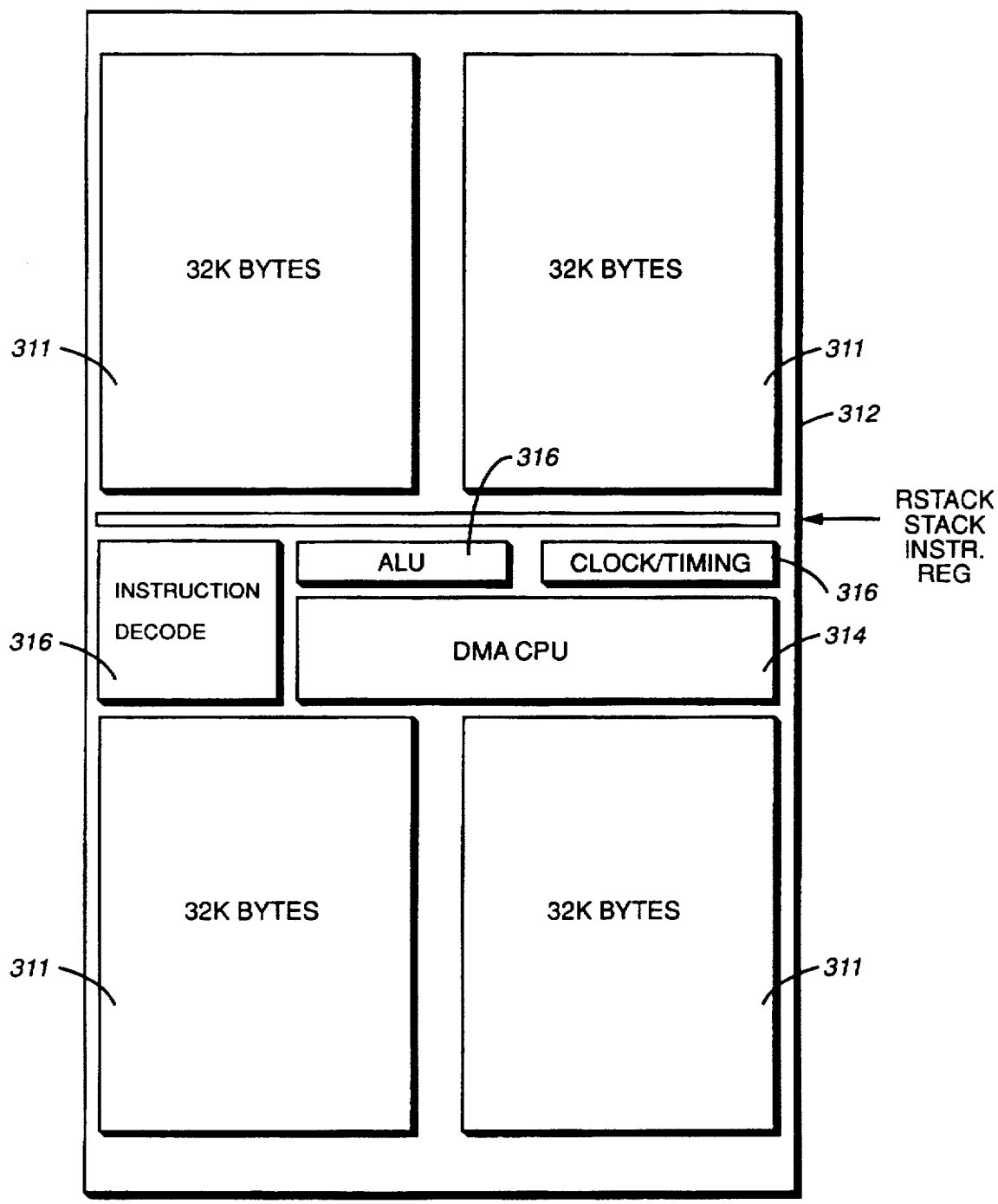
FIG._9

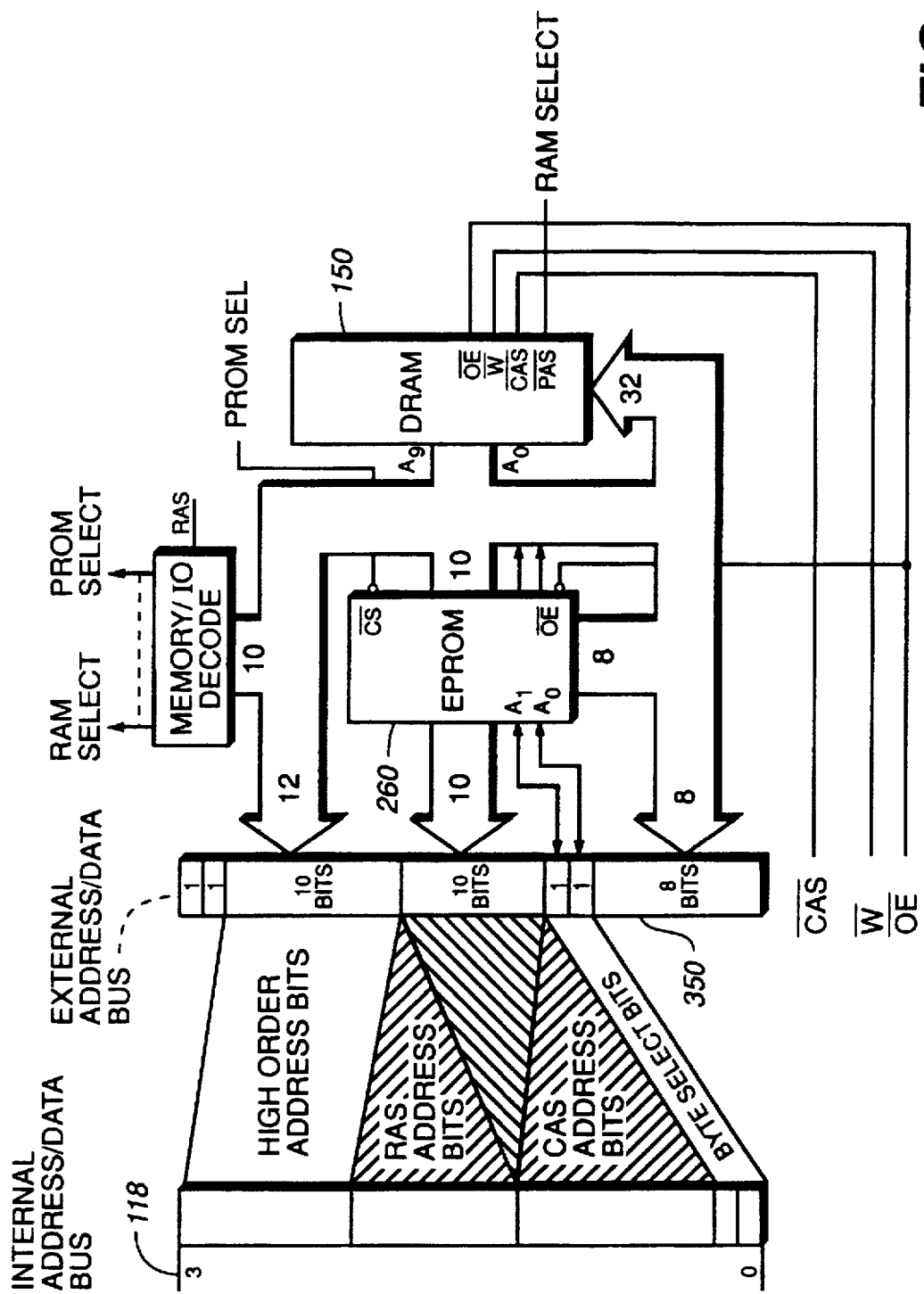
FIG._10

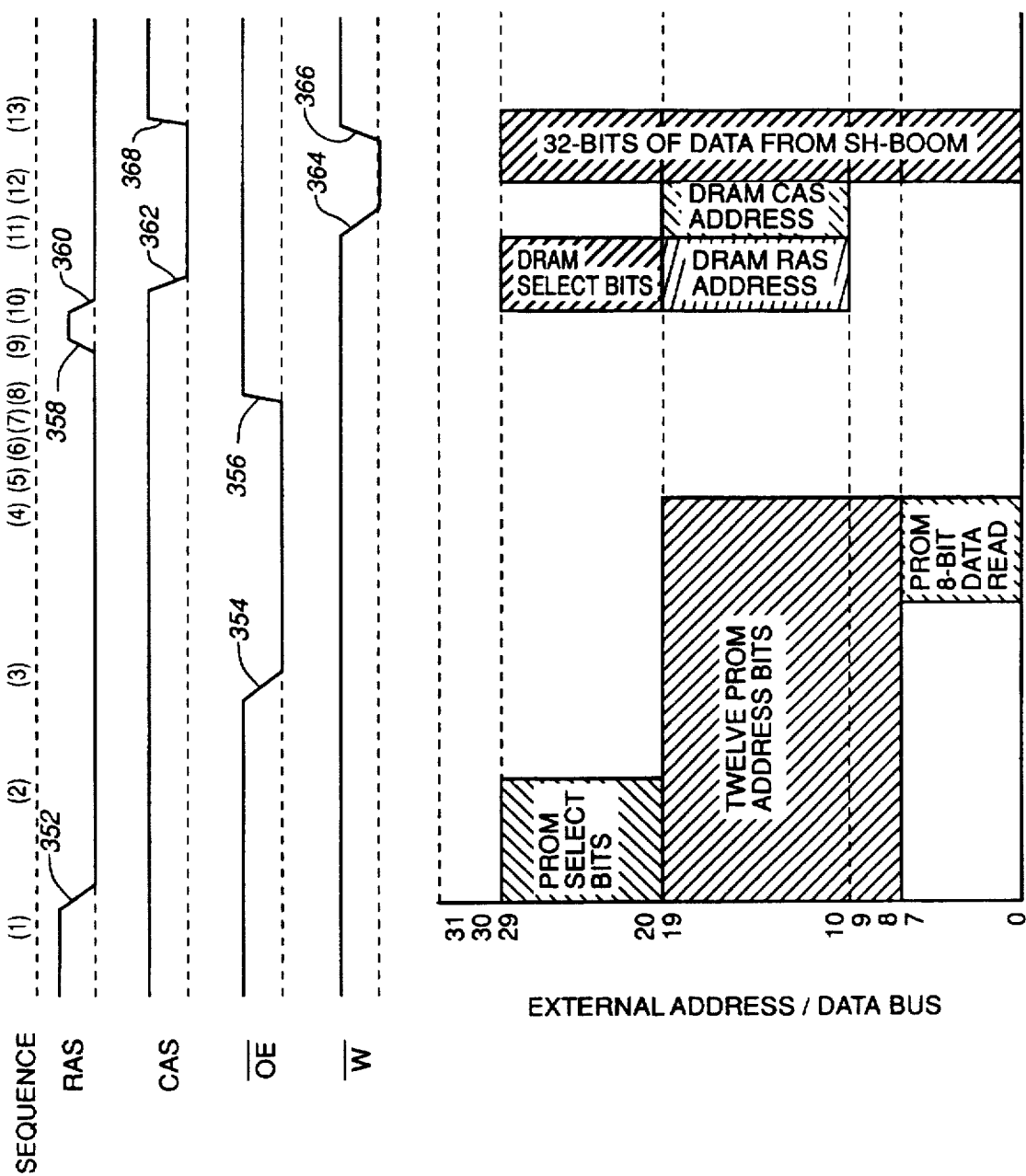
FIG._11

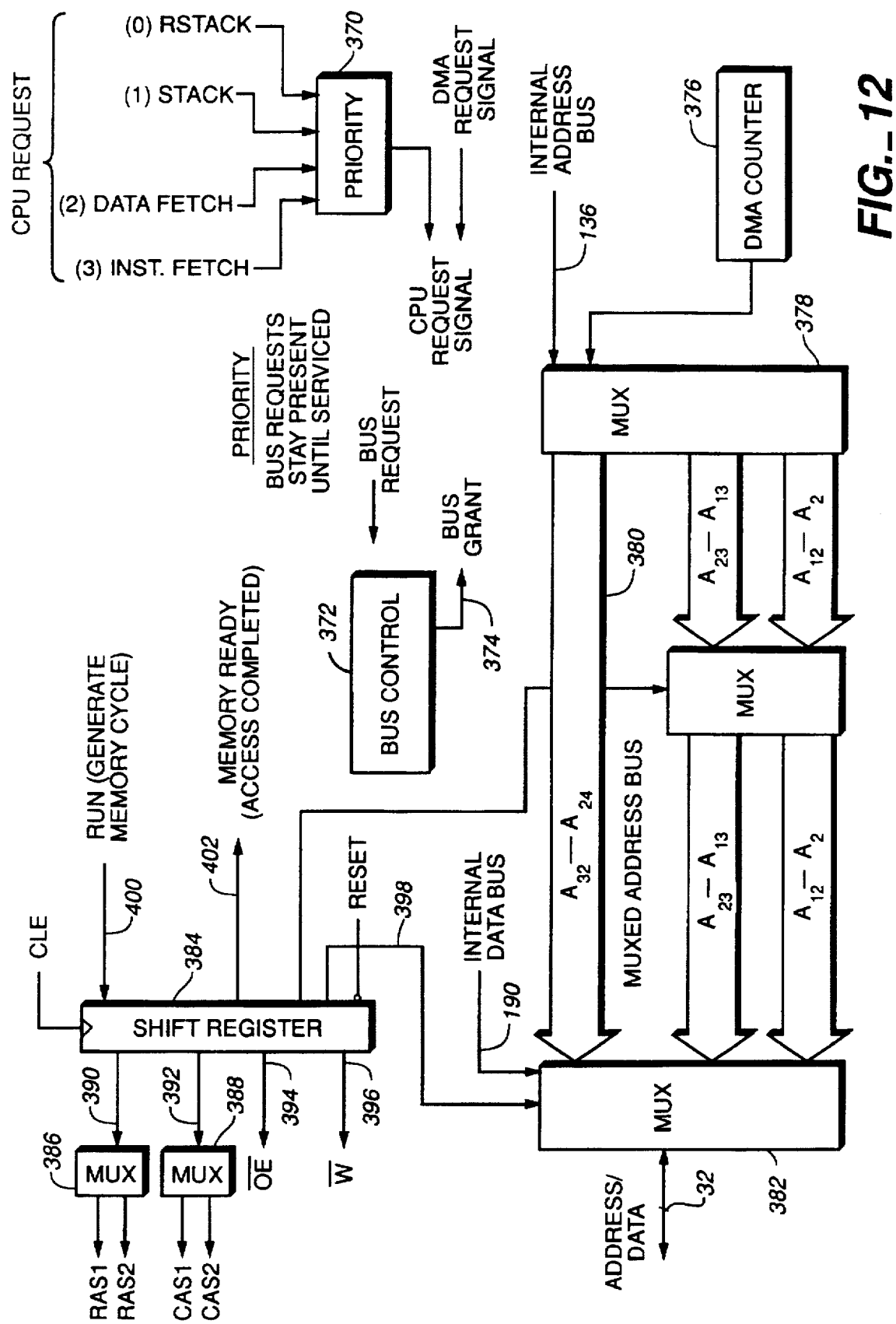
FIG._12

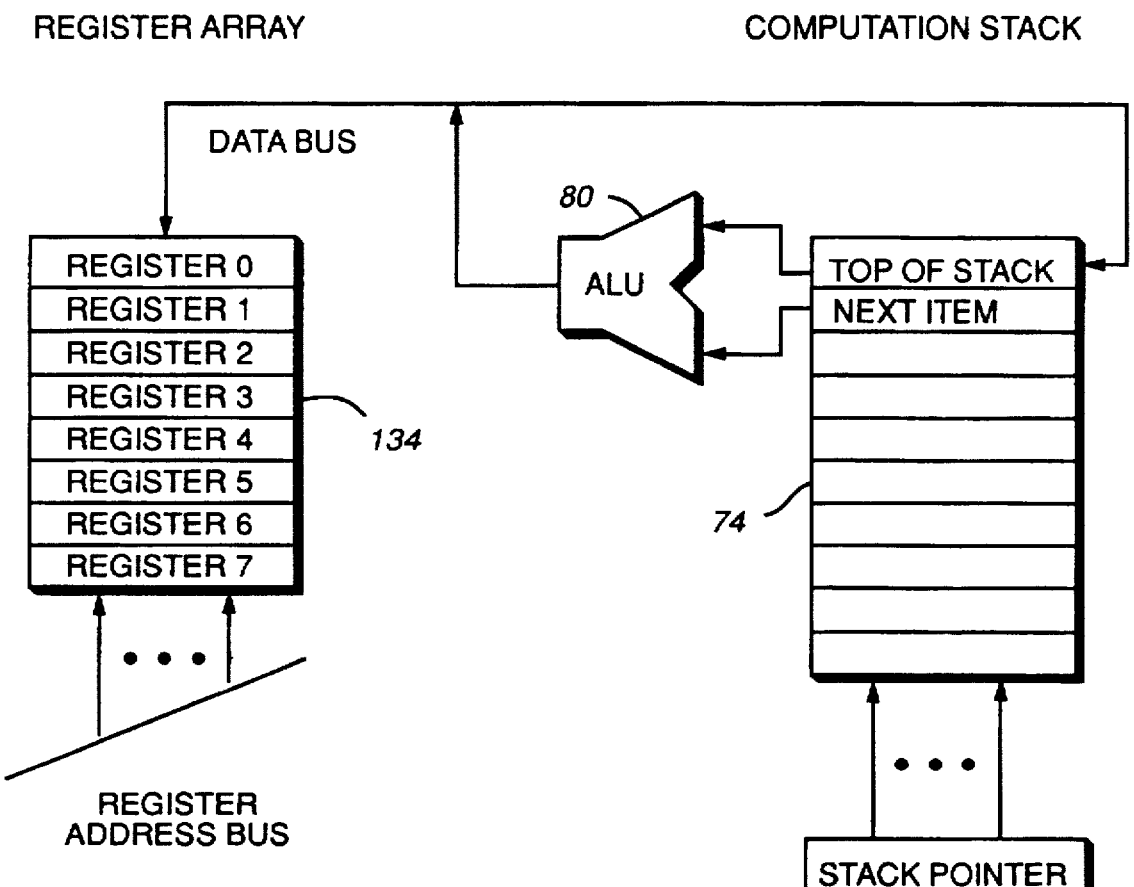
FIG._13

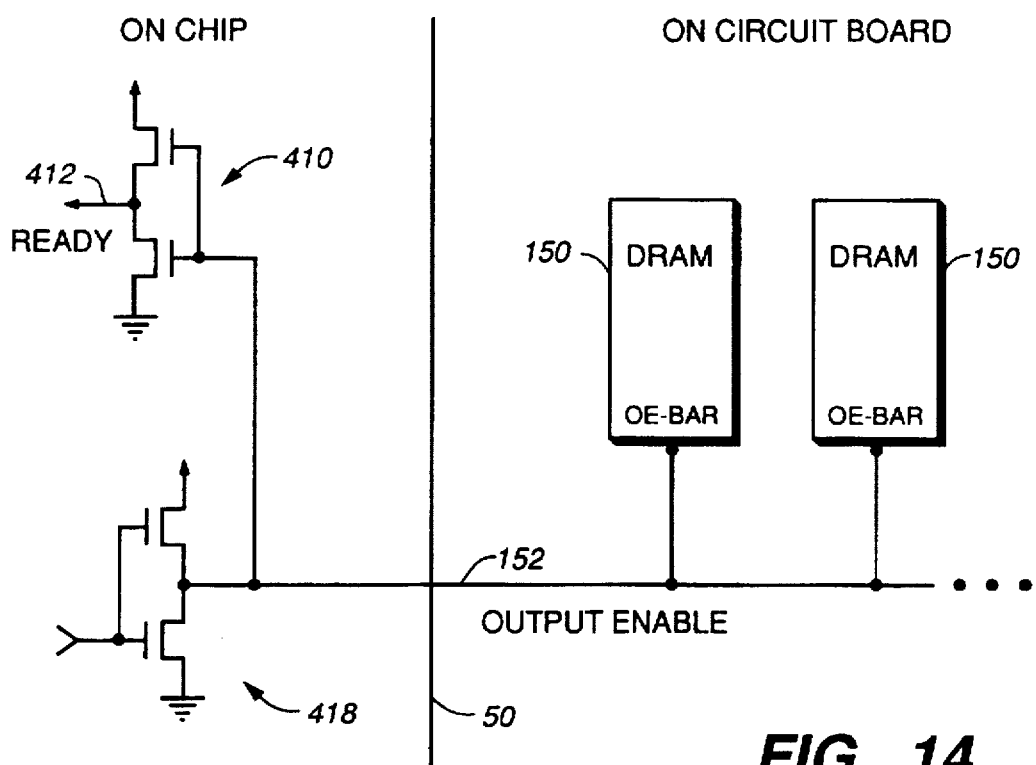
FIG._14
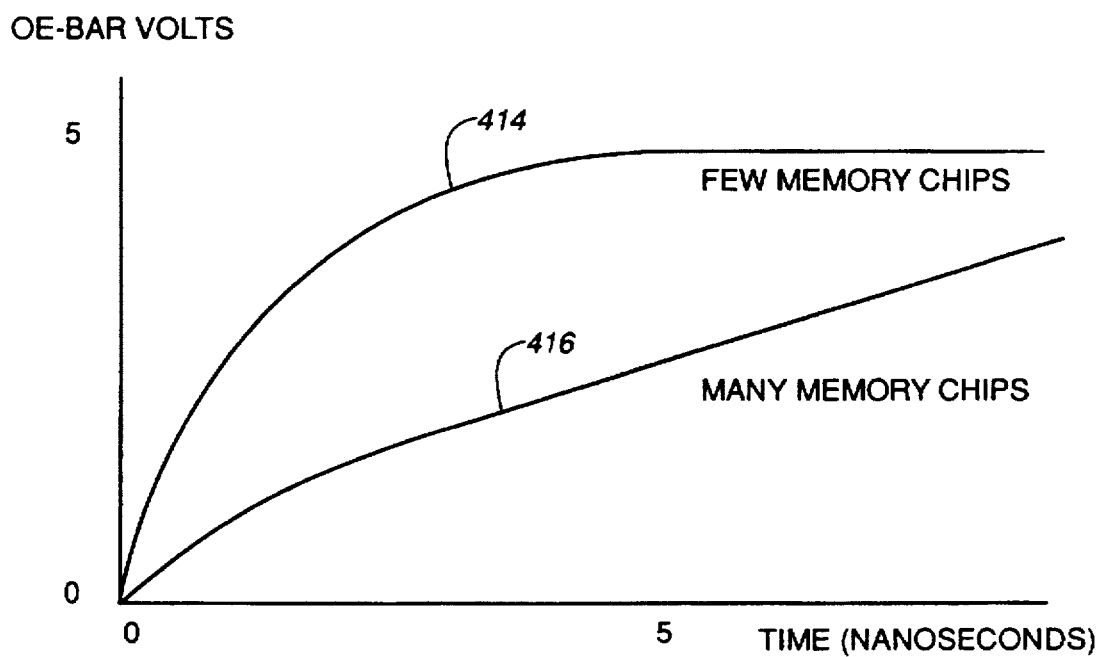
FIG._15

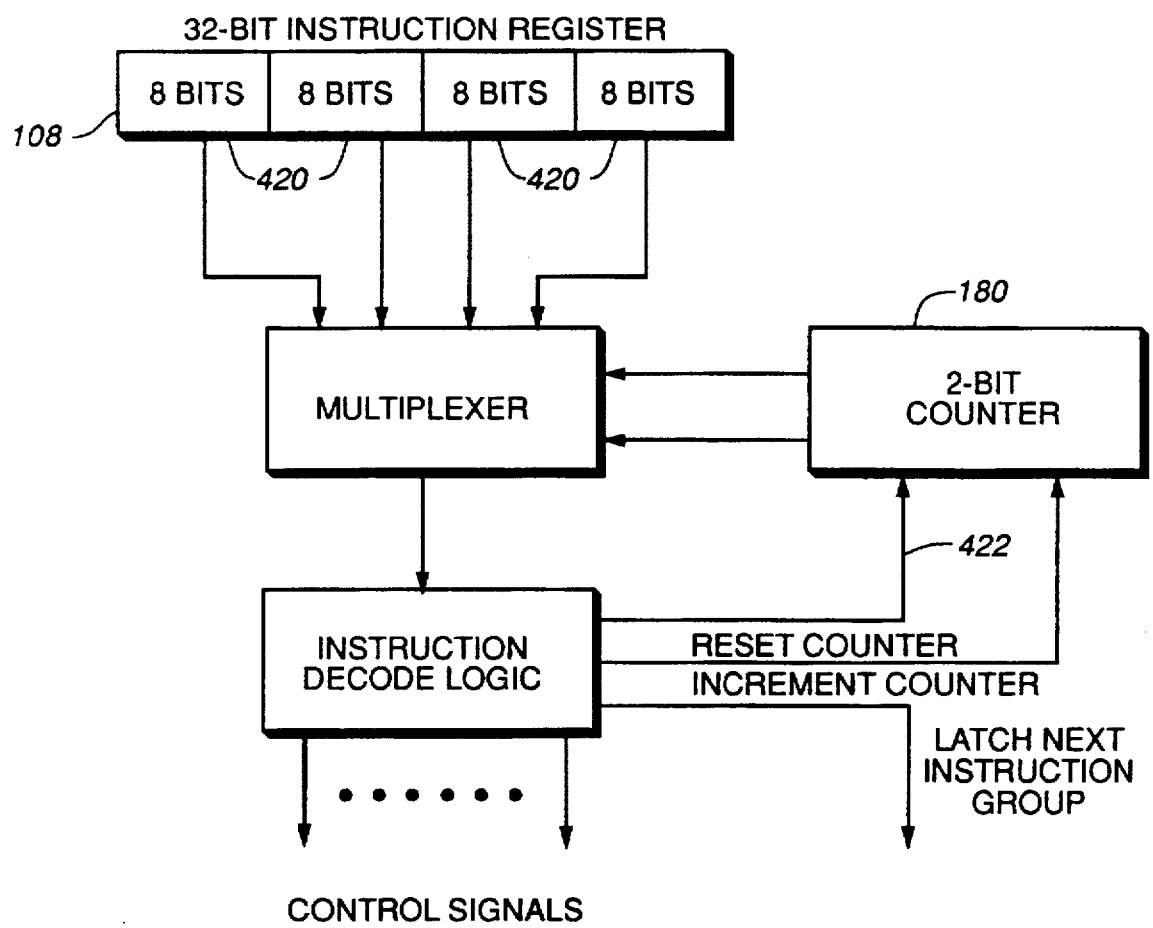
FIG._16
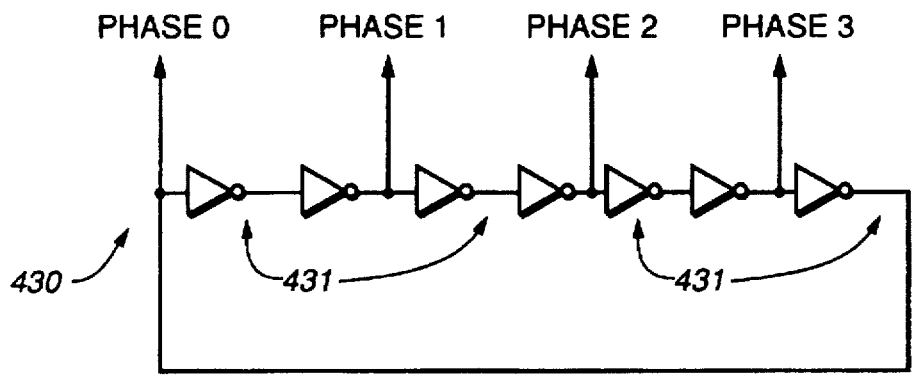
FIG._18

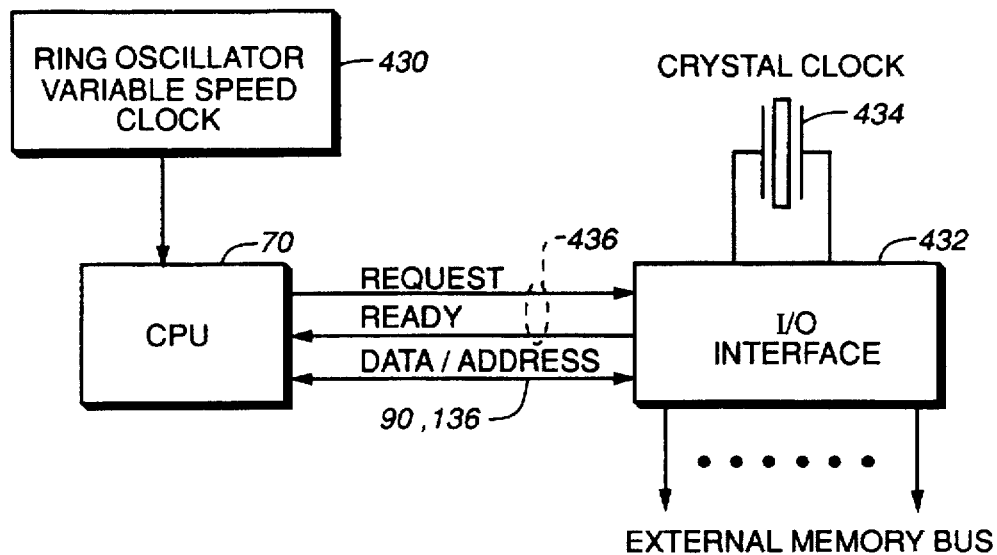
FIG._17
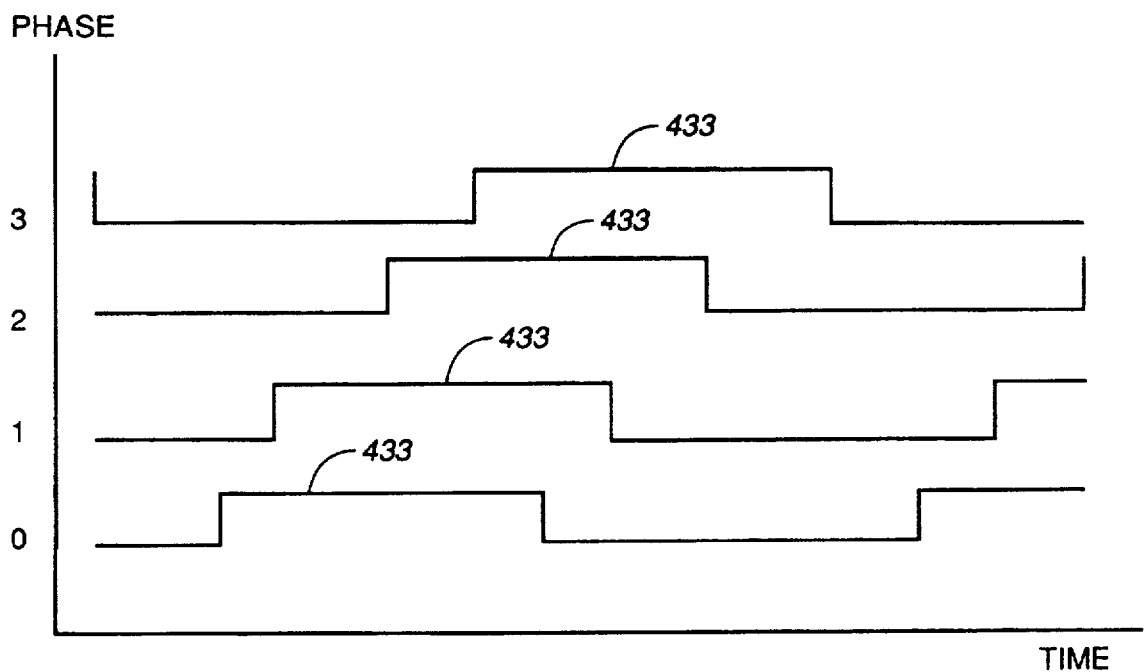
FIG._19

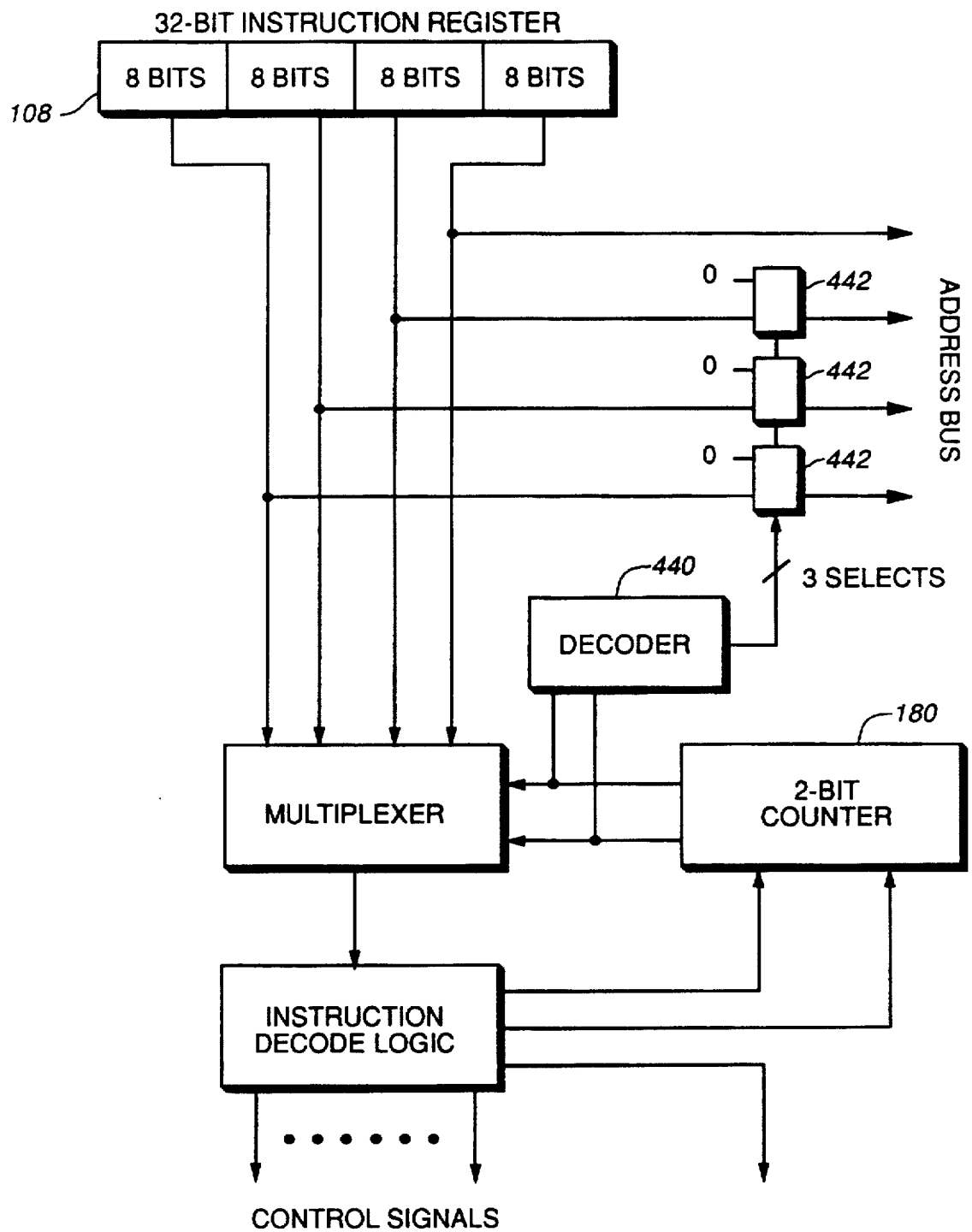
FIG._20

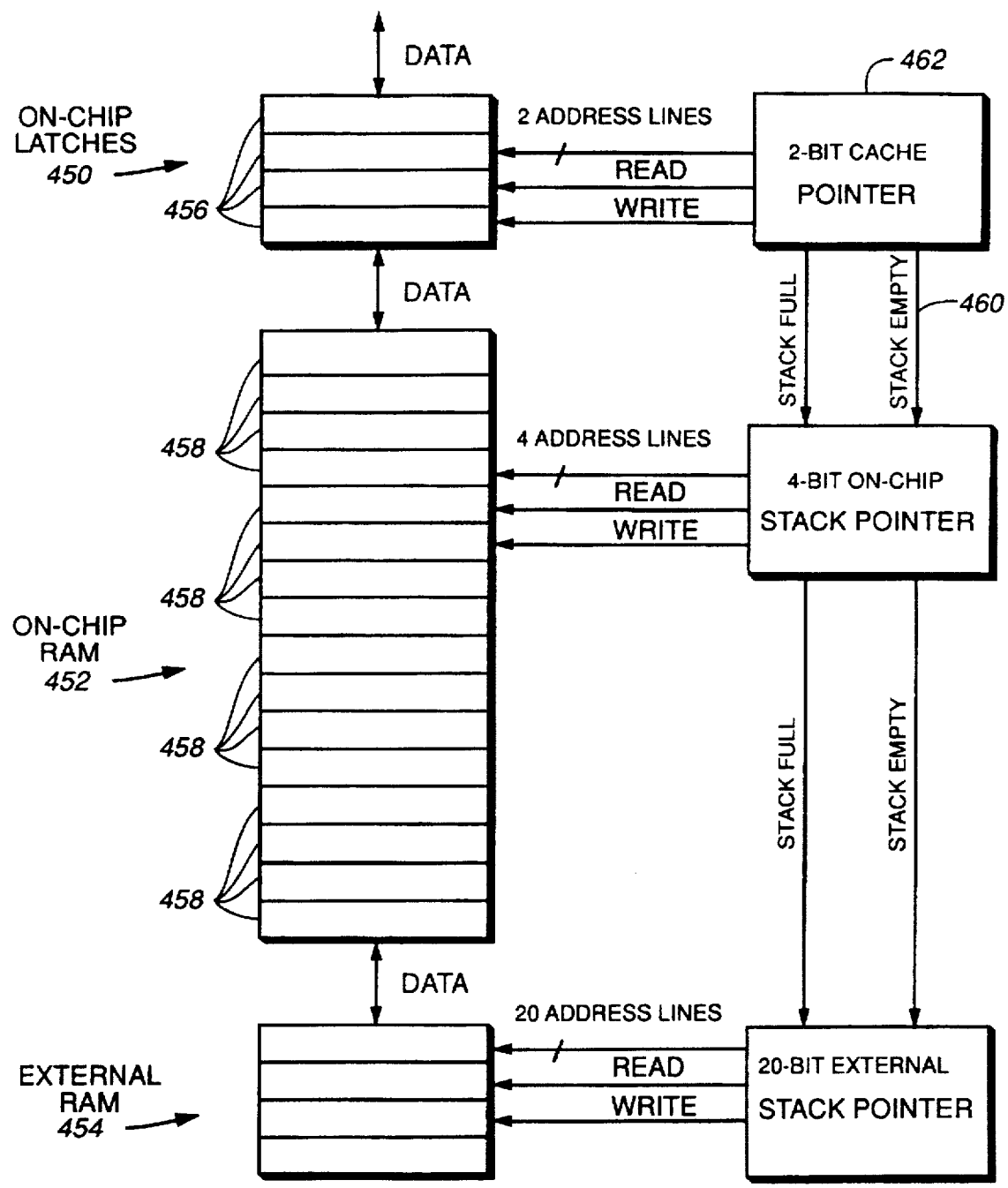
FIG._21

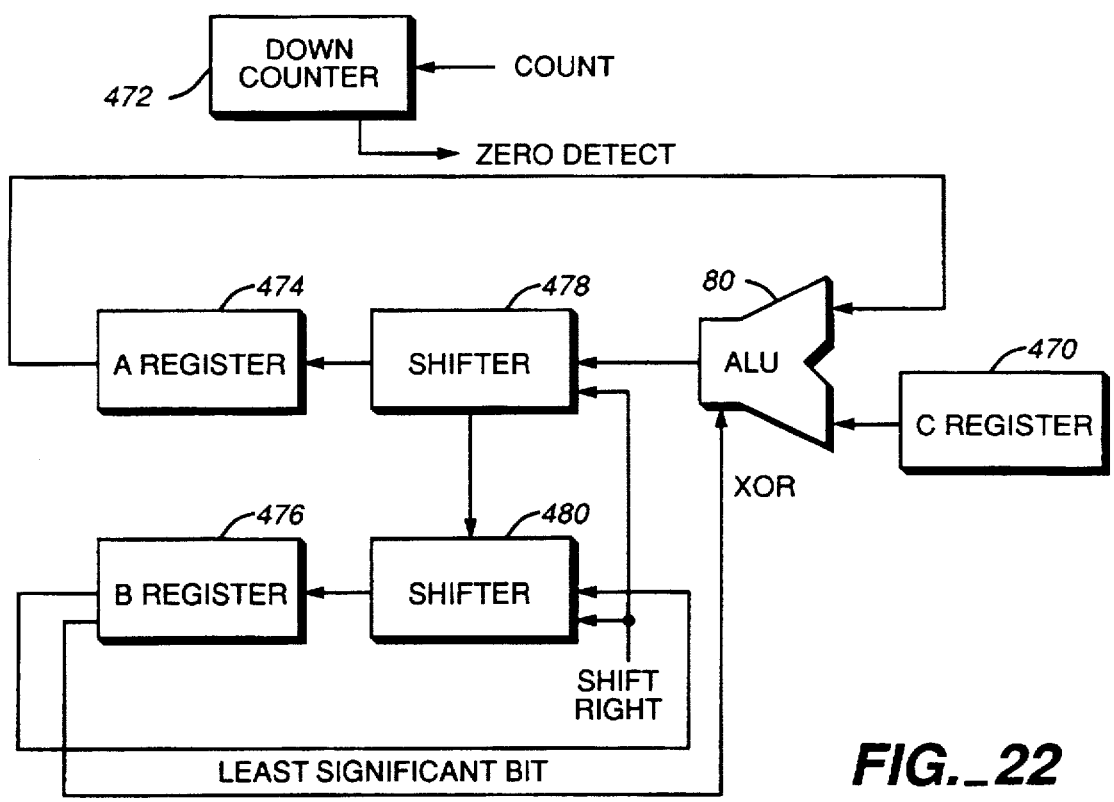
FIG._22
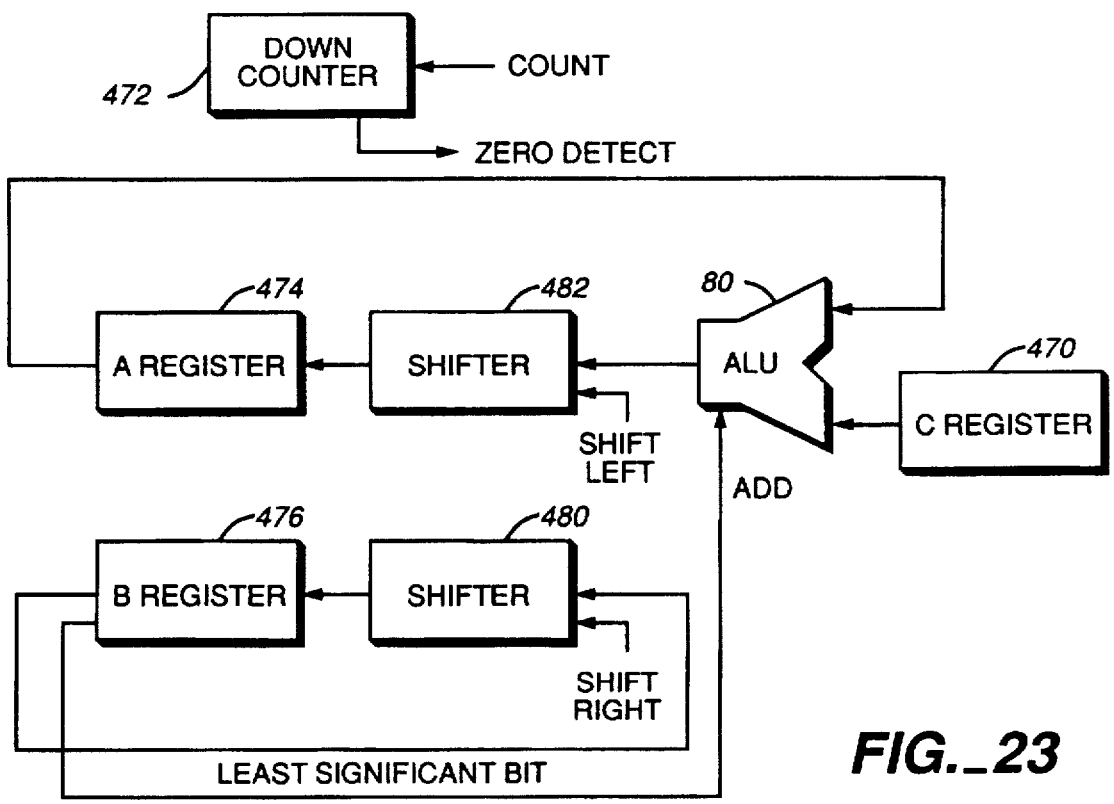
FIG._23

HIGH PERFORMANCE MICROPROCESSOR USING INSTRUCTIONS THAT OPERATE WITHIN INSTRUCTION GROUPS

This application is a division of U.S. application Ser. No. 07/389,334, filed Aug. 3, 1989, now U.S. Pat. No. 5,440,749.

BACKGROUND OF THE INVENTION

1. Field of the Invention

The present invention relates generally to a simplified, reduced instruction set computer (RISC) microprocessor. More particularly, it relates to such a microprocessor which is capable of performance levels of, for example, 20 million instructions per second (MIPS) at a price of, for example, 20 dollars.

2. Description of the Prior Art

Since the invention of the microprocessor, improvements in its design have taken two different approaches. In the first approach, a brute force gain in performance has been achieved through the provision of greater numbers of faster transistors in the microprocessor integrated circuit and an instruction set of increased complexity. This approach is exemplified by the Motorola 68000 and Intel 80X86 microprocessor families. The trend in this approach is to larger die sizes and packages, with hundreds of pinouts.

More recently, it has been perceived that performance gains can be achieved through comparative simplicity, both in the microprocessor integrated circuit itself and in its instruction set. This second approach provides RISC microprocessors, and is exemplified by the Sun SPARC and the Intel 8960 microprocessors. However, even with this approach as conventionally practiced, the packages for the microprocessor are large, in order to accommodate the large number of pinouts that continue to be employed. A need therefore remains for further simplification of high performance microprocessors.

With conventional high performance microprocessors, fast static memories are required for direct connection to the microprocessors in order to allow memory accesses that are fast enough to keep up with the microprocessors. Slower dynamic random access memories (DRAMs) are used with such microprocessors only in a hierarchical memory arrangement, with the static memories acting as a buffer between the microprocessors and the DRAMs. The necessity to use static memories increases cost of the resulting systems.

Conventional microprocessors provide direct memory accesses (DMA) for system peripheral units through DMA controllers, which may be located on the microprocessor integrated circuit, or provided separately. Such DMA controllers can provide routine handling of DMA requests and responses, but some processing by the main central processing unit (CPU) of the microprocessor is required.

SUMMARY OF THE INVENTION

Accordingly, it is an object of this invention to provide a microprocessor with a reduced pin count and cost compared to conventional microprocessors.

It is another object of the invention to provide a high performance microprocessor that can be directly connected to DRAMs without sacrificing microprocessor speed.

It is a further object of the invention to provide a high performance microprocessor in which DMA does not require use of the main CPU during DMA requests and responses and which provides very rapid DMA response with predictable response times.

The attainment of these and related objects may be achieved through use of the novel high performance, low cost microprocessor herein disclosed. In accordance with one aspect of the invention, a microprocessor system in accordance with this invention has a central processing unit, a memory and a bus connecting the central processing unit to the memory. Instruction fetching means are connected to the bus to fetch instruction groups via the bus from the memory. Each of the instruction groups include at least one instruction that accesses operands or instructions or both. The operands and instructions are located relative to the instruction groups. An instruction register receives a first of the instruction groups from the instruction fetching means. The first of the instruction groups include one or more sequential instructions. Instruction supplying means supplies, in succession from the instruction register, the one or more sequential instructions of the first of the instruction groups to the central processing unit. An instruction decoding means configures the instruction supplying means to select from the instruction register an operand associated with one of the instructions from the first of the instruction groups.

In accordance with another aspect of the invention, the microprocessor has a central processing unit and an instruction register operatively coupled to the central processing unit. An instruction fetching means provides instruction groups to the instruction register wherein certain of the instruction groups include one or more operands or sequential instructions or both. The one or more sequential instructions including at least one instruction that accesses operands or instructions or both being located relative to the instruction groups. An instruction supplying means successively couples the one or more sequential instructions of the certain of the instruction groups to the central processing unit. An instruction decoding means configures the instruction supplying means to select operands from the instruction register associated with particular ones of the sequential instructions.

In another aspect of the invention, the microprocessor system includes a central processing unit, memory, and an instruction register. A method provides instructions from the instruction register to the central processing unit and comprises the steps of:

providing instruction groups to the instruction register from the memory wherein certain of the instruction groups include one or more operands or sequential instructions or both;

supplying, in succession from the instruction register, the one or more sequential instructions of the certain of the instruction groups to the central processing unit; and selecting an operand from the one of the instruction groups for use by the central processing unit.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIG. 1 is an external, plan view of an integrated circuit package incorporating a microprocessor in accordance with the invention.

FIG. 2 is a block diagram of a microprocessor in accordance with the invention.

FIG. 3 is a block diagram of a portion of a data processing system incorporating the microprocessor of FIGS. 1 and 2.

FIG. 4 is a more detailed block diagram of a portion of the microprocessor shown in FIG. 2.

FIG. 5 is a more detailed block diagram of another portion of the microprocessor shown in FIG. 2.

FIG. 6 is a block diagram of another portion of the data processing system shown in part in FIG. 3 and incorporating the microprocessor of FIGS. 1-2 and 4-5.

FIGS. 7 and 8 are layout diagrams for the data processing system shown in part in FIGS. 3 and 6.

FIG. 9 is a layout diagram of a second embodiment of a microprocessor in accordance with the invention in a data processing system on a single integrated circuit.

FIG. 10 is a more detailed block diagram of a portion of the data processing system of FIGS. 7 and 8.

FIG. 11 is a timing diagram useful for understanding operation of the system portion shown in FIG. 12.

FIG. 12 is another more detailed block diagram of a further portion of the data processing system of FIGS. 7 and 8.

FIG. 13 is a more detailed block diagram of a portion of the microprocessor shown in FIG. 2.

FIG. 14 is a more detailed block and schematic diagram of a portion of the system shown in FIGS. 3 and 7-8.

FIG. 15 is a graph useful for understanding operation of the system portion shown in FIG. 14.

FIG. 16 is a more detailed block diagram showing part of the system portion shown in FIG. 4.

FIG. 17 is a more detailed block diagram of a portion of the microprocessor shown in FIG. 2.

FIG. 18 is a more detailed block diagram of part of the microprocessor portion shown in FIG. 17.

FIG. 19 is a set of waveform diagrams useful for understanding operation of the part of the microprocessor portion shown in FIG. 18.

FIG. 20 is a more detailed block diagram showing another part of the system portion shown in FIG. 4.

FIG. 21 is a more detailed block diagram showing another part of the system portion shown in FIG. 4.

FIGS. 22 and 23 are more detailed block diagrams showing another part of the system portion shown in FIG. 4.

DETAILED DESCRIPTION OF THE INVENTION

OVERVIEW

The microprocessor of this invention is desirably implemented as a 32-bit microprocessor optimized for:

HIGH EXECUTION SPEED, and

LOW SYSTEM COST.

In this embodiment, the microprocessor can be thought of as 20 MIPS for 20 dollars. Important distinguishing features of the microprocessor are:

Uses low-cost commodity DYNAMIC RAMS to run 20 MIPS 4 instruction fetch per memory cycle On-chip fast page-mode memory management Runs fast without external cache Requires few interfacing chips Crams 32-bit CPU in 44 pin SOJ package The instruction set is organized so that most operations can be specified with 8-bit instructions. Two positive products of this philosophy are:

Programs are smaller.

Programs can execute much faster.

The bottleneck in most computer systems is the memory bus. The bus is used to fetch instructions and fetch and store data. The ability to fetch four instructions in a single memory bus cycle significantly increases the bus availability to handle data.

Turning now to the drawings, more particularly to FIG. 1, there is shown a packaged 32-bit microprocessor 50 in a 44-pin plastic leadless chip carrier, shown approximately 100 times its actual size of about 0.8 inch on a side. The fact that the microprocessor 50 is provided as a 44-pin package represents a substantial departure from typical microprocessor packages, which usually have about 200 input/output (I/O) pins. The microprocessor 50 is rated at 20 million instructions per second (MIPS). Address and data lines 52, also labelled D0-D31, are shared for addresses and data without speed penalty as a result of the manner in which the microprocessor 50 operates, as will be explained below.

DYNAMIC RAM

In addition to the low cost 44-pin package, another unusual aspect of the high performance microprocessor 50 is that it operates directly with dynamic random access memories (DRAMs), as shown by row address strobe (RAS) and column address strobe (CAS) I/O pins 54. The other I/O pins for the microprocessor 50 include $V_{DD}$ pins 56, $V_{SS}$ pins 58, output enable pin 60, write pin 62, clock pin 64 and reset pin 66.

All high speed computers require high speed and expensive memory to keep up. The highest speed static RAM memories cost as much as ten times as much as slower dynamic RAMs. This microprocessor has been optimized to use low-cost dynamic RAM in high-speed page-mode. Page-mode dynamic RAMs offer static RAM performance without the cost penalty. For example, low-cost 85 nsec. dynamic RAMs access at 25 nsec when operated in fast page-mode. Integrated fast page-mode control on the microprocessor chip simplifies system interfacing and results in a faster system.

Details of the microprocessor 50 are shown in FIG. 2. The microprocessor 50 includes a main central processing unit (CPU) 70 and a separate direct memory access (DMA) CPU 72 in a single integrated circuit making up the microprocessor 50. The main CPU 70 has a first 16 deep push down stack 74, which has a top item register 76 and a next item register 78, respectively connected to provide inputs to an arithmetic logic unit (ALU) 80 by lines 82 and 84. An output of the ALU 80 is connected to the top item register 76 by line 86. The output of the top item register at 82 is also connected by line 88 to an internal data bus 90.

A loop counter 92 is connected to a decrementer 94 by lines 96 and 98. The loop counter 92 is bidirectionally connected to the internal data bus 90 by line 100. Stack pointer 102, return stack pointer 104, mode register 106 and instruction register 108 are also connected to the internal data bus 90 by lines 110, 112, 114 and 116, respectively. The internal data bus 90 is connected to memory controller 118 and to gate 120. The gate 120 provides inputs on lines 122, 124, and 126 to X register 128, program counter 130 and Y register 132 of return push down stack 134. The X register 128, program counter 130 and Y register 132 provide outputs to internal address bus 136 on lines 138, 140 and 142. The internal address bus provides inputs to the memory controller 118 and to an incrementer 144. The incrementer 144 provides inputs to the X register, program counter and Y register via lines 146, 122, 124 and 126. The DMA CPU 72 provides inputs to the memory controller 118 on line 148.

The memory controller 118 is connected to a RAM (not shown) by address/data bus 151 and control lines 153.

FIG. 2 shows that the microprocessor 50 has a simple architecture. Prior art RISC microprocessors are substantially more complex in design. For example, the SPARC RISC microprocessor has three times the gates of the microprocessor 50, and the Intel 8960 RISC microprocessor has 20 times the gates of the microprocessor 50. The speed of this microprocessor is in substantial part due to this simplicity. The architecture incorporates push down stacks and register write to achieve this simplicity.

The microprocessor 50 incorporates an I/O that has been tuned to make heavy use of resources provided on the integrated circuit chip. On chip latches allow use of the same I/O circuits to handle three different things: column addressing, row addressing and data, with a slight to nonexistent speed penalty. This triple bus multiplexing results in fewer buffers to expand, fewer interconnection lines, fewer I/O pins and fewer internal buffers.

The provision of on-chip DRAM control gives a performance equal to that obtained with the use of static RAMs. As a result, memory is provided at ¼ the system cost of static RAM used in most RISC systems.

The microprocessor 50 fetches 4 instructions per memory cycle; the instructions are in an 8-bit format, and this is a 32-bit microprocessor. System speed is therefore 4 times the memory bus bandwidth. This ability enables the microprocessor to break the Von Neumann bottleneck of the speed of getting the next instruction. This mode of operation is possible because of the use of a push down stack and register array. The push down stack allows the use of implied addresses, rather than the prior art technique of explicit addresses for two sources and a destination.

Most instructions execute in 20 nanoseconds in the microprocessor 50. The microprocessor can therefore execute instructions at 50 peak MIPS without pipeline delays. This is a function of the small number of gates in the microprocessor 50 and the high degree of parallelism in the architecture of the microprocessor.

FIG. 3 shows how column and row addresses are multiplexed on lines D8–D14 of the microprocessor 50 for addressing DRAM 150 from I/O pins 52. The DRAM 150 is one of eight, but only one DRAM 150 has been shown for clarity. As shown, the lines D11–D18 are respectively connected to row address inputs A0–A8 of the DRAM 15C. Additionally, lines D12–D15 are connected to the data inputs DQ1–DQ4 of the DRAM 150. The output enable, write and column address strobe pins 54 are respectively connected to the output enable, write and column address strobe inputs of the DRAM 150 by lines 152. The row address strobe pin 54 is connected through row address strobe decode logic 154 to the row address strobe input of the DRAM 150 by lines 156 and 158.

D0–D7 pins 52 (FIG. 1) are idle when the microprocessor 50 is outputting multiplexed row and column addresses on D11–D18 pins 52. The D0–D7 pins 52 can therefore simultaneously be used for I/O when right justified I/O is desired. Simultaneous addressing and I/O can therefore be carried out.

FIG. 4 shows how the microprocessor 50 is able to achieve performance equal to the use of static RAMS with DRAMs through multiple instruction fetch in a single clock cycle and instruction fetch-ahead. Instruction register 108 receives four 8-bit byte instruction words 1–4 on 32-bit internal data bus 90. The four instruction byte 1–4 locations of the instruction register 108 are connected to multiplexer 170 by busses 172, 174, 176 and 178, respectively. A microprogram counter 180 is connected to the multiplexer 170 by lines 182. The multiplexer 170 is connected to decoder 184 by bus 186. The decoder 184 provides internal signals to the rest of the microprocessor 50 on lines 188.

Most significant bits 190 of each instruction byte 1–4 location are connected to a 4-input decoder 192 by lines 194. The output of decoder 192 is connected to memory controller 118 by line 196. Program counter 130 is connected to memory controller 118 by internal address bus 136, and the instruction register 108 is connected to the memory controller 118 by the internal data bus 90. Address/data bus 198 and control bus 200 are connected to the DRAMS 150 (FIG. 3).

In operation, when the most significant bits 190 of remaining instructions 1–4 are "1" in a clock cycle of the microprocessor 50, there are no memory reference instructions in the queue. The output of decoder 192 on line 196 requests an instruction fetch ahead by memory controller 118 without interference with other accesses. While the current instructions in instruction register 108 are executing, the memory controller 118 obtains the address of the next set of four instructions from program counter 130 and obtains that set of instructions. By the time the current set of instructions has completed execution, the next set of instructions is ready for loading into the instruction register.

Details of the DMA CPU 72 are provided in FIG. 5. Internal data bus 90 is connected to memory controller 118 and to DMA instruction register 210. The DMA instruction register 210 is connected to DMA program counter 212 by bus 214, to transfer size counter 216 by bus 218 and to timed transfer interval counter 220 by bus 222. The DMA instruction register 210 is also connected to DMA I/O and RAM address register 224 by line 226. The DMA I/O and RAM address register 224 is connected to the memory controller 118 by memory cycle request line 228 and bus 230. The DMA program counter 212 is connected to the internal address bus 136 by bus 232. The transfer size counter 216 is connected to a DMA instruction done decrementer 234 by lines 236 and 238. The decrementer 234 receives a control input on memory cycle acknowledge line 240. When transfer size counter 216 has completed its count, it provides a control signal to DMA program counter 212 on line 242. Timed transfer interval counter 220 is connected to decrementer 244 by lines 246 and 248. The decrementer 244 receives a control input from a microprocessor system clock on line 250.

The DMA CPU 72 controls itself and has the ability to fetch and execute instructions. It operates as a co-processor to the main CPU 70 (FIG. 2) for time specific processing.

FIG. 6 shows how the microprocessor 50 is connected to an electrically programmable read only memory (EPROM) 260 by reconfiguring the data lines 52 so that some of the data lines 52 are input lines and some of them are output lines. Data lines 52 D0–D7 provide data to and from corresponding data terminals 262 of the EPROM 260. Data lines 52 D9–D18 provide addresses to address terminals 264 of the EPROM 260. Data lines 52 D19–D31 provide inputs from the microprocessor 50 to memory and I/O decode logic 266. RAS 0/1 control line 268 provides a control signal for determining whether the memory and I/O decode logic provides a DRAM RAS output on line 270 or a column enable output for the EPROM 260 on line 272. Column address strobe terminal 60 of the microprocessor 50 provides an output enable signal on line 274 to the corresponding terminal 276 of the EPROM 260.

FIGS. 7 and 8 show the front and back of a one card data processing system 280 incorporating the microprocessor 50, MSM514258-10 type DRAMs 150 totalling 2 megabytes, a Motorola 50 MegaHertz crystal oscillator clock 282, I/O circuits 284 and a 27256 type EPROM 260. The I/O circuits 284 include a 74HC04 type high speed hex inverter circuit 286, an IDT39C828 type 10-bit inverting buffer circuit 288, an IDT39C822 type 10-bit inverting register circuit 290, and two IDT39C823 type 9-bit non-inverting register circuits 292. The card 280 is completed with a MAX12V type DC—DC converter circuit 294, 34-pin dual AMP type headers 296, a coaxial female power connector 298, and a 3-pin AMP right angle header 300. The card 280 is a low cost, imbeddable product that can be incorporated in larger systems or used as an internal development tool.

The microprocessor 50 is a very high performance (50 MHz) RISC influenced 32-bit CPU designed to work closely with dynamic RAM. Clock for clock, the microprocessor 50 approaches the theoretical performance limits possible with a single CPU configuration. Eventually, the microprocessor 50 and any other processor is limited by the bus bandwidth and the number of bus paths. The critical conduit is between the CPU and memory.

One solution to the bus bandwidth/bus path problem is to integrate a CPU directly onto the memory chips, giving every memory a direct bus to the CPU. FIG. 9 shows another microprocessor 310 that is provided integrally with 1 megabit of DRAM 311 in a single integrated circuit 312. Until the present invention, this solution has not been practical, because most high performance CPUs require from 500,000 to 1,000,000 transistors and enormous die sizes just by themselves. The microprocessor 310 is equivalent to the microprocessor 50 in FIGS. 1–8. The microprocessors 50 and 310 are the most transistor efficient high performance CPUs in existence, requiring fewer than 50,000 transistors for dual processors 70 and 72 (FIG. 2) or 314 and 316 (less memory). The very high speed of the microprocessors 50 and 310 is to a certain extent a function of the small number of active devices. In essence, the less silicon gets in the way, the faster the electrons can get where they are going.

The microprocessor 310 is therefore the only CPU suitable for integration on the memory chip die 312. Some simple modifications to the basic microprocessor 50 to take advantage of the proximity to the DRAM array 311 can also increase the microprocessor 50 clock speed by 50 percent, and probably more.

The microprocessor 310 core on board the DRAM die 312 provides most of the speed and functionality required for a large group of applications from automotive to peripheral control. However, the integrated CPU 310/DRAM 311 concept has the potential to redefine significantly the way multiprocessor solutions can solve a spectrum of very compute intensive problems. The CPU 310/DRAM 311 combination eliminates the Von Neumann bottleneck by distributing it across numerous CPU/DRAM chips 312. The microprocessor 310 is a particularly good core for multiprocessing, since it was designed with the SDI targeting array in mind, and provisions were made for efficient interprocessor communications.

Traditional multiprocessor implementations have been very expensive in addition to being unable to exploit fully the available CPU horsepower. Multiprocessor systems have typically been built up from numerous board level or box level computers. The result is usually an immense amount of hardware with corresponding wiring, power consumption and communications problems. By the time the systems are interconnected, as much as 50 percent of the bus speed has been utilized just getting through the interfaces.

In addition, multiprocessor system software has been scarce. A multiprocessor system can easily be crippled by an inadequate load-sharing algorithm in the system software, which allows one CPU to do a great deal of work and the others to be idle. Great strides have been made recently in systems software, and even UNIX V.4 may be enhanced to support multiprocessing. Several commercial products from such manufacturers as DUAL Systems and UNISOFT do a credible job on 68030 type microprocessor systems now.

The microprocessor 310 architecture eliminates most of the interface friction, since up to 64 CPU 310/RAM 311 processors should be able to intercommunicate without buffers or latches. Each chip 312 has about 40 MIPS raw speed, because placing the DRAM 311 next to the CPU 310 allows the microprocessor 310 instruction cycle to be cut in half, compared to the microprocessor 50. A 64 chip array of these chips 312 is more powerful than any other existing computer. Such an array fits on a 3×5 card, cost less than a FAX machine, and draw about the same power as a small television.

Dramatic changes in price/performance always reshape existing applications and almost always create new ones. The introduction of microprocessors in the mid 1970s created video games, personal computers, automotive computers, electronically controlled appliances, and low cost computer peripherals.

The integrated circuit 312 will find applications in all of the above areas, plus create some new ones. A common generic parallel processing algorithm handles convolution/Fast Fourier Transform (FFT)/pattern recognition. Interesting product possibilities using the integrated circuit 312 include high speed reading machines, real-time speech recognition, spoken language translation, real-time robot vision, a product to identify people by their faces, and an automotive or aviation collision avoidance system.

A real time processor for enhancing high density television (HDTV) images, or compressing the HDTV information into a smaller bandwidth, would be very, feasible. The load sharing in HDTV could be very straightforward. Splitting up the task according to color and frame would require 6, 9 or 12 processors. Practical implementation might require 4 meg RAMs integrated with the microprocessor 310.

The microprocessor 310 has the following specifications
CONTROL LINES
4—POWER/GROUND
1—CLOCK
32—DATA I/O
4—SYSTEM CONTROL
    EXTERNAL MEMORY FETCH
    EXTERNAL MEMORY FETCH AUTOINCREMENT X
    EXTERNAL MEMORY FETCH AUTOINCREMENT Y
    EXTERNAL MEMORY WRITE
    EXTERNAL MEMORY WRITE AUTOINCREMENT X
    EXTERNAL MEMORY WRITE AUTOINCREMENT Y
    EXTERNAL PROM FETCH
    LOAD ALL X REGISTERS
    LOAD ALL Y REGISTERS
    LOAD ALL PC REGISTERS
    EXCHANGE X AND Y
    INSTRUCTION FETCH
    ADD TO PC
    ADD TO X
    WRITE MAPPING REGISTER
    READ MAPPING REGISTER
    REGISTER CONFIGURATION MICROPROCESSOR 310 CPU 316 CORE
COLUMN LATCH1 (1024 BITS) 32×32 MUX
STACK POINTER (16 BITS)
COLUMN LATCH2 (1024 BITS) 32×32 MUX
RSTACK POINTER (16 BITS)
PROGRAM COUNTER 32 BITS
XO REGISTER 32 BITS (ACTIVATED ONLY FOR ON-CHIP ACCESSES)
YO REGISTER 32 BITS (ACTIVATED ONLY FOR ON-CHIP ACCESSES)
LOOP COUNTER 32 BITS
DMA CPU 314 CORE
DMA PROGRAM COUNTER 24 BITS
INSTRUCTION REGISTER 32 BITS
I/O & RAM ADDRESS REGISTER 32 BITS
TRANSFER SIZE COUNTER 12 BITS
INTERVAL COUNTER 12 BITS To offer memory expansion for the basic chip 312, an intelligent DRAM can be produced. This chip will be optimized for high speed operation with the integrated circuit 312 by having three on-chip address registers: Program Counter, X Register and Y register. As a result, to access the intelligent DRAM, no address is required, and a total access cycle could be as short as 10 nsec. Each expansion DRAM would maintain its own copy of the three registers and would be identified by a code specifying its memory address. Incrementing and adding to the three registers will actually take place on the memory chips. A maximum of 64 intelligent DRAM peripherals would allow a large system to be created without sacrificing speed by introducing multiplexers or buffers.

There are certain differences between the microprocessor 310 and the microprocessor 50 that arise from providing the microprocessor 310 on the same die 312 with the DRAM 311. Integrating the DRAM 311 allows architectural changes in the microprocessor 310 logic to take advantage of existing on-chip DRAM 311 circuitry. Row and column design is inherent in memory architecture. The DRAMs 311 access random bits in a memory array by first selecting a row of 1024 bits, storing them into a column latch, and then selecting one of the bits as the data to be read or written.

The time required to access the data is split between the row access and the column access. Selecting data already stored in a column latch is faster than selecting a random bit by at least a factor of six. The microprocessor 310 takes advantage of this high speed by creating a number of column latches and using them as caches and shift registers. Selecting a new row of information may be thought of as performing a 1024-bit read or write with the resulting immense bus bandwidth.

1. The microprocessor 50 treats its 32-bit instruction register 108 (see FIGS. 2 and 4) as a cache for four 8-bit instructions. Since the DRAM 311 maintains a 1024-bit latch for the column bits, the microprocessor 310 treats the column latch as a cache for 128 8-bit instructions. Therefore, the next instruction will almost always be already present in the cache. Long loops within the cache are also possible and more useful than the 4 instruction loops in the microprocessor 50.

2. The microprocessor 50 uses two 16×32-bit deep register arrays 74 and 134 (FIG. 2) for the parameter stack and the return stack. The microprocessor 310 creates two other 1024-bit column latches to provide the equivalent of two 32×32-bit arrays, which can be accessed twice as fast as a register array.

3. The microprocessor 50 has a DMA capability which can be used for I/O to a video shift register. The microprocessor 310 uses yet another 1024-bit column latch as a long video shift register to drive a CRT display directly. For color displays, three on-chip shift registers could also be used. These shift registers can transfer pixels at a maximum of 100 MHz.

4. The microprocessor 50 accesses memory via an external 32-bit bus. Most of the memory 311 for the microprocessor 310 is on the same die 312. External access to more memory is made using an 8-bit bus. The result is a smaller die, smaller package and lower power consumption than the microprocessor 50.

5. The microprocessor 50 consumes about a third of its operating power charging and discharging the I/O pins and associated capacitances. The DRAMs 150 (FIG. 8) connected to the microprocessor 50 dissipate most of their power in the I/O drivers. A microprocessor 310 system will consume about one-tenth the power of a microprocessor 50 system, since having the DRAM 311 next to the processor 310 eliminates most of the external capacitances to be charged and discharged.

6. Multiprocessing means splitting a computing task between numerous processors in order to speed up the solution. The popularity of multiprocessing is limited by the expense of current individual processors as well as the limited interprocessor communications ability. The microprocessor 310 is an excellent multiprocessor candidate, since the chip 312 is a monolithic computer complete with memory, rendering it low-cost and physically compact.

The shift registers implemented with the microprocessor 310 to perform video output can also be configured as interprocessor communication links. The INMOS transputer attempted a similar strategy, but at much lower speed and without the performance benefits inherent in the microprocessor 310 column latch architecture. Serial I/O is a prerequisite for many multiprocessor topologies because of the many neighbor processors which communicate. A cube has 6 neighbors. Each neighbor communicates using these lines:

DATA IN
CLOCK IN
READY FOR DATA
DATA OUT
DATA READY?
CLOCK OUT

A special start up sequence is used to initialize the on-chip DRAM 311 in each of the processors.

The microprocessor 310 column latch architecture allows neighbor processors to deliver information directly to internal registers or even instruction caches of other chips 312. This technique is not used with existing processors, because it only improves performance in a tightly coupled DRAM system.

7. The microprocessor 50 architecture offers two types of looping structures: LOOP-IF-DONE and MICRO-LOOP. The former takes an 8-bit to 24-bit operand to describe the entry point to the loop address. The latter performs a loop entirely within the 4 instruction queue and the loop entry point is implied as the first instruction in the queue. Loops entirely within the queue run without external instruction fetches and execute up to three times as fast as the long loop construct. The microprocessor 310 retains both constructs with a few differences. The microprocessor 310 microloop functions in the same fashion as the microprocessor 50 operation, except the queue is 1024-bits or 128 8-bit instructions long. The microprocessor 310 microloop can therefore contain jumps, branches, calls and immediate operations not possible in the 4 8-bit instruction microprocessor 50 queue.

Microloops in the microprocessor 50 can only perform simple block move and compare functions. The larger microprocessor 310 queue allows entire digital signal processing or floating point algorithms to loop at high speed in the queue.

The microprocessor 50 offers four instructions to redirect execution:

CALL
BRANCH
BRANCH-IF-ZERO
LOOP-IF-NOT-DONE

These instructions take a variable length address operand 8, 16 or 24 bits long. The microprocessor 50 next address logic treats the three operands similarly by adding or subtracting them to the current program counter. For the microprocessor 310, the 16 and 24-bit operands function in the same manner as the 16 and 24-bit operands in the microprocessor 50. The 8-bit class operands are reserved to operate entirely within the instruction queue. Next address decisions can therefore be made quickly, because only 10 bits of addresses are affected, rather than 32. There is no carry or borrow generated past the 10 bits.

8. The microprocessor 310 CPU 316 resides on an already crowded DRAM die 312. To keep chip size as small as possible, the DMA processor 72 of the microprocessor 50 has been replaced with a more traditional DMA controller 314. DMA is used with the microprocessor 310 to perform the following functions:

Video output to a CRT
Multiprocessor serial communications
8-bit parallel I/O

The DMA controller 314 can maintain both serial and parallel transfers simultaneously. The following DMA sources and destinations are supported by the microprocessor 310:

| DESCRIPTION | I/O | LINES |
|---|---|---|
| 1. Video shift register | OUTPUT | 1 to 3 |
| 2. Multiprocessor serial | BOTH | 6 lines/channel |
| 3. 8-bit parallel | BOTH | 8 data, 4 control |

The three sources use separate 1024-bit buffers and separate I/O pins. Therefore, all three may be active simultaneously without interference.

The microprocessor 310 can be implemented with either a single multiprocessor serial buffer or separate receive and sending buffers for each channel, allowing simultaneous bidirectional communications with six neighbors simultaneously.

FIGS. 10 and 11 provide details of the PROM DMA used in the microprocessor 50. The microprocessor 50 executes faster than all but the fastest PROMs. PROMS are used in a microprocessor 50 system to store program segments and perhaps entire programs. The microprocessor 50 provides a feature on power-up to allow programs to be loaded from low-cost, slow speed PROMs into high speed DRAM for execution. The logic which performs this function is part of the DMA memory controller 118. The operation is similar to DMA, but not identical, since four 8-bit bytes must be assembled on the microprocessor 50 chip, then written to the DRAM 150.

The microprocessor 50 directly interfaces to DRAM 150 over a triple multiplexed data and address bus 350, which carries RAS addresses, CAS addresses and data. The EPROM 260, on the other hand, is read with non-multiplexed busses. The microprocessor 50 therefore has a special mode which unmultiplexes the data and address lines to read 8 bits of EPROM data. Four 8-bit bytes are read in this fashion. The multiplexed bus 350 is turned back on, and the data is written to the DRAM 150.

When the microprocessor 50 detects a RESET condition, the processor stops the main CPU 70 and forces a mode 0 (PROM LOAD) instruction into the DMA CPU 72 instruction register. The DMA instruction directs the memory controller to read the EPROM 260 data at 8 times the normal access time for memory. Assuming a 50 MHz microprocessor 50, this means an access time of 320 nsec. The instruction also indicates:

The selection address of the EPROM 260 to be loaded,
The number of 32-bit words to transfer,
The DRAM 150 address to transfer into.

The sequence of activities to transfer one 32-bit word from EPROM 260 to DRAM 150 are:

1. RAS goes low at 352, latching the EPROM 260 select information from the high order address bits. The EPROM 260 is selected.
2. Twelve address bits (consisting of what is normally DRAM CAS addresses plus two byte select bits are placed on the bus 350 going to the EPROM 260 address pins. These signals will remain on the lines until the data from the EPROM 260 has been read into the microprocessor 50. For the first byte, the byte select bits will be binary 00.
3. CAS goes low at 354, enabling the EPROM 260 data onto the lower 8 bits of the external address/data bus 350. NOTE: It is important to recognize that, during this part of the cycle, the lower 8 bits of the external data/address bus are functioning as inputs, but the rest of the bus is still acting as outputs.
4. The microprocessor 50 latches these eight least significant bits internally and shifts them 8 bits left to shift them to the next significant byte position.
5. Steps 2, 3 and 4 are repeated with byte address 01.
6. Steps 2, 3 and 4 are repeated with byte address 10.
7. Steps 2, 3 and 4 are repeated with byte address 11.
8. CAS goes high at 356, taking the EPROM 260 off the data bus.
9. RAS goes high at 358, indicating the end of the EPROM 260 access.
10. RAS goes low at 360, latching the DRAM select information from the high order address bits. At the same time, the RAS address bits are latched into the DRAM 150. The DRAM 150 is selected.
11. CAS goes low at 362, latching the DRAM 150 CAS addresses.
12. The microprocessor 50 places the previously latched EPROM 260 32-bit data onto the external address/data bus 350. W goes low at 364, writing the 32 bits into the DRAM 150.
13. W goes high at 366. CAS goes high at 368. The process continues with the next word.

FIG. 12 shows details of the microprocessor 50 memory controller 118. In operation, bus requests stay present until they are serviced. CPU 70 requests are prioritized at 370 in the order of: 1, Parameter Stack; 2, Return Stack; 3, Data Fetch; 4, Instruction Fetch. The resulting CPU request signal and a DMA request signal are supplied as bus requests to bus control 372, which provides a bus grant signal at 374. Internal address bus 136 and a DMA counter 376 provide inputs to a multiplexer 378. Either a row address or a column address are provided as an output to multiplexed address bus 380 as an output from the multiplexer 378. The multiplexed address bus 380 and the internal data bus 90 provide address and data inputs, respectively, to multiplexer 382. Shift register 384 supplies row address strobe (RAS) 1 and 2 control signals to multiplexer 386 and column address strobe (CAS) 1 and 2 control signals to multiplexer 388 on lines 390 and 392. The shift register 384 also supplies output enable (OE) and write (W) signals on lines 394 and 396 and a control signal on line 398 to multiplexer 382. The shift register 384 receives a RUN signal on line 400 to generate a memory cycle and supplies a MEMORY READY signal on line 402 when an access is complete.

STACK/REGISTER ARCHITECTURE

Most microprocessors use on-chip registers for temporary storage of variables. The on-chip registers access data faster than off-chip RAM. A few microprocessors use an on-chip push down stack for temporary storage.

A stack has the advantage of faster operation compared to on-chip registers by avoiding the necessity to select source and destination registers. (A math or logic operation always uses the top two stack items as source and the top of stack as destination.) The stack's disadvantage is that it makes some operations clumsy. Some compiler activities in particular require on-chip registers for efficiency.

As shown in FIG. 13, the microprocessor 50 provides both on-chip registers 134 and a stack 74 and reaps the benefits of both.

BENEFITS:
1. Stack math and logic is twice as fast as those available on an equivalent register only machine. Most programmers and optimizing compilers can take advantage of this feature.
2. Sixteen registers are available for on-chip storage of local variables which can transfer to the stack for computation. The accessing of variables is three to four times as fast as available on a strictly stack machine.

The combined stack 74/register 134 architecture has not been used previously due to inadequate understanding by computer designers of optimizing compilers and the mix of transfer versus math/logic instructions.

ADAPTIVE MEMORY CONTROLLER

A microprocessor must be designed to work with small or large memory configurations. As more memory loads are added to the data, address, and control lines, the switching speed of the signals slows down. The microprocessor 50 multiplexes the address/data bus three ways, so timing between the phases is critical. A traditional approach to the problem allocates a wide margin of time between bus phases, so that systems will work with small or large numbers of memory chips connected. A speed compromise of as much as 50% is required.

As shown in FIG. 14, the microprocessor 50 uses a feedback technique to allow the processor to adjust memory bus timing to be fast with small loads and slower with large ones. The OUTPUT ENABLE (OE) line 152 from the microprocessor 50 is connected to all memories 150 on the circuit board. The loading on the output enable line 152 to the microprocessor 50 is directly related to the number of memories 150 connected. By monitoring how rapidly OE 152 goes high after a read, the microprocessor 50 is able to determine when the data hold time has been satisfied and place the next address on the bus.

The level of the OE line 152 is monitored by CMOS input buffer 410 which generates an internal READY signal on line 412 to the microprocessor's memory controller. Curves 414 and 416 of the FIG. 15 graph show the difference in rise time likely to be encountered from a lightly to heavily loaded memory system. When the OE line 152 has reached a predetermined level to generate the READY signal, driver 418 generates an OUTPUT ENABLE signal on OE line 152.

SKIP WITHIN THE INSTRUCTION CACHE

The microprocessor 50 fetches four 8-bit instructions each memory cycle and stores them in a 32-bit instruction register 108, as shown in FIG. 16. A class of "test and skip" instructions can very rapidly execute a very fast jump operation within the four instruction cache.

SKIP CONDITIONS:
Always
ACC non-zero
ACC negative
Carry flag equal logic one
Never
ACC equal zero
ACC positive
Carry flag equal logic zero The SKIP instruction can be located in any of the four byte positions 420 in the 32-bit instruction register 108. If the test is successful, SKIP will jump over the remaining one, two, or three 8-bit instructions in the instruction register 108 and cause the next four-instruction group to be loaded into the register 108. As shown, the SKIP operation is implemented by resetting the 2-bit microinstruction counter 180 to zero on line 422 and simultaneously latching the next instruction group into the register 108. Any instructions following the SKIP in the instruction register are overwritten by the new instructions and not executed.

The advantage of SKIP is that optimizing compilers and smart programmers can often use it in place of the longer conditional JUMP instruction. SKIP also makes possible microloops which exit when the loop counts down or when the SKIP jumps to the next instruction group. The result is very fast code.

Other machines (such as the PDP-8 and Data General NOVA) provide the ability to skip a single instruction. The microprocessor 50 provides the ability to skip up to three instructions.

MICROLOOP IN THE INSTRUCTION CACHE

The microprocessor 50 provides the MICROLOOP instruction to execute repetitively from one to three instructions residing in the instruction register 108. The microloop instruction works in conjunction with the LOOP COUNTER 92 (FIG. 2) connected to the internal data bus 90. To execute a microloop, the program stores a count in LOOP COUNTER 92. MICROLOOP may be placed in the first, second, third, or last byte 420 of the instruction register 108. If placed in the first position, execution will just create a delay equal to the number stored in LOOP COUNTER 92 times the machine cycle. If placed in the second, third, or last byte 420, when the microloop instruction is executed, it will test the LOOP COUNT for zero. If zero, execution will continue with the next instruction. If not zero, the LOOP COUNTER 92 is decremented and the 2-bit microinstruction counter is cleared, causing the preceding instructions in the instruction register to be executed again.

Microloop is useful for block move and search operations. By executing a block move completely out of the instruction register 108, the speed of the move is doubled, since all memory cycles are used by the move rather than being shared with instruction fetching. Such a hardware implementation of microloops is much faster than conventional software implementation of a comparable function.

OPTIMAL CPU CLOCK SCHEME

The designer of a high speed microprocessor must produce a product which operate over wide temperature ranges, wide voltage swings, and wide variations in semiconductor processing. Temperature, voltage, and process all affect transistor propagation delays. Traditional CPU designs are done so that with the worse case of the three parameters, the circuit will function at the rated clock speed. The result are designs that must be clocked a factor of two slower than their maximum theoretical performance, so they will operate properly in worse case conditions.

The microprocessor 50 uses the technique shown in FIGS. 17–19 to generate the system clock and its required phases. Clock circuit 430 is the familiar "ring oscillator" used to test process performance. The clock is fabricated on the same silicon chip as the rest of the microprocessor 50.

The ring oscillator frequency is determined by the parameters of temperature, voltage, and process. At room temperature, the frequency will be in the neighborhood of 100 MHZ. At 70 degrees Centigrade, the speed will be 50 MHZ. The ring oscillator 430 is useful as a system clock, with its stages 431 producing phase 0-phase 3 outputs 433 shown in FIG. 19, because its performance tracks the parameters which similarly affect all other transistors on the same silicon die. By deriving system timing from the ring oscillator 430, CPU 70 will always execute at the maximum frequency possible, but never too fast. For example, if the processing of a particular die is not good resulting in slow transistors, the latches and gates on the microprocessor 50 will operate slower than normal. Since the microprocessor 50 ring oscillator clock 430 is made from the same transistors on the same die as the latches and gates, it too will operate slower (oscillating at a lower frequency), providing compensation which allows the rest of the chip's logic to operate properly.

ASYNCHRONOUS/SYNCHRONOUS CPU

Most microprocessors derive all system timing from a single clock. The disadvantage is that different parts of the system can slow all operations. The microprocessor 50 provides a dual-clock scheme as shown in FIG. 17, with the CPU 70 operating asynchronously to I/O interface 432 forming part of memory controller 118 (FIG. 2) and the I/O interface 432 operating synchronously with the external world of memory and I/O devices. The CPU 70 executes at the fastest speed possible using the adaptive ring counter clock 430. Speed may vary by a factor of four depending upon temperature, voltage, and process. The external world must be synchronized to the microprocessor 50 for operations such as video display updating and disc drive reading and writing. This synchronization is performed by the I/O interface 432, speed of which is controlled by a conventional crystal clock 434. The interface 432 processes requests for memory accesses from the microprocessor 50 and acknowledges the presence of I/O data. The microprocessor 50 fetches up to four instructions in a single memory cycle and can perform much useful work before requiring another memory access. By decoupling the variable speed of the CPU 70 from the fixed speed of the I/O interface 432, optimum performance can be achieved by each. Recoupling between the CPU 70 and the interface 432 is accomplished with handshake signals on lines 436, with data/addresses passing on bus 90, 136.

ASYNCHRONOUS/SYNCHRONOUS CPU IMBEDDED ON A DRAM CHIP

System performance is enhanced even more when the DRAM 311 and CPU 314 (FIG. 9) are located on the same die. The proximity of the transistors means that DRAM 311 and CPU 314 parameters will closely follow each other. At room temperature, not only would the CPU 314 execute at 100 MHZ, but the DRAM 311 would access fast enough to keep up. The synchronization performed by the I/O interface 432 would be for DMA and reading and writing I/O ports. In some systems (such as calculators) no I/O synchronization at all would be required, and the I/O clock would be tied to the ring counter clock.

VARIABLE WIDTH OPERANDS

Many microprocessors provide variable width operands. The microprocessor 50 handles operands of 8, 16, or 24 bits using the same op-code. FIG. 20 shows the 32-bit instruction register 108 and the 2-bit microinstruction register 180 which selects the 8-bit instruction. Two classes of microprocessor 50 instructions can be greater than 8-bits, JUMP class and IMMEDIATE. A JUMP or IMMEDIATE op-code is 8-bits, but the operand can be 8, 16, or 24 bits long. This magic is possible because operands must be right justified in the instruction register. This means that the least significant bit of the operand is always located in the least significant bit of the instruction register. The microinstruction counter 180 selects which 8-bit instruction to execute. If a JUMP or IMMEDIATE instruction is decoded, the state of the 2-bit microinstruction counter selects the required 8, 16, or 24 bit operand onto the address or data bus. The unselected 8-bit bytes are loaded with zeros by operation of decoder 440 and gates 442. The advantage of this technique is the saving of a number of op-codes required to specify the different operand sizes in other microprocessors.

TRIPLE STACK CACHE

Computer performance is directly related to the system memory bandwidth. The faster the memories, the faster the computer. Fast memories are expensive, so techniques have been developed to move a small amount of high-speed memory around to the memory addresses where it is needed. A large amount of slow memory is constantly updated by the fast memory, giving the appearance of a large fast memory array. A common implementation of the technique is known as a high-speed memory cache. The cache may be thought of as fast acting shock absorber smoothing out the bumps in memory access. When more memory is required than the shock can absorb, it bottoms out and slow speed memory is accessed. Most memory operations can be handled by the shock absorber itself.

The microprocessor 50 architecture has the ALU 80 (FIG. 2) directly coupled to the top two stack locations 76 and 78. The access time of the stack 74 therefore directly affects the execution speed of the processor. The microprocessor 50 stack architecture is particularly suitable to a triple cache technique, shown in FIG. 21 which offers the appearance of a large stack memory operating at the speed of on-chip latches 450. Latches 450 are the fastest form of memory device built on the chip, delivering data in as little as 3 nsec. However latches 450 require large numbers of transistors to construct. On-chip RAM 452 requires fewer transistors than latches, but is slower by a factor of five (15 nsec access). Off-chip RAM 150 is the slowest storage of all. The microprocessor 50 organizes the stack memory hierarchy as three interconnected stacks 450, 452 and 454. The latch stack 450 is the fastest and most frequently used. The on-chip RAM stack 452 is next. The off-chip RAM stack 454 is slowest. The stack modulation determines the effective access time of the stack. If a group of stack operations never push or pull more than four consecutive items on the stack, operations will be entirely performed in the 3 nsec latch stack. When the four latches 456 are filled, the data in the bottom of the latch stack 450 is written to the top of the on-chip RAM stack 452. When the sixteen locations 458 in the on-chip RAM stack 452 are filled, the data in the bottom of the on-chip RAM stack 452 is written to the top of the off-chip RAM stack 454. When popping data off a full stack 450, four pops will be performed before stack empty line 460 from the latch stack pointer 462 transfers data from the on-chip RAM stack 452. By waiting for the latch stack 450 to empty before performing the slower on-chip RAM access, the high effective speed of the latches 456 are made available to the processor. The same approach is employed with the on-chip RAM stack 452 and the off-chip RAM stack 454.

POLYNOMIAL GENERATION INSTRUCTION

Polynomials are useful for error correction, encryption, data compression, and fractal generation. A polynomial is generated by a sequence of shift and exclusive OR operations. Special chips are provided for this purpose in the prior art.

The microprocessor 50 is able to generate polynomials at high speed without external hardware by slightly modifying how the ALU 80 works. As shown in FIG. 22, a polynomial is generated by loading the "order" (also known as the feedback terms) into C Register 470. The value thirty one (resulting in 32 iterations) is loaded into DOWN COUNTER 472. A register 474 is loaded with zero. B register 476 is loaded with the starting polynomial value. When the POLY instruction executes, C register 470 is exclusively ORed with A register 474 if the least significant bit of B register 476 is a one. Otherwise, the contents of the A register 474 passes through the ALU 80 unaltered. The combination of A and B is then shifted right (divided by 2) with shifters 478 and 480. The operation automatically repeats the specified number of iterations, and the resulting polynomial is left in A register 474.

FAST MULTIPLY

Most microprocessors offer a 16×16 or 32×32 bit multiply instruction. Multiply when performed sequentially takes one shift/add per bit, or 32 cycles for 32 bit data. The microprocessor 50 provides a high speed multiply which allows multiplication by small numbers using only a small number of cycles. FIG. 23 shows the logic used to implement the high speed algorithm. To perform a multiply, the size of the multiplier less one is placed in the DOWN COUNTER 472. For a four bit multiplier, the number three would be stored in the DOWN COUNTER 472. Zero is loaded into the A register 474. The multiplier is written bit reversed into the B Register 476. For example, a bit reversed five (binary 0101) would be written into B as 1010. The multiplicand is written into the C register 470. Executing the FAST MULT instruction will leave the result in the A Register 474, when the count has been completed. The fast multiply instruction is important because many applications scale one number by a much smaller number. The difference in speed between multiplying a 32×32 bit and a 32×4 bit is a factor of 8. If the least significant bit of the multiplier is a "ONE", the contents of the A register 474 and the C register 470 are added. If the least significant bit of the multiplier is a "ZERO", the contents of the A register are passed through the ALU 80 unaltered. The output of the ALU 80 is shifted left by shifter 482 in each iteration. The contents of the B register 476 are shifted right by the shifter 480 in each iteration.

INSTRUCTION EXECUTION PHILOSOPHY

The microprocessor 50 uses high speed D latches in most of the speed critical areas. Slower on-chip RAM is used as secondary storage.

The microprocessor 50 philosophy of instruction execution is to create a hierarchy of speed as follows:

| Logic and D latch transfers | 1 cycle | 20 nsec |
|---|---|---|
| Math | 2 cycles | 40 nsec |
| Fetch/store on-chip RAM | 2 cycles | 40 nsec |
| Fetch/store in current RAS page | 4 cycles | 80 nsec |
| Fetch/store with RAS cycle | 11 cycles | 220 nsec |

With a 50 MHZ clock, many operations can be performed in 20 nsec. and almost everything else in 40 nsec.

To maximize speed, certain techniques in processor design have been used. They include:

Eliminating arithmetic operations on addresses,
Fetching up to four instructions per memory cycle,
Pipelineless instruction decoding
Generating results before they are needed,
Use of three level stack caching.

PIPELINE PHILOSOPHY

Computer instructions are usually broken down into sequential pieces, for example: fetch, decode, register read, execute, and store. Each piece will require a single machine cycle. In most Reduced Instruction Set Computer (RISC) chips, instruction require from three to six cycles.

RISC instructions are very parallel. For example, each of 70 different instructions in the SPARC (SUN Computer's RISC chip) has five cycles. Using a technique called "pipelining", the different phases of consecutive instructions can be overlapped.

To understand pipelining, think of building five residential homes. Each home will require in sequence, a foundation, framing, plumbing and wiring, roofing, and interior finish. Assume that each activity takes one week. To build one house will take five weeks.

But what if you want to build an entire subdivision? You have only one of each work crew, but when the foundation men finish on the first house, you immediately start them on the second one, and so on. At the end of five weeks, the first home is complete, but you also have five foundations. If you have kept the framing, plumbing, roofing, and interior guys all busy, from five weeks on, a new house will be completed each week.

This is the way a RISC chip like SPARC appears to execute an instruction in a single machine cycle. In reality, a RISC chip is executing one fifth of five instructions each machine cycle. And if five instructions stay in sequence, an instruction will be completed each machine cycle.

The problems with a pipeline are keeping the pipe full with instructions. Each time an out of sequence instruction such as a BRANCH or CALL occurs, the pipe must be refilled with the next sequence. The resulting dead time to refill the pipeline can become substantial when many IF/THEN/ELSE statements or subroutines are encountered.

THE PIPELINE APPROACH

The microprocessor 50 has no pipeline as such. The approach of this microprocessor to speed is to overlap instruction fetching with execution of the previously fetched instruction(s). Beyond that, over half the instructions (the most common ones) execute entirely in a single machine cycle of 20 nsec. This is possible because:

1. Instruction decoding resolves in 2.5 nsec.
2. Incremented/decremented and some math values are calculated before they are needed, requiring only a latching signal to execute.
3. Slower memory is hidden from high speed operations by high-speed D latches which access in 4 nsec.

The disadvantage for this microprocessor is a more complex chip design process. The advantage for the chip user is faster ultimate throughput since pipeline stalls cannot exist. Pipeline synchronization with availability flag bits and other such pipeline handling is not required by this microprocessor.

For example, in some RISC machines an instruction which tests a status flag may have to wait for up to four cycles for the flag set by the previous instruction to be available to be tested. Hardware and software debugging is also somewhat easier because the user doesn't have to visualize five instructions simultaneously in the pipe.

OVERLAPPING INSTRUCTION FETCH/EXECUTE

The slowest procedure the microprocessor 50 performs is to access memory. Memory is accessed when data is read or written. Memory is also read when instructions are fetched. The microprocessor 50 is able to hide fetch of the next instruction behind the execution of the previously fetched instruction(s). The microprocessor 50 fetches instructions in 4-byte instruction groups. An instruction group may contain from one to four instructions. The amount of time required to execute the instruction group ranges from 4 cycles for simple instructions to 64 cycles for a multiply.

When a new instruction group is fetched, the microprocessor instruction decoder looks at the most significant bit of all four of the bytes. The most significant bit of an instruction determines if a memory access is required. For example, CALL, FETCH, and STORE all require a memory access to execute. If all four bytes have nonzero most significant bits, the microprocessor initiates the memory fetch of the next sequential 4-byte instruction group. When the last instruction in the group finishes executing, the next 4-byte instruction group is ready and waiting on the data bus needing only to be latched into the instruction register. If the 4-byte instruction group required four or more cycles to execute and the next sequential access was a column address strobe (CAS) cycle, the instruction fetch was completely overlapped with execution.

INTERNAL ARCHITECTURE

The microprocessor 50 architecture consists of the following:

| PARAMETER STACK <--> | Y REGISTER |
|---|---|
| ALU* <--> | RETURN STACK |
| <--32 BITS---> | <--32 BITS---> |
| 16 DEEP | 16 DEEP |
| Used for math and logic. | Used for subroutine and interrupt return addresses as well as local variables. |
| Push down stack. | Push down stack. |
| Can overflow into off-chip RAM. | Can overflow into off-chip RAM. |
| | Can also be accessed relative to top of stack. |
| LOOP COUNTER | (32-bits, can decrement by 1) Used by class of test and loop instructions. |
| X REGISTER | (32-bits, can increment or decrement by 4). Used to point to RAM locations. |
| PROGRAM COUNTER | (32-bits, increments by 4). Points to 4-byte instruction groups in RAM. |
| INSTRUCTION REG | (32-Bits). Holds 4-byte instruction groups while they are being decoded and executed. |

\* Math and logic operations use the TOP item and NEXT to top Parameter Stack items as the operands. The result is pushed onto the Parameter Stack.

\* Return addresses from subroutines are placed on the Return Stack. The Y REGISTER is used as a pointer to RAM locations. Since the Y REGISTER is the top item of the Return Stack, nesting of indices is straightforward.

MODE—A register with mode and status bits.

MODE-BITS:

Slow down memory accesses by 8 if "1". Run full speed if "0". (Provided for access to slow EPROM.)

Divide the system clock by 1023 if "1" to reduce power consumption. Run full speed if "0". (On-chip counters slow down if this bit is set.)

Enable external interrupt 1.

Enable external interrupt 2.

Enable external interrupt 3.

Enable external interrupt 4.

Enable external interrupt 5.

Enable external interrupt 6.

Enable external interrupt 7.

ON-CHIP MEMORY LOCATIONS:

MODE-BITS

DMA-POINTER

DMA-COUNTER

STACK-POINTER—Pointer into Parameter Stack.

STACK-DEPTH—Depth of on-chip Parameter Stack

RSTACK-POINTER—Pointer into Return Stack

RSTACK-DEPTH—Depth of on-chip Return Stack

ADDRESSING MODE HIGH POINTS

The data bus is 32-bits wide. All memory fetches and stores are 32-bits. Memory bus addresses are 30 bits. The least significant 2 bits are used to select one-of-four bytes in some addressing modes. The Program Counter, X Register, and Y Register are implemented as D latches with their outputs going to the memory address bus and the bus incrementer/decrementer. Incrementing one of these registers can happen quickly, because the incremented value has already rippled through the inc/dec logic and need only be clocked into the latch. Branches and Calls are made to 32-bit word boundaries.

INSTRUCTION SET

32-BIT INSTRUCTION FORMAT

The thirty two bit instructions are CALL, BRANCH, BRANCH-IF-ZERO, and LOOP-IF-NOT-DONE. These instructions require the calculation of an effective address. In many computers, the effective address is calculated by adding or subtracting an operand with the current Program Counter. This math operation requires from four to seven machine cycles to perform and can definitely bog down machine execution. The microprocessor's strategy is to perform the required math operation at assembly or linking time and do a much simpler "Increment to next page" or "Decrement to previous page" operation at run time. As a result, the microprocessor branches execute in a single cycle.

24-BIT OPERAND FORM:

Byte 1 Byte 2 Byte 3 Byte 4

WWWWWW XX—YYYYYYYY—YYYYYYYY—YYYYYYYY

With a 24-bit operand, the current page is considered to be defined by the most significant 6 bits of the Program Counter.

16-BIT OPERAND FORM:

QQQQQQQQ—WWWWWW XX—YYYYYYYY—YYYYYYYY

With a 16-bit operand, the current page is considered to be defined by the most significant 14 bits of the Program Counter.

8-BIT OPERAND FORM:

QQQQQQQQ—QQQQQQQQ—WWWWWW XX—YYYYYYYY

With an 8-bit operand, the current page is considered to be defined by the most significant 22 bits of the Program Counter.

QQQQQQQQ—Any 8-bit instruction.
WWWWWW—Instruction op-code.
XX—Select how the address bits will be used:
- 00—Make all high-order bits zero. (Page zero addressing)
- 01—Increment the high-order bits. (Use next page)
- 10—Decrement the high-order bits. (Use previous page)
- 11—Leave the high-order bits unchanged. (Use current page)

YYYYYYYY—The address operand field. This field is always shifted left two bits (to generate a word rather than byte address) and loaded into the Program Counter. The microprocessor instruction decoder figures out the width of the operand field by the location of the instruction op-code in the four bytes.

The compiler or assembler will normally use the shortest operand required to reach the desired address so that the leading bytes can be used to hold other instructions. The effective address is calculated by combining:

The current Program Counter,

The 8, 16, or 24 bit address operand in the instruction,

Using one of the four allowed addressing modes.

EXAMPLES OF EFFECTIVE ADDRESS CALCULATION

EXAMPLE 1 :

| Byte 1 | Byte 2 | Byte 3 | Byte 4 |
|---|---|---|---|
| QQQQQQQQ | QQQQQQQQ | 00000011 | 10011000 |

The "QQQQQQQQs" in Byte 1 and 2 indicate space in the 4-byte memory fetch which could be hold two other instructions to be executed prior to the CALL instruction. Byte 3 indicates a CALL instruction (six zeros) in the current page (indicated by the 11 bits). Byte 4 indicates that the hexadecimal number 98 will be forced into the Program Counter bits 2 through 10. (Remember, a CALL or BRANCH always goes to a word boundary so the two least significant bits are always set to zero). The effect of this instruction would be to CALL a subroutine at WORD location HEX 98 in the current page. The most significant 22 bits of the Program Counter define the current page and will be unchanged.

EXAMPLE 2 :

| Byte 1 | Byte 2 | Byte 3 | Byte 4 |
|---|---|---|---|
| 000001 01 | 00000001 | 00000000 | 00000000 |

If we assume that the Program Counter was HEX 0000 0156 which is binary:

00000000 00000000 00000001 01010110=OLD PROGRAM COUNTER.

Byte 1 indicates a BRANCH instruction op code (000001) and "01" indicates select the next page. Byte 2,3, and 4 are the address operand. These 24-bits will be shifted to the left two places to define a WORD address. HEX 0156 shifted left two places is HEX 0558. Since this is a 24-bit operand instruction, the most significant 6 bits of the Program Counter define the current page. These six bits will be incremented to select the next page. Executing this instruction will cause the Program Counter to be loaded with HEX 0400 0558 which is binary:

00000100 00000000 00000101 01011000 = NEW PROGRAM COUNTER.
INSTRUCTIONS
CALL-LONG
0000 00XXX – YYYYYYYY – YYYYYYYY – YYYYYYYY

Load the Program Counter with the effective WORD address specified. Push the current PC contents onto the RETURN STACK.

OTHER EFFECTS: CARRY or modes, no effect. May cause Return Stack to force an external memory cycle if on-chip Return Stack is full.

BRANCH 0000 01XX—YYYYYYYY—YYYYYYYY—YYYYYYYY

Load the Program Counter with the effective WORD address specified.

OTHER EFFECTS: NONE

BRANCH-IF-ZERO 0000 10XX—YYYYYYYY—YYYYYYYY—YYYYYYYY

Test the TOP value on the Parameter Stack. If the value is equal to zero, load the Program Counter with the effective WORD address specified. If the TOP value is not equal to zero, increment the Program Counter and fetch and execute the next instruction.

OTHER EFFECTS: NONE

LOOP-IF-NOT-DONE 0000 11YY—(XXXX XXXX)—(XXXX XXXX)—(XXXX XXXX)

If the LOOP COUNTER is not zero, load the Program Counter with the effective WORD address specified. If the LOOP COUNTER is zero, decrement the LOOP COUNTER, increment the Program Counter and fetch and execute the next instruction.

OTHER EFFECTS: NONE

8-BIT INSTRUCTIONS PHILOSOPHY

Most of the work in the microprocessor 50 is done by the 8-bit instructions. Eight bit instructions are possible with the microprocessor because of the extensive use of implied stack addressing. Many 32-bit architectures use 8-bits to specify the operation to perform but use an additional 24-bits to specify two sources and a destination.

For math and logic operations, the microprocessor 50 exploits the inherent advantage of a stack by designating the source operand(s) as the top stack item and the next stack item. The math or logic operation is performed, the operands are popped from the stack, and the result is pushed back on the stack. The result is a very efficient utilization of instruction bits as well as registers. A comparable situation exists between Hewlett Packard calculators (which use a stack) and Texas Instrument calculators which don't. The identical operation on an HP will require one half to one third the keystrokes of the TI.

The availability of 8-bit instructions also allows another architectural innovation, the fetching of four instructions in a single 32-bit memory cycle. The advantages of fetching multiple instructions are:

Increased execution speed even with slow memories,

Similar performance to the Harvard (separate data and instruction busses) without the expense, Opportunities to optimize groups of instructions, The capability to perform loops within this mini-cache.

The microloops inside the four instruction group are effective for searches and block moves.

SKIP INSTRUCTIONS

The microprocessor 50 fetches instructions in 32-bit chunks called 4-byte instruction groups. These four bytes may contain four 8-bit instructions or some mix of 8-bit and 16 or 24-bit instructions. SKIP instructions in the microprocessor skip any remaining instructions in a 4-byte instruction group and cause a memory fetch to get the next 4-byte instruction group. Conditional SKIPs when combined with 3-byte BRANCHES will create conditional BRANCHES. SKIPs may also be used in situations when no use can be made of the remaining bytes in a 4-instruction group. A SKIP executes in a single cycle, whereas a group of three NOPs would take three cycles.

SKIP-ALWAYS—Skip any remaining instructions in this 4-byte instruction group. Increment the most significant 30-bits of the Program Counter and proceed to fetch the next 4-byte instruction group.

SKIP-IF-ZERO—If the TOP item of the Parameter Stack is zero, skip any remaining instructions in the 4-byte instruction group. Increment the most significant 30-bits of the Program Counter and proceed to fetch the next 4-byte instruction group. If the TOP item is not zero, execute the next sequential instruction.

SKIP-IF-POSITIVE—If the TOP item of the Parameter Stack has a the most significant bit (the sign bit) equal to "0", skip any remaining instructions in the 4-byte instruction group. Increment the most significant 30-bits of the Program Counter and proceed to fetch the next 4-byte instruction group. If the TOP item is not "0", execute the next sequential instruction.

SKIP-IF-NO-CARRY—If the CARRY flag from a SHIFT or arithmetic operation is not equal to "1", skip any remaining instructions in the 4-byte instruction group. Increment the most significant 30-bits of the Program Counter and proceed to fetch the next 4-byte instruction group. If the CARRY is equal to "1", execute the next sequential instruction.

SKIP-NEVER Execute the next sequential (NOP) instruction. (Delay one machine cycle).

SKIP-IF-NOT-ZERO—If the TOP item on the Parameter Stack is not equal to "0", skip any remaining instructions in the 4-byte instruction group. Increment the most significant 30-bits of the Program Counter and proceed to fetch the next 4-byte instruction group. If the TOP item is equal "0", execute the next sequential instruction.

SKIP-IF-NEGATIVE—If the TOP item on the Parameter Stack has its most significant bit (sign bit) set to "1", skip any remaining instructions in the 4-byte instruction group. Increment the most significant 30-bits of the Program Counter and proceed to fetch the next 4-byte instruction group. If the TOP item has its most significant bit set to "0", execute the next sequential instruction.

SKIP-IF-CARRY—If the CARRY flag is set to "1" as a result of SHIFT or arithmetic operation, skip any remaining instructions in the 4-byte instruction group. Increment the most significant 30-bits of the Program Counter and proceed to fetch the next 4-byte instruction group. If the CARRY flag is "0", execute the next sequential instruction.

MICROLOOPS

Microloops are a unique feature of the microprocessor architecture which allows controlled looping within a 4-byte instruction group. A microloop instruction tests the LOOP COUNTER for "0" and may perform an additional test. If the LOOP COUNTER is not "0" and the test is met, instruction execution continues with the first instruction in the 4-byte instruction group, and the LOOP COUNTER is decremented. A microloop instruction will usually be the last byte in a 4-byte instruction group, but it can be any byte. If the LOOP COUNTER is "0" or the test is not met, instruction execution continues with the next instruction. If the microloop is the last byte in the 4-byte instruction group, the most significant 30-bits of the Program Counter are incremented and the next 4-byte instruction group is fetched from memory. On a termination of the loop on LOOP COUNTER equal to "0", the LOOP COUNTER will remain at "0". Microloops allow short iterative work such as moves and searches to be performed without slowing down to fetch instructions from memory.

EXAMPLE:

Byte 1
FETCH-VIA-X-AUTOINCREMENT

Byte 2
STORE-VIA-Y-AUTOINCREMENT

Byte 3
ULOOP-UNTIL-DONE

Byte 4
QQQQQQQQ

This example will perform a block move. To initiate the transfer, X will be loaded with the starting address of the source. Y will be loaded with the starting address of the destination. The LOOP COUNTER will be loaded with the number of 32-bit words to move. The microloop will FETCH and STORE and count down the LOOP COUNTER until it reaches zero. QQQQQQQQ indicates any instruction can follow.

MICROLOOP INSTRUCTIONS

ULOOP-UNTIL-DONE—If the LOOP COUNTER is not "0", continue execution with the first instruction in the 4-byte instruction group. Decrement the LOOP COUNTER. If the LOOP COUNTER is "0", continue execution with the next instruction.

ULOOP-IF-ZERO—If the LOOP COUNTER is not "0" and the TOP item on the Parameter Stack is "0", continue execution with the first instruction in the 4-byte instruction group. Decrement the LOOP COUNTER. If the LOOP COUNTER is "0" or the TOP item is "1", continue execution with the next instruction.

ULOOP-IF-POSITIVE—If the LOOP COUNTER is not "0" and the most significant bit (sign bit) is "0", continue execution with the first instruction in the 4-byte instruction group. Decrement the LOOP COUNTER. If the LOOP COUNTER is "0" or the TOP item is "1", continue execution with the next instruction.

ULOOP-IF-NOT-CARRY-CLEAR—If the LOOP COUNTER is not "0" and the floating point exponents found in TOP and NEXT are not aligned, continue execution with the first instruction in the 4-byte instruction group. Decrement the LOOP COUNTER. If the LOOP COUNTER is "0" or the exponents are aligned, continue execution with the next instruction. This instruction is specifically designed for combination with special SHIFT instructions to align two floating point numbers.

ULOOP-NEVER—(DECREMENT-LOOP-COUNTER) Decrement the LOOP COUNTER. Continue execution with the next instruction.

ULOOP-IF-NOT-ZERO—If the LOOP COUNTER is not "0" and the TOP item of the Parameter Stack is "0", continue execution with the first instruction in the 4-byte instruction group. Decrement the LOOP COUNTER. If the LOOP COUNTER is "0" or the TOP item is "1", continue execution with the next instruction.

ULOOP-IF-NEGATIVE—If the LOOP COUNTER is not "0" and the most significant bit (sign bit) of the TOP item of the Parameter Stack is "1", continue execution with the first instruction in the 4-byte instruction group. Decrement the LOOP COUNTER. If the LOOP COUNTER is "0" or the most significant bit of the Parameter Stack is "0", continue execution with the next instruction.

ULOOP-IF-CARRY-SET—If the LOOP COUNTER is not "0" and the exponents of the floating point numbers found in TOP and NEXT are not aligned, continue execution with the first instruction in the 4-byte instruction group. Decrement the LOOP COUNTER. If the LOOP COUNTER is "0" or the exponents are aligned, continue execution with the next instruction.

RETURN FROM SUBROUTINE OR INTERRUPT

Subroutine calls and interrupt acknowledgements cause a redirection of normal program execution. In both cases, the current Program Counter is pushed onto the Return Stack, so the microprocessor can return to its place in the program after executing the subroutine or interrupt service routine.

NOTE: When a CALL to subroutine or interrupt is acknowledged the Program Counter has already been incremented and is pointing to the 4-byte instruction group following the 4-byte group currently being executed. The instruction decoding logic allows the microprocessor to perform a test and execute a return conditional on the outcome of the test in a single cycle. A RETURN pops an address from the Return Stack and stores it to the Program Counter.

RETURN INSTRUCTIONS

RETURN-ALWAYS—Pop the top item from the Return Stack and transfer it to the Program Counter.

RETURN-IF-ZERO—If the TOP item on the Parameter Stack is "0", pop the top item from the Return Stack and transfer it to the Program Counter. Otherwise execute the next instruction.

RETURN-IF-POSITIVE—If the most significant bit (sign bit) of the TOP item on the Parameter Stack is a "0", pop the top item from the Return Stack and transfer it to the Program Counter. Otherwise execute the next instruction.

RETURN-IF-CARRY-CLEAR—If the exponents of the floating point numbers found in TOP and NEXT are not aligned, pop the top item from the Return Stack and transfer it to the Program Counter. Otherwise execute the next instruction.

RETURN-NEVER—Execute the next instruction. (NOP)

RETURN-IF-NOT-ZERO—If the TOP item on the Parameter Stack is not "0", pop the top item from the Return Stack and transfer it to the Program Counter. Otherwise execute the next instruction.

RETURN-IF-NEGATIVE—If the most significant bit (sign bit) of the TOP item on the Parameter Stack is a "1", pop the top item from the Return Stack and transfer it to the Program Counter. Otherwise execute the next instruction.

RETURN-IF-CARRY-SET—If the exponents of the floating point numbers found in TOP and NEXT are aligned, pop the top item from the Return Stack and transfer it to the Program Counter. Otherwise execute the next instruction.

HANDLING MEMORY FROM DYNAMIC RAM

The microprocessor 50, like any RISC type architecture, is optimized to handle as many operations as possible on-chip for maximum speed. External memory operations take from 80 nsec. to 220 nsec. compared with on-chip memory speeds of from 4 nsec. to 30 nsec. There are times when external memory must be accessed.

External memory is accessed using three registers:

X-REGISTER—A 30-bit memory pointer which can be used for memory access and simultaneously incremented or decremented.

Y-REGISTER—A 30-bit memory pointer which can be used for memory access and simultaneously incremented or decremented.

PROGRAM-COUNTER—A 30-bit memory pointer normally used to point to 4-byte instruction groups. External memory may be accessed at addresses relative to the PC. The operands are sometimes called "Immediate" or "Literal" in other computers. When used as memory pointer, the PC is also incremented after each operation.

MEMORY LOAD & STORE INSTRUCTIONS

FETCH-VIA-X—Fetch the 32-bit memory content pointed to by X and push it onto the Parameter Stack. X is unchanged.

FETCH-VIA-Y—Fetch the 32-bit memory content pointed to by X and push it onto the Parameter Stack. Y is unchanged.

FETCH-VIA-X-AUTOINCREMENT—Fetch the 32-bit memory content pointed to by X and push it onto the Parameter Stack. After fetching, increment the most significant 30 bits of X to point to the next 32-bit word address.

FETCH-VIA-Y-AUTOINCREMENT—Fetch the 32-bit memory content pointed to by Y and push it onto the Parameter Stack. After fetching, increment the most significant 30 bits of Y to point to the next 32-bit word address.

FETCH-VIA-X-AUTODECREMENT—Fetch the 32-bit memory content pointed to by X and push it onto the Parameter Stack. After fetching, decrement the most significant 30 bits of X to point to the previous 32-bit word address.

FETCH-VIA-Y-AUTODECREMENT—Fetch the 32-bit memory content pointed to by Y and push it onto the Parameter Stack. After fetching, decrement the most significant 30 bits of Y to point to the previous 32-bit word address.

STORE-VIA-X—Pop the top item of the Parameter Stack and store it in the memory location pointed to by X. X is unchanged.

STORE-VIA-Y—Pop the top item of the Parameter Stack and store it in the memory location pointed to by Y. Y is unchanged.

STORE-VIA-X-AUTOINCREMENT—Pop the top item of the Parameter Stack and store it in the memory location pointed to by X. After storing, increment the most significant 30 bits of X to point to the next 32-bit word address.

STORE-VIA-Y-AUTOINCREMENT—Pop the top item of the Parameter Stack and store it in the memory location pointed to by Y. After storing, increment the most significant 30 bits of Y to point to the next 32-bit word address.

STORE-VIA-X-AUTODECREMENT—Pop the top item of the Parameter Stack and store it in the memory location pointed to by X. After storing, decrement the most significant 30 bits of X to point to the previous 32-bit word address.

STORE-VIA-Y-AUTODECREMENT—Pop the top item of the Parameter Stack and store it in the memory location pointed to by Y. After storing, decrement the most significant 30 bits of Y to point to the previous 32-bit word address.

FETCH-VIA-PC—Fetch the 32-bit memory content pointed to by the Program Counter and push it onto the Parameter Stack. After fetching, increment the most significant 30 bits of the Program Counter to point to the next 32-bit word address.

*NOTE When this instruction executes, the PC is pointing to the memory location following the instruction. The effect is of loading a 32-bit immediate operand. This is an 8-bit instruction and therefore will be combined with other 8-bit instructions in a 4-byte instruction fetch. It is possible to have from one to four FETCH-VIA-PC instructions in a 4-byte instruction fetch. The PC increments after each execution of FETCH-VIA-PC, so it is possible to push four immediate operands on the stack. The four operands would be the found in the four memory locations following the instruction.

BYTE-FETCH-VIA-X—Fetch the 32-bit memory content pointed to by the most significant 30 bits of X. Using the two least significant bits of X, select one of four bytes from the 32-bit memory fetch, right justify the byte in a 32-bit field and push the selected byte preceded by leading zeros onto the Parameter Stack.

BYTE-STORE-VIA-X—Fetch the 32-bit memory content pointed to by the most significant 30 bits of X. Pop the TOP item from the Parameter Stack.

Using the two least significant bits of X place the least significant byte into the 32-bit memory data and write the 32-bit entity back to the location pointed to by the most significant 30 bits of X.

OTHER EFFECTS OF MEMORY ACCESS INSTRUCTIONS:

Any FETCH instruction will push a value on the Parameter Stack 74. If the on-chip stack is full, the stack will overflow into off-chip memory stack resulting in an additional memory cycle. Any STORE instruction will pop a value from the Parameter Stack 74. If the on-chip stack is empty, a memory cycle will be generated to fetch a value from off-chip memory stack.

HANDLING ON-CHIP VARIABLES

High-level languages often allow the creation of LOCAL VARIABLES. These variables are used by a particular procedure and discarded. In cases of nested procedures, layers of these variables must be maintained. On-chip storage is up to five times faster than off-chip RAM, so a means of keeping local variables on-chip can make operations run faster. The microprocessor 50 provides the capability for both on-chip storage of local variables and nesting of multiple levels of variables through the Return Stack.

The Return Stack 134 is implemented as 16 on-chip RAM locations. The most common use for the Return Stack 134 is storage of return addresses from subroutines and interrupt calls. The microprocessor allows these 16 locations to also be used as addressable registers. The 16 locations may be read and written by two instructions which indicate a Return Stack relative address from 0–15. When high-level procedures are nested, the current procedure variables push the previous procedure variables further down the Return Stack 134. Eventually, the Return Stack will automatically overflow into off-chip RAM.

ON-CHIP VARIABLE INSTRUCTIONS

READ-LOCAL-VARIABLE XXXX—Read the XXXXth location relative to the top of the Return Stack. (XXXX is a binary number from 0000–1111). Push the item read onto the Parameter Stack.

OTHER EFFECTS: If the Parameter Stack is full, the push operation will cause a memory cycle to be generated as one item of the stack is automatically stored to external RAM. The logic which selects the location performs a modulo 16 subtraction. If four local variables have been pushed onto the Return Stack, and an instruction attempts to READ the fifth item, unknown data will be returned.

WRITE-LOCAL-VARIABLE XXXX—Pop the TOP item of the Parameter Stack and write it into the XXXXth location relative to the top of the Return Stack. (XXXX is a binary number from 0000–1111.)

OTHER EFFECTS: If the Parameter Stack is empty, the pop operation will cause a memory cycle to be generated to fetch the Parameter Stack item from external RAM. The logic which selects the location performs a modulo 16 subtraction. If four local variables have been pushed onto the Return Stack, and an instruction attempts to WRITE to the fifth item, it is possible to clobber return addresses or wreak other havoc.

REGISTER AND FLIP-FLOP TRANSFER AND PUSH INSTRUCTIONS

DROP—Pop the TOP item from the Parameter Stack and discard it.

SWAP—Exchange the data in the TOP Parameter Stack location with the data in the NEXT Parameter Stack location.

DUP—Duplicate the TOP item on the Parameter Stack and push it onto the Parameter Stack.

PUSH-LOOP-COUNTER—Push the value in LOOP COUNTER onto the Parameter Stack.

POP-RSTACK-PUSH-TO-STACK—Pop the top item from the Return Stack and push it onto the Parameter Stack.

PUSH-X-REG—Push the value in the X Register onto the Parameter Stack.

PUSH-STACK-POINTER—Push the value of the Parameter Stack pointer onto the Parameter Stack.

PUSH-RSTACK-POINTER—Push the value of the Return Stack pointer onto the Return Stack.

PUSH-MODE-BITS—Push the value of the MODE REGISTER onto the Parameter Stack.

PUSH-INPUT—Read the 10 dedicated input bits and push the value (right justified and padded with leading zeros) onto the Parameter Stack.

SET-LOOP-COUNTER—Pop the TOP value from the Parameter Stack and store it into LOOP COUNTER.

POP-STACK-PUSH-TO-RSTACK—Pop the TOP item from the Parameter Stack and push it onto the Return Stack.

SET-X-REG—Pop the TOP item from the Parameter Stack and store it into the X Register.

SET-STACK-POINTER—Pop the TOP item from the Parameter Stack and store it into the Stack Pointer.

SET-RSTACK-POINTER—Pop the TOP item from the Parameter Stack and store it into the Return Stack Pointer.

SET-MODE-BITS—Pop the TOP value from the Parameter Stack and store it into the MODE BITS.

SET-OUTPUT—Pop the TOP item from the Parameter Stack and output it to the 10 dedicated output bits.

OTHER EFFECTS: Instructions which push or pop the Parameter Stack or Return Stack may cause a memory cycle as the stacks overflow back and forth between on-chip and off-chip memory.

LOADING A SHORT LITERAL

A special case of register transfer instruction is used to push an 8-bit literal onto the Parameter Stack. This instruction requires that the 8-bits to be pushed reside in the last byte of a 4-byte instruction group. The instruction op-code loading the literal may reside in ANY of the other three bytes in the instruction group.

EXAMPLE:

| BYTE 1 | BYTE 2 | BYTE 3 |
|---|---|---|
| LOAD-SHORT-LITERAL | QQQQQQQQ | QQQQQQQQ |
| BYTE 4 | | |
| 00001111 | | |

In this example, QQQQQQQQ indicates any other 8-bit instruction. When Byte 1 is executed, binary 00001111 (HEX 0f) from Byte 4 will be pushed (right justified and padded by leading zeros) onto the Parameter Stack. Then the instructions in Byte 2 and Byte 3 will execute. The microprocessor instruction decoder knows not to execute Byte 4. It is possible to push three identical 8-bit values as follows:

| BYTE 1 | BYTE 2 |
|---|---|
| LOAD-SHORT-LITERAL | LOAD-SHORT-LITERAL |
| BYTE 3 | BYTE 4 |
| LOAD-SHORT-LITERAL | 00001111 |

SHORT-LITERAL-INSTRUCTION
LOAD-SHORT-LITERAL—Push the 8-bit value found in Byte 4 of the current 4-byte instruction group onto the Parameter Stack.
LOGIC INSTRUCTIONS
Logical and math operations use the stack for the source of one or two operands and as the destination for results. The stack organization is a particularly convenient arrangement for evaluating expressions. TOP indicates the top value on the Parameter Stack 74. NEXT indicates the next to top value on the Parameter Stack 74.
AND—Pop TOP and NEXT from the Parameter Stack, perform the logical AND operation on these two operands, and push the result onto the Parameter Stack.
OR—Pop TOP and NEXT from the Parameter Stack, perform the logical OR operation on these two operands, and push the result onto the Parameter Stack.
XOR—Pop TOP and NEXT from the Parameter Stack, perform the logical exclusive OR on these two operands, and push the result onto the Parameter Stack.
BIT-CLEAR—Pop TOP and NEXT from the Parameter Stack, toggle all bits in NEXT, perform the logical AND operation on TOP, and push the result onto the Parameter Stack. (Another way of understanding this instruction is thinking of it as clearing all bits in TOP that are set in NEXT.)
MATH INSTRUCTIONS
Math instruction pop the TOP item and NEXT to top item of the Parameter Stack 74 to use as the operands. The results are pushed back on the Parameter Stack. The CARRY flag is used to latch the "33rd bit" of the ALU result.
ADD—Pop the TOP item and NEXT to top item from the Parameter Stack, add the values together and push the result back on the Parameter Stack. The CARRY flag may be changed.
ADD-WITH-CARRY—Pop the TOP item and the NEXT to top item from the Parameter. Stack, add the values together. If the CARRY flag is "1" increment the result. Push the ultimate result back on the Parameter Stack. The CARRY flag may be changed.
ADD-X—Pop the TOP item from the Parameter Stack and read the third item from the top of the Parameter Stack. Add the values together and push the result back on the Parameter Stack. The CARRY flag may be changed.
SUB—Pop the TOP item and NEXT to top item from the Parameter Stack. Subtract NEXT from TOP and push the result back on the Parameter Stack. The CARRY flag may be changed.
SUB-WITH-CARRY—Pop the TOP item and NEXT to top item from the Parameter Stack. Subtract NEXT from TOP. If the CARRY flag is "1" increment the result. Push the ultimate result back on the Parameter Stack. The CARRY flag may be changed.
SUB-X—
SIGNED-MULT-STEP—
UNSIGNED-MULT-STEP SIGNED-FAST-MULT—
FAST-MULT-STEP—
UNSIGNED-DIV-STEP—
GENERATE-POLYNOMIAL—
ROUND—
COMPARE—Pop the TOP item and NEXT to top item from the Parameter Stack. Subtract NEXT from TOP. If the result has the most significant bit equal to "0" (the result is positive), push the result onto the Parameter Stack. If the result has the most significant bit equal to "1" (the result is negative), push the old value of TOP onto the Parameter Stack. The CARRY flag may be affected.
SHIFT/ROTATE
SHIFT-LEFT—Shift the TOP Parameter Stack item left one bit. The CARRY flag is shifted into the least significant bit of TOP.
SHIFT-RIGHT—Shift the TOP Parameter Stack item right one bit. The least significant bit of TOP is shifted into the CARRY flag. Zero is shifted into the most significant bit of TOP.
DOUBLE-SHIFT-LEFT—Treating the TOP item of the Parameter Stack as the most significant word of a 64-bit number and the NEXT stack item as the least significant word, shift the combined 64-bit entity left one bit. The CARRY flag is shifted into the least significant bit of NEXT.
DOUBLE-SHIFT-RIGHT—Treating the TOP item of the Parameter Stack as the most significant word of a 64-bit number and the NEXT stack item as the least significant word, shift the combined 64-bit entity right one bit. The least significant bit of NEXT is shifted into the CARRY flag. Zero is shifted into the most significant bit of TOP.
OTHER INSTRUCTIONS
FLUSH-STACK—Empty all on-chip Parameter Stack locations into off-chip RAM. (This instruction is useful for multitasking applications). This instruction accesses a counter which holds the depth of the on-chip stack and can require from none to 16 external memory cycles.
FLUSH-RSTACK—Empty all on-chip Return Stack locations into off-chip RAM. (This instruction is useful for multitasking applications). This instruction accesses a counter which holds the depth of the on-chip Return Stack and can require from none to 16 external memory cycles.

It should further be apparent to those skilled in the art that various changes in form and details of the invention as shown and described may be made. It is intended that such changes be included within the spirit and scope of the claims appended hereto.

What is claimed is:
1. A microprocessor system comprising:
a central processing unit;
memory;
a bus connecting said central processing unit to said memory;
instruction fetching means that are connected to said bus to fetch instruction groups via said bus from said memory, certain of said instruction groups including at least one instruction that, when executed, causes an access to an operand or an instruction or both, said operand or instruction being located a predetermined position from a boundary of said instruction groups;

an instruction register for receiving sequential instructions from a first of said instruction groups from said instruction fetching means, said first of said instruction groups including said at least one instruction;

instruction decoding means having means for generating a counter control signal and an operand control signal;

a counter that is connected to receive said counter control signal from said instruction decoding means;

operand selection means that is responsive to said operand control signal from said instruction decoding means;

instruction supplying means, responsive to said counter to select said predetermined position, for supplying, in succession from said instruction register, said sequential instructions to said central processing unit;

said instruction supplying means being further responsive to said counter and said operand selection means for selecting and supplying operand from said predetermined position in said instruction groups to said central processing unit:

said instruction decoding means providing said counter control signal and said operand control signal to cause said instruction supplying means to select from said instruction groups said operand or instruction or both associated with one of said instructions from said first of said instruction groups.

2. The microprocessor system of claim 1 wherein said instruction decoding means further includes means, responsive to a SKIP instruction in said instruction register, for configuring said instruction fetching means such that the next instruction group is supplied to the instruction register, and for configuring said instruction supplying means to supply in succession from said instruction register, said sequential instructions, beginning with the first instruction in said instruction register from said next instruction group, to said central processing unit, and in which said means for generating counter control signal, also in response to the SKIP instruction, supplies the counter control signal to reset said counter to zero.

3. The microprocessor system of claim 2 further comprising:

means for determining whether a predefined condition exists within said microprocessor system, and means for controlling response of said instruction decoding means to said SKIP instruction and said predefined condition to execute or not execute said SKIP instruction based on existence of said predefined condition.

4. The microprocessor system of claim 1 further comprising:

a loop counter that is connected to receive a decrement control signal from said instruction decoding means, said instruction decoding means further including means, responsive to a MICROLOOP instruction in said instruction register, configured to supply said decrement control signal to said loop counter, said instruction supplying means being configured to supply from said instruction register beginning with the first instruction in said instruction register, from said first of said instruction groups, to said central processing unit, and in which said means for generating the counter control signal, also in response to the MICROLOOP instruction, supplies the counter control signal for resetting said counter to zero.

5. The microprocessor system of claim 4 further comprising:

means for determining whether a predefined condition exists within said microprocessor system, and means for controlling response of said instruction decoding means to said MICROLOOP instruction and said predefined condition to execute or not execute said MICROLOOP instruction based on existence of said predefined condition.

6. The microprocessor system of claim 1 wherein said instruction decoding means includes means for supplying control signals to said instruction fetching means such that a subsequent one of said instruction groups is supplied to said instruction register, and for configuring said instruction supplying means to supply to said central processing unit a remainder of said first of said instruction groups as said operand.

7. The microprocessor system of claim 6 wherein said instruction decoding means are configured to supply control signals to said instruction fetching means such that a subsequent one of said instruction groups supplied to said instruction register is determined in response to a branch-type instruction in said sequential instructions within said first of said instruction groups.

8. The microprocessor system of claim 1 wherein said instruction decoding means configures said instruction supplying means to supply to said central processing unit a last byte of said first of said instruction groups as said operand in response to one of said sequential instructions within said first of said instruction groups.

9. The microprocessor system of claim 1 wherein said instruction decoding means are configured to supply control signals to said instruction fetching means such that a subsequent one of said instruction groups is supplied as an operand in response to one of said sequential instructions within said first of said instruction groups.

10. The microprocessor system of claim 1 wherein said instruction decoding means are configured to supply control signals to said instruction fetching means such that a subsequent one of said instruction groups supplied to said instruction register is determined in response to a branch-type instruction in said sequential instructions within said first of said instruction groups.

11. The microprocessor system of claim 10 in which said instruction decoding means supplies said counter control signal to reset said counter in response to a branch-type instruction in said sequential instructions within said first of said instruction groups.

12. The microprocessor system of claim 10 further comprising means for determining whether a predefined condition exists within said microprocessor system, and means for controlling response of said instruction decoding means to said branch-type instruction and said predefined condition to execute or not execute said branch-type instruction based on existence of said predefined condition.

13. The microprocessor system of claim 10 in which said instruction supplying means includes means for gating said sequential instructions within said instruction register to said central processing unit based on signals produced by said counter.

14. The microprocessor system of claim 1 wherein said instruction fetching means fetches said sequential instructions in parallel for each of said instruction groups in a single memory cycle.

15. The microprocessor system of claim 1 further comprising:

memory access testing means for testing said first of said instruction groups to determine if said sequential instructions require a memory access; and if said memory access testing means determine a memory access is not required, then supplying of control signals to said instruction fetching means to fetch the next instruction group during the execution of a current of said instruction groups.

16. The microprocessor of claim 1 wherein said instruction supplying means includes:
   a decoder connected to an output of said counter, and
   a plurality of gates interposed between said instruction register and said central processing unit, said gates being controlled by signals from said decoder.

17. The microprocessor of claim 1 wherein said instruction decoding means includes means for determining a width of said operand, said width being related to position in said instruction register of said one of said instructions of said first of said instruction groups.

18. The microprocessor of claim 1 wherein said first of said instruction groups includes a first instruction and multiple operand bytes, said instruction decoding means including means for determining a width of said operand associated with said first instruction based on position of said first instruction within said instruction register.

19. The microprocessor of claim 18 wherein said instruction supplying means includes gating means for selecting one or more of said multiple operand bytes within said instruction register corresponding to said operand.

20. A microprocessor comprising;
   a central processing unit;
   an instruction register operatively coupled to said central processing unit;
   instruction fetching means for providing sequential instructions within instruction groups to said instruction register wherein certain of said instruction groups include at least one instruction that, when executed, causes an access to an operand or an instruction or both, said operand or instruction being located at a predetermined position from a boundary of said instruction groups;
   instruction decoding means having a means for generating a counter control signal and an operand control signal;
   a counter that is connected to receive said counter control signal from said instruction decoding means;
   operand selection means that is responsive to said operand control signal from said instruction decoding means;
   instruction supplying means, responsive to said counter to select said predetermined position, for successively coupling said sequential instructions of said certain of said instruction groups to said central processing unit;
   said instruction supplying means being further responsive to said counter and said operand selection means for selection and supplying operands from said predetermined position in said instruction groups to said central processing unit; and
   said instruction decoding means providing said counter control signal and said operand control signal to cause said instruction supplying means to select from said instruction groups said operand or instruction or both associated with particular ones of said sequential instructions.

21. The microprocessor of claim 20 wherein said instruction decoding means, upon receiving a SKIP one of said sequential instructions from a current one of said instruction groups, configures said instruction fetching means to fetch a next one of said instruction groups to said instruction register, supplies the counter control signal to reset said counter to zero and configures said instruction supplying means to supply a first one of said sequential instructions.

22. The microprocessor of claim 21 further including means for determining whether a predefined condition exists within said microprocessor system, and
   means for controlling response of said instruction decoding means to said SKIP instruction and said predefined condition to execute or not execute said SKIP instruction based on existence of said predefined condition.

23. The microprocessor of claim 20 further comprising a loop counter, said instruction decoding means, responsive to a MICROLOOP instruction within said instruction register, providing a decrement signal to said loop counter and priding the counter control signal to reset said counter to zero, and said instruction supplying means being configured to supply from said instruction register said sequential instructions, beginning with the first instruction in said instruction register, from a current one of said instruction groups, to said central processing unit.

24. The microprocessor of claim 23 further comprising:
   means for determining whether a predefined condition exists within said microprocessor system, and
   means for controlling response of said instruction decoding means to said MICROLOOP instruction and said predefined condition to execute or not execute said MICROLOOP instruction based on existence of said predefined condition.

25. The microprocessor of claim 20 wherein said instruction decoding means includes means, responsive to ones of said sequential instructions of predetermined type, for supplying control signals to said instruction fetching means such that a subsequent one of said instruction groups is provided to said instruction register.

26. The microprocessor of claim 25 wherein said instruction decoding means includes means for configuring said instruction supplying means to supply a remainder of a current one of said instruction groups within said instruction register as said operand to said central processing unit.

27. The microprocessor of claim 25 further comprising means for determining whether a predefined condition exists within said microprocessor system, and means for controlling response of said instruction decoding means to branch-type ones of said instructions and said predefined condition to execute or not execute said branch-type ones of said instructions based on existence of said predefined condition.

28. The microprocessor of claim 20 wherein said instruction decoding means are configured to supply control signals to said instruction fetching means such that a subsequent one of said instruction groups is supplied as an operand in response to one of said sequential instructions.

29. In a microprocessor system including a central processing unit, memory, and an instruction register, a method for providing instructions and operands from said memory to said central processing unit comprising the steps of:
   providing instruction groups to said instruction register from said memory wherein certain of said instruction groups include at least one instruction that, when executed, causes an access to an operand or an instruction or both, said operand or instruction being located at a predetermined position from a boundary of said instruction groups;
   decoding said at least one instruction to determine said predetermined position;
   locating said predetermined position; and
   supplying, from said instruction groups, using the predetermined location, said operand or instruction or both to said central processing unit.

* * * * *

(12) EX PARTE REEXAMINATION CERTIFICATE (6943rd)

United States Patent
Moore et al.

(10) Number: US 5,784,584 C1
(45) Certificate Issued: Jul. 21, 2009

(54) HIGH PERFORMANCE MICROPROCESSOR USING INSTRUCTIONS THAT OPERATE WITHIN INSTRUCTION GROUPS

(75) Inventors: Charles H. Moore, Woodside, CA (US); Russell H. Fish, III, Mt. View, CA (US)

(73) Assignee: Technology Properties Limited, San Jose, CA (US)

Reexamination Request:
No. 90/008,299, Oct. 19, 2006
No. 90/008,225, Nov. 15, 2006

Reexamination Certificate for:
Patent No.: 5,784,584
Issued: Jul. 21, 1998
Appl. No.: 08/484,935
Filed: Jun. 7, 1995

Related U.S. Application Data

(62) Division of application No. 07/389,334, filed on Aug. 3, 1989, now Pat. No. 5,440,749.

(51) Int. Cl.
*G06F 9/30* (2006.01)
*G06F 12/08* (2006.01)
*G06F 7/78* (2006.01)
*G06F 9/32* (2006.01)
*G06F 7/48* (2006.01)

(52) U.S. Cl. ............. 712/200; 711/E12.02; 712/E9.016; 712/E9.028; 712/E9.046; 712/E9.055; 712/E9.057; 712/E9.058; 712/E9.062; 712/E9.078; 712/E9.08; 712/E9.081

(58) Field of Classification Search .................. 712/200, 712/227, 237, 230
See application file for complete search history.

(56) References Cited

U.S. PATENT DOCUMENTS

| | | |
|---|---|---|
| 3,919,695 A | 11/1975 | Gooding |
| 3,976,977 A | 8/1976 | Porter et al. |
| 4,037,090 A | 7/1977 | Raymond, Jr. |
| 4,079,338 A | 3/1978 | Kronlage |
| 4,223,380 A | 9/1980 | Antonaccio et al. |
| 4,295,193 A | 10/1981 | Pomerene |
| 4,334,268 A | 6/1982 | Boney et al. |
| 4,348,743 A | 9/1982 | Dozier |
| 4,390,946 A | 6/1983 | Lane |
| 4,402,042 A | 8/1983 | Guttag |
| 4,453,229 A | 6/1984 | Schaire |
| 4,462,073 A | 7/1984 | Grondalski |
| 4,494,021 A | 1/1985 | Bell et al. |

(Continued)

FOREIGN PATENT DOCUMENTS

| | | |
|---|---|---|
| EP | 113 516 B1 | 6/1988 |
| JP | 58-25710 A | 2/1983 |
| JP | 61-127228 A | 6/1984 |
| JP | 61-138356 A | 6/1986 |

OTHER PUBLICATIONS

Computers Information Processing and Communications, Jerry M. Rosenberg, 1987.*

(Continued)

*Primary Examiner*—Maijd A. Banankhah

(57) ABSTRACT

A high-performance microprocessor system using instruction that access operands and instructions located relative to the current instruction group rather than located relative to the current instructions, as is the convention, is disclosed herein. The microprocessor system includes a central processing unit, memory, and a bus connecting the central processing unit and memory. An instruction fetching unit, connected to the bus, is provided for fetching instruction groups from the memory for use by the central processing unit and for storage within an instruction register. An instruction supplying unit operates to supply, in succession from the instruction register to the central processing unit, one or more instructions from each of the instruction groups. The system further includes an instruction decoder for configuring the instruction supplying unit to select, from the instruction register, operands associated with instructions from particular instruction groups.

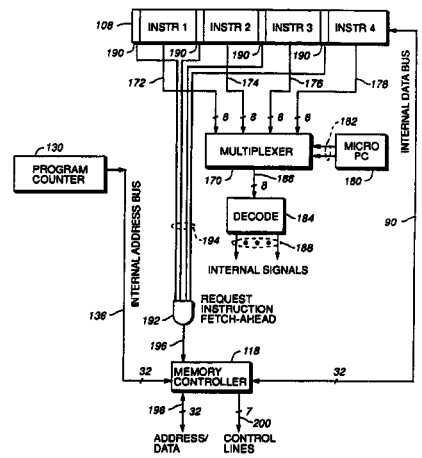

U.S. PATENT DOCUMENTS

| | | |
|---|---|---|
| 4,503,500 A | 3/1985 | Magar |
| 4,660,155 A | 4/1987 | Thaden et al. |
| 4,680,698 A | 7/1987 | Edwards et al. |
| 4,689,581 A | 8/1987 | Talbot |
| 4,691,124 A | 9/1987 | Ledzius et al. |
| 4,704,678 A | 11/1987 | May |
| 4,710,648 A | 12/1987 | Hanamura et al. |
| 4,713,749 A * | 12/1987 | Magar et al. ............... 712/241 |
| 4,718,081 A | 1/1988 | Brenig |
| 4,724,517 A | 2/1988 | May |
| 4,750,111 A | 6/1988 | Crosby, Jr. et al. |
| 4,758,948 A | 7/1988 | May et al. |
| 4,763,297 A | 8/1988 | Uhlenhoff |
| 4,766,567 A | 8/1988 | Kato |
| 4,783,734 A | 11/1988 | May et al. |
| 4,794,526 A | 12/1988 | May et al. |
| 4,816,996 A | 3/1989 | Hill et al. |
| 4,819,151 A | 4/1989 | May |
| 4,833,599 A | 5/1989 | Colwell et al. |
| 4,872,003 A | 10/1989 | Yoshida |
| 4,899,275 A | 2/1990 | Sachs et al. |
| 4,926,323 A | 5/1990 | Baror et al. |
| 4,931,748 A | 6/1990 | McDermott et al. |
| 4,933,835 A | 6/1990 | Sachs et al. |
| 4,967,326 A | 10/1990 | May |
| 4,980,821 A | 12/1990 | Koopman et al. |
| 4,989,133 A | 1/1991 | May et al. |
| 5,031,092 A | 7/1991 | Edwards et al. |
| 5,091,846 A | 2/1992 | Sachs et al. |
| 5,121,502 A | 6/1992 | Rau et al. |
| 5,127,091 A | 6/1992 | Boufarah et al. |
| 5,127,092 A | 6/1992 | Gupta et al. |
| 5,133,064 A | 7/1992 | Hotta et al. |
| 5,237,699 A | 8/1993 | Little et al. |
| 5,241,636 A | 8/1993 | Kohn |
| 5,440,749 A | 8/1995 | Moore et al. |
| 5,784,584 A | 7/1998 | Moore et al. |
| 5,809,336 A | 9/1998 | Moore et al. |
| 6,598,148 B1 | 7/2003 | Moore et al. |

OTHER PUBLICATIONS

TPL Web Site, www.tplgroup.net/patents/index.php, Aug. 3, 2006 (3 pgs.).

Claim Chart Provided by Alleged Patent Owner in part Techology Properties, Ltd. Pursuant to Local Rules of the Fed. Dist. Ct. of East Dist. of Texas, 2006 (8 pgs.).

U.S. Appl. No. 08/484,935, Amendment of Jun. 12, 1997 (14 pgs.).

May 9, 2008 Federal Circuit Court Decision on TPL Appeal of Decision in case No. 2:05–CV–494.

Memorandum Opinion and Order filed Jun. 15, 2007 in 2:05–CV–494 (TJW).

Plaintiff's Technology Property Limited's and Patriot Scientific Corporation's Claim Construction Brief filed Mar. 19, 2007 in 2:05–CV–494 (TJW).

Defendants' Brief Regarding Construction of Disputed Claim Terms of the 336 and 148 Patents filed Apr. 2, 2007 in 2:05–CV–494 (TJW).

Defendants' Brief Regarding Construction of Disputed Claim Terms of the 584 Patent filed Apr. 2, 2007 in 2:05–CV–494 (TJW).

Plaintiffs' Claim Construction Reply Brief filed Apr. 9, 2007 in 2:05–CV–494 (TJW).

Defendants' Unopposed Motion for Leave to File a Sur–Reply Brief Regarding Claim Construction filed Apr. 19, 2007 in 2:05–CV–494 (TJW).

Defendants' Sur–Reply Brief Regarding Construction of Disputed Claim Terms of the 336 Patent filed Apr. 29, 2007 in 2:05–CV–494 (TJW).

Declaration of Roger L. Cook in Support of Plaintiffs Technology Property Limited's and Patriot Scientific Corporation's Claim Construction Brief filed Mar. 19, 2007 in 2:05–CV–00494 (TJW).

Supplemental Declaration of Roger L. Cook in Support of Plaintiffs Technology Property Limited's and Patriot Scientific Corporation's Claim Construction Brief filed Apr. 9, 2007 in 2:05–CV–00494 (TJW).

Declaration of David J. Lender filed Apr. 2, 2007 in 2:05–CV–00494 (TJW).

Supplemental Declaration of Alvin M. Despain in Support of Plaintiff's Reply Claim Construction Brief filed Apr. 9, 2007 in 2:05–CV–00494 (TJW).

Declaration of Alvin M. Despain in Support of Plaintiffs' Claim Construction Brief filed Mar. 19, 2007 in 2:05–CV–0049 (TJW).

IBM Systems Reference Library, IBM System/360 Model 67 Functional Characteristics, File No. S360–01, Form A27–2719–0, published by IBM (1967).

GE–625 / 635 Programming Reference Manual, revised Jan. 1966.

Clipper™ 32–Bit Microprocessor, Introductions to the Cliper Architecture, published by Fairchild in 1986.

M68300 Family MC68332 User's Manual, published by Motorola, Inc. in 1985.

Ditzel et al., "The Hardware Architecture of the Crisp Microprocessor," AT & T Information Systems, ACM, pp. 309–319 and table of contents (1987).

i–860 64–Bit Microprocessor, published by Intel Corporation Feb. 1989.

Rau et al., "The Cydra 5 Departmental Supercomputer, Design Philosophies, Decisions, and Trade–offs," *IEEE*, pp. 12–36 (1989).

Datasheet for Intel4004 Single Chip 4–Bit 9–Channel Microprocessor, pp. 8–15 to 8–23.

Intel MCS–4 Micro Computer Set (Nov. 1971).

Intel 8008 8–Bit Parallel Central Processor Unit published by Intel (Nov. 1972).

iAPX 386 High Performance 32–Bit Microprocessor Product Review, published by Intel (Apr. 1984).

Intel 80386 Programmer's Reference Manual, published by Intel (1986).

Motorola MC68020 32–Bit Microprocessor User's Manual (1984).

IBM System/360 Model 67 Systems, published by IBM (1972).

Thornton, J. E., "Design of a Computer, The Control Data 6600," published by Advanced Design Laboratory (1970).

6400/6500/6600 Computer Reference Manual, published by Control Data® (1965, 1966, 1967).

Grishman, R., "Assembly Language Programming for the Control Data 6000 and Cyber Series Algorithmics".

Hennessy et al., "Hardware/software tradeoff for increased performance," *Proceedings of the Symposium on Architectural Support for Programming Languages and Operating Systems*, pp. 2–11. ACM, Apr. 1982.

Hennessy et al., "MIPS: A VLSI Processor Architecture, Technical Report 223," Computer Systems Laboratory, Department of Electrical Engineering and Computer Science, Standford University, Nov. 1981.

Gross et al., "Measurement and evaluation of MIPS architecture and processor," *ACM Trans. Computer Systems*, pp. 229–257 Aug. 1988.
BIT SPARC Integer Unit B5000 Datasheet attached to a presentation by Anant Agrawal in 1989.
Sequin et al., "Design and Implementation of RISC 1," pp. 276–298 from *VLSI Architecture*, B. Randell and P.C. Treleaven, editors, Prentice Hall, 1983.
Ungar et al., "Architecture of SOAR: Smalltalk on a RISC," *Proceedings of the 11th Annual International Symposium on Computer Architecture ISCA '84*. ACM Press, New York, NY, pp. 188–197 (1984).
Cray–1 Computer System Hardware Reference Manual, Publication No. 2240004, Rev C, Nov. 4, 1997.
Acorn Computers, Ltd., Acorn RISC Machine CPU Software Manual, Issue 1.00 Oct. 1985.
Patterson et al., "Architecture of a VLSI Instruction Cache for A RISC," *ACM*, pp. 108–116 (1983).
Patterson, D. A., "Reduced Instruction Set Computers" *Communication of the ACM*, 28(1):8–21, Jan. 1985.
Patterson, D. A., "RISC watch", pp. 11–19 (Mar. 1984).
Sherburne, R. W., "Processor Design Tradeoffs in VLSI," U.C. Berkeley, May, 1984, PhD Dissertation.
Excerpt from A Seymour Cray Perspective http://research.Microsoft.com/users/gbell/craytalk/sdl/001.htm (Slide 1).
Excerpt from A Seymour Cray Perspective http//research.microsoft.com/users/gbell/craytalk/sld0.29.htm (Slide 29).
RISC Roots: CDC 6000 (1965).
http://www.bitsavers.org/pdf/edc/6x00/.
Simpson, R.O., "The IBM RT Personal computer," *Byte* 11(11):43–78 (Oct. 1986).
Nakamura et al., "Microprocessors—Special Purpose," 1987 IEEE International Solid–State Circuits Conference, Feb. 26, 1987.
Transputer Reference Manual, INMOS Limited 1988.
Horwitz et al., "A 20–MIPS Peak, 32–bit Microprocessor with On–Chip Cache," *IEEE Journal of Solid State Circuits*, SC–22(5):790–799 (Oct. 1987).
Submicron Systems Architecture Project, Caltech Computer Science Technical Report, Nov. 1, 1991.
Stevens, C. W., "The Transputer," *IEEE*, pp. 292–300 (1985).
Bosshart et al., "A 533K–Transistor LISP Processor Chip," *IEEE Journal of Solid State Circuits*, SC–22(5): 808–819 (Oct. 1987).
Jguppi et al., "A 20 Mips Sustained 32b CMOS with 64b Data Bus," *IEEE Int'l Solid State Circuits Conf.*, pp. 84–86 (1989).
May, D., "The Influence of VLSI Technology on Computer Architecture," pp. 247–256.
"Motorola MC68HC11A8 HCMOS Single–Chip Microcomputer," table of contents and introduction (1985).
"Motorola MC146805H2, advance information," pp. 1–12.
"MC68322 32–Bit Microcontroller System Integration User's Manual Preliminary Edition, Revision 0.8," (1989).
The Ring Oscillator VCO Schematic.
"INMOS T800 Transputer Data Sheet," (Apr. 1987).
"INMOS T414 Transputer Preliminary Data Sheet," (Feb. 1987).
"INMOS T212 Transputer Preliminary Data Sheet," (Aug. 1987).
"INMOS M212 Disk Processor Product Overview," (Oct. 1987).
Budinich et al., eds. *International Conference on the Impact of Digital Microelectronics & Microprocessors on Particle Physics*, pp. 204–213 (1988).
INMOS Presentation given at Jun. 15, 1988 Workshop on Computer Architecture.
Moore, P., "INMOS Technical Note 15: IMS B005 Design of a Disk Controller board with drives," Dec. 3, 1986.
Meade et al., eds., *Introduction to VLSI Systems,* Addison Wesley Publishers, (1980).
Matthys R. J., *Crystal Oscillator Circuits*, pp. 25–64 (1983).
Elliot et al., eds. *Scientific Applications of Multiprocessors* Prentice Hall (1988).
*Trasnputer Reference Manual*, Cover page, Introduction and pp. 73 and 96, INMOS Limited (1988).
"INMOS IMS T414 Transputer," (Jun. 1987).
"INMOS IMS T414 Engineering Data," pp. 107–163.
"INMOS Engineering Data, IMS T414M Transputer, Extended Temperature," (Aug. 1987).
Toshiba TLCS–42, 47, 470 User's Manual Published in Apr. 1986.
"SM550 High Speed CMOS 4–bit Microcomputer SM–550 Series," (1982) document in Japanese.
"MC88100 RISC Microprocessor User's Manual," Motorola (1989).
Moelands, A. P. M., "Serial I/O with the MAB8400 series microcomputers," *Electronic Components and Applications,* 3(1):38–46 (1980).
Stanley, R. C., "Microprocessors in brief," *IBM J. Res. Develop.*, 29(2):110–118 (Mar. 1985).
"MC68332 User's Manual," Motorola (1995).
"TMS 370 Microcontroller Family User's Guide," Texas Instruments (1996).
"INMOS Preliminary Data IMS T800 transputer," (Apr. 1987).
"INMOS Engineering Data IMS T212 transputer Preliminary," (Aug. 1987).
"INMOS Product Overview IMS M212 disc processor," (Oct. 1987).
"MN18882 LSI User's Manual," (document in Japanese).
"MN1880 (MN18882) Instruction Manual," (document in Japanese).
"MN188166 User's Manual," (document in Japanese).
Paker, Y., *Multi–Processor Systems*, pp. 1–23 (1983).
"HP Sacajawea External Reference Specification Preliminary Version 1.1," (Jan. 14, 1987).
"Data sheet MOS Integrated Circuit uPD75008," NEC (1989).
Product Brochure by Motorola for MC146805H2.
Shyam, M., "Hardware External Reference Specification for Enhanced Champion/Paladin," Revision of Nov. 11, 1986.
Fish deposition transcript, vols. 1 and 2, held Jun. 25, 2007 and Jun. 26, 2007 in case No. 2–05CV–494 (TJW).
Exhibit 4 to Fish deposition of Jun. 25–26, 2007 in case No. 2–05CV–494 (TJW); memo of Sep. 12, 1992 Fish to Higgins re: ShBoom Patents.
Exhibit 5 to Fish deposition of Jun. 25–26, 2007 in case No. 2–05CV–494 (TJW); letter of Sep. 11, 1992 Higgins to Falk re: patent application for High Performance Low Cost Microprocessor.
Exhibit 6 to Fish deposition of Jun. 25–26, 2007 in case No. 2–05CV–494 (TJW); letter of Sep. 30, 1992 Higgins to Falk re: patent application for High Performance Low Cost Microprocessor.

Exhibit 8 to Fish deposition of Jun. 25–26, 2007 in case No. 2–05CV–494 (TJW); Mostek 1981 3870/F8 Microcomputer Data Book (1981).

Exhibit 9 to Fish deposition of Jun. 25–26, 2007 in case No. 2–05CV–494 (TJW); "IC Master 1980," pp. 2016–2040, published by Fairchild (1980).

Exhibit 10 to Fish deposition of Jun. 25–26, 2007 in case No. 2–05CV–494 (TJW); letter of May 12, 1992, Fish to Higgens.

Exhibit 12 to Fish deposition of Jun. 25–27, 2007 in case No. 2–05CV–494 (TJW); Agreement executed Jan. 3, 1989 between PTA Inc. and Chuck Moore, dba Computer Cowboys.

Exhibit 13 to Fish deposition of Jun. 25–26, 2007 in case No. 2–05CV–494 (TJW); Oki japan MSH–Boom 96000 Schematic (Jul. 13, 1989).

Exhibit 14 to Fish deposition of Jun. 25–26, 2007 in case No. 2–05CV–494 (TJW); Assignment of U.S. Appl. No. 07/389,334 from Fish to Fish Family Trust.

Exhibit 15 to Fish deposition of Jun. 25–26, 2007 in case No. 2–05CV–494 (TJW); Stock Purchase and Technology Transfer Agreement between Fish Family Trust, Helmut Falk, and Nanotronics Corporation (Aug. 16, 1991).

Exhibit 16 to Fish deposition of Jun. 25–26, 2007 in case No. 2–05CV–494 (TJW); fax of Jul. 16, 2004 Mmarshall to Suanders and Heptig w/ attached Jul. 15, 2004 memo from Beatie re: Fish and Moore.

Exhibit 17 to Fish deposition of Jun. 25–26, 2007 in case No. 2–05CV–494 (TJW); Fax of Jul. 29, 2004, Heptig to Marshall with attached executed agreement.

Exhibit 18 to Fish deposition of Jun. 25–26, 2007 in case No. 2–05CV–494 (TJW); Plaintiffs' Second Amended Complaint filed Sep. 22, 2006 in 3:06–CV–00815.

Exhibit 19 to Fish deposition of Jun. 25–26, 2007 in case No. 2–05CV–494 (TJW); Settlement Agreement between Patriot Scientific Corporation, Fish, and the trustee of Fish Family Trust.

Exhibit 21 to Fish deposition of Jun. 25–26, 2007 in case No. 2–05CV–494 (TJW); Comparisons of RISC Chips (Dec. 11, 1988).

Exhibit 22 to Fish deposition of Jun. 25–26, 2007 in case No. 2–05CV–494 (TJW); VL86C010 An Affordable 32–bit RISC Microprocessor System, VLSI Technology, Inc.

Exhibit 23 to Fish deposition of Jun. 25–26, 2007 in case No. 2–05CV–494 (TJW); VY86Cxxx Arm 32–Bit CMOS product literature, EDN (Nov. 21, 1991).

Exhibit 24 to Fish deposition of Jun. 25–26, 2007 in case No. 2–05CV–494 (TJW); letter of Apr. 26, 1989 Ireland to Fish w/ copy of Apr. 17, 1989 article in Electronic News titled "35ns 256K Device, VLSI Debuts SRAM Designed With Hitachi".

Exhibit 28 to Fish deposition of Jun. 25–26, 2007 in case No. 2–05CV–494 (TJW); Introduction to RISC Technology, LSI Logic Corporation (Apr. 1988).

Exhibit 29 to Fish deposition of Jun. 25–26, 2007 in case No. 2–05CV–494 (TJW); "SH–Boom Patent Documentation," (Jun. 21, 1989).

Exhibit 30 to Fish deposition of Jun. 25–26, 2007 in case No. 2–05CV–494 (TJW); "SH–Boom Licensing Strategy," (Jan. 19, 1990).

Exhibit 31 to Fish deposition of Jun. 25–26, 2007 in case No. 2–05CV–494 (TJW); "Transputer Includes Multiprocessing protocol," Jan. 2, 1991.

Exhibit 32 to Fish deposition of Jun. 25–26, 2007 in case No. 2–05CV–494 (TJW); article titled "INMOS details next Transputer," (Apr. 18, 1991).

Exhibit 33 to Fish deposition of Jun. 25–26, 2007 in case No. 2–05CV–494 (TJW); Articles from Electronic World News.

Exhibit 35 to Fish deposition of Jun. 25–26, 2007 in case No. 2–05CV–494 (TJW); INMOS Preliminary Data IMS T414 transputer.

Exhibit 36 to Fish deposition of Jun. 25–26, 2007 in case No. 2–05CV–494 (TJW); Comparison of Intel 80960 and SH–Boom Microprocessors (1989).

Exhibit 37 to Fish deposition of Jun. 25–26, 2007 in case No. 2–05CV–494 (TJW); Memo of Jul. 13, 1989, Fish to Chu w/ attached comparison of MIPS 2000 to SH–Boom.

Exhibit 38 to Fish deposition of Jun. 25–26, 2007 in case No. 2–05CV–494 (TJW); fax of Jun. 10, 1992 Fish to Higgins w/ attached document titled State of the Prior Art SHBoom Microprocessor.

Exhibit 39 to Fish deposition of Jun. 25–26, 2007 in case No. 2–05CV–494 (TJW); Apr. 12, 1989 Time and Responsibility Schedule.

Exhibit 40 to Fish deposition of Jun. 25–26, 2007 in case No. 2–05CV–494 (TJW); handwritten note.

Exhibit 41 to Fish deposition of Jun. 25–26, 2007 in case No. 2–05CV–494 (TJW); memo of Jun. 1989 to PT Acquisitions, Inc. re: fee due for searcher conducted.

Exhibit 42 to Fish deposition of Jun. 25–26, 2007 in case No. 2–05CV–494 (TJW); memo of Jun. 28, 1992 Fish to Higgins re: Dialog Patents re: SHBoom.

Exhibit 43 to Fish deposition of Jun. 25–26, 2007 in case No. 2–05CV–494 (TJW); letter of Aug. 6, 1998 Haerr to Turner transmitting documents.

Exhibit 44 to Fish deposition of Jun. 25–26, 2007 in case No. 2–05CV–494 (TJW); Declaration of Moore re: U.S. Appl. No. 08/484,918.

Exhibit 45 to Fish deposition of Jun. 25–26, 2007 in case No. 2–05CV–494 (TJW); fax of Nov. 3, 1989, Leckrone to Fish with attached draft license agreement PT Acquisitions and Oki Electric Industries.

Exhibit 46 to Fish deposition of Jun. 25–26, 2007 in case No. 2–05CV–494 (TJW); letter of Nov. 29, 1989 Fish to Slater re: Japanese "borrowing" Sh–Boom 50 MHZ RISC Chip.

Exhibit 47 to Fish deposition of Jun. 25–26, 2007 in case No. 2–05CV–494 (TJW); letter of Dec. 29, 1989 Leckrone to Fish re: SHBoom project.

Exhibit 48 to Fish deposition of Jun. 25–26, 2007 in case No. 2–05CV–494 (TJW); letter of Jul. 16, 1990 Fish to Leckron re: attorney client relationship and conflict of interest.

Exhibit 49 to Fish deposition of Jun. 25–26, 2007 in case No. 2–05CV–494 (TJW); letter of Jul. 24, 1990 Leckrone to Fish re: letter of Jul. 16, 1990 (EX 48).

Exhibit 50 to Fish deposition of Jun. 25–26, 2007 in case No. 2–05CV–494 (TJW); letter of Aug. 27, 1990 Moore to Fish re: SHBoom confidentiality.

Exhibit 51 to Fish deposition of Jun. 25–26, 2007 in case No. 2–05CV–494 (TJW); PT Acquisition / Alliance Semiconductor Corp. Manufacturing Agreement (Jul. 20, 1990).

Exhibit 52 to Fish deposition of Jun. 25–26, 2007 in case No. 2–05CV–4949 (TJW); letter of Feb. 6, 1990 to PT Acquisitions from Dun & Bradstreet Receivable Recovery Systems re: final notice for payment of account.

National Semiconductor HPC16400/HPC36400/HPC46400 High–Performance microControllers with HDLC Controller product literature.

NEC Data Sheet MOS Integrated Circuit uPD7225 Programmable LCD Controller/Driver. Part Nos.: uPD7225G00, uPD7225G01, uPD7225GB–3B7.
NEC Electronics Inc. High–End, 8–Bit, Single–Chip CMOS Microcomputers product literature.
NEC Electronics Inc. uPD78C10/C11/C14 8–Bit, Single–Chip CMOS Microcomputers with A/D Converter product literature.
NEC Electronics Inc. Microcomputer Products Single–Chip Products Data Book vol. 1 of 2 cover page.
NEC Electronics Inc. Microcomputer Products Microprocessors, Peripherals, & DSP Products Data Book vol. 2 of 2 cover page.
NEC Electronics Inc. MOS Integrated Circuit uPD70208H, 70216H Data Sheet, V40HL, V50HL, 16/8, 16–Bit Microprocessor.
NEC Electronics Inc. MOS Integrated Circuit uPD7225 Programmable LCD Controller/Driver.
Signetics Microprocessor Data manual cover page.
Signetics Microprocessor Products Data manual, 8×330 Floppy Disk Fromatter/Controller product specification.
Signetics Microprocessor Products Data manual, SC96AH Series Single–Chip 16–Bit Microcontrollers preliminary specification.
Realtime DSP; The TMS320C30 Course, Revision 3 (educational document re programming Digital Signal Processor microprocessor).
Texas Instruments TMS320C30 Digital Signal Processor product literature.
Texas Instruments TMS34010 Graphics System Processor product literature.
Texas Instruments TMS320 DSP Designer's Notebook, Using a TMS320C30 Serial Port as an Asynchronous RS–232 Port Application Brief: SPRA240.
Fukui et al., "High Speed CMOS 4–bit Microcomputer SM550 Series," published 1982, 1983.
UK application 8233733 as filed Nov. 26, 1982.
Office Action of Jan. 31, 2000 in U.S. Appl. No. 09/124,623.
TPL Infringement Contention for the TLCS–900/L Series.
TPL Infringement Contention for Toshiba Microcontroller.
TPL Infringement Contention for Toshiba TC35273.
Duell, C. H., "Everything that can be invented has been invented," 2 pages downloaded from http://www.tplgroup.net/patents/index.php.
Amendment filed Apr. 15, 1996 in U.S. Appl. No. 08/484,916.
Amendment filed Jan. 8, 1997 in U.S. Appl. No. 08/484,916.
Amendment filed Jul. 3, 1997 in U.S. Appl. No. 08/484,916.
Alliacense Product Report, NEC Microcontroller, UPD789473, B Bit Microcontroller, pp. 1–38.
IEEE Std 796–1983, Microcomputer System Bus, pp. 9–46.
Mostek Corp., Advertisement, EDN, Nov. 20, 1976.
Guttag, K.M., "The TMS34010: An Embedded Microprocessor," *IEEE Micro*, 8(3):39–52 (May 1988).
"8–Bit Single–Chip Microprocessor Data Book," Hitachi America Ltd., Table of Contents and pp. 251–279 (Jul. 1985).
Request for Reexamination of US Patent 6,598,148 as filed Sep. 21, 2006.
Request for Reexamination of US Patent 5,809,336 as filed Sep. 21, 2006.
Office action of Jan. 19, 2007 in U.S. Appl. No. 90/008,237.
Request for Reexamination of US Patent 5,809,336 as filed Jan. 30, 2007 (Public Patent Foundation).

Office action of Apr. 5, 2007 in U.S. Appl. No. 90/008,474.
Request for Reexamination of US Patent 5,809,336 as filed Oct. 19, 2006 (Toshiba).
Office action of Jan. 16, 2007 in U.S. Appl. No. 90/008,306.
Office action of Nov. 22, 2006 in U.S. Appl. No. 90/008,227.
Mostek Corp., "Mostek 1981 3870/F8 Microcomputer Data Book", Feb. 1981, pp. III–76 through III–77, III–100 through III–129, and V1–1 through V1–11.
United Technical Publications, IC Master, 1980, pp. 1 and 2016–2040.
Alliacense Product Report—Preliminary Review, USP 5,440,749; GPS Car Navigation Main Processor.
Alliacense Product Report—Preliminary Review, USP 5,440,749; GPS Navigation System GPS Chipset.
Alliacense Product Report—Preliminary Review, USP 5,440,749; GPS Navigation System Main Microprocessor.
Alliacense Product Report—Preliminary Review, USP 5,440,749; Kyocera Digital Camera Finecam S3R Image Processor.
Alliacense Product Report—Preliminary Review, USP 5,440,749; PDA/Mobile Navigation, GPS Processor.
Motorola MC68020 32–bit Microprocessor User's Manual, 2nd Edition, Rev. 1, Prentice–Hall, 1985.
Barron et al., "The Transputer," *Electronics*, pp. 109–115 (1983).
Burroughs Corporation, "Burroughs B7700 Systems Reference Manual," 1973.
Fiasconaro, J., "Microarchitecture of the HP9000 Series 500 CPU," *Microarchitecture of VLSI Computers, NATO ASI Series No. 96*, Antognetti, eds., pp. 55–81.
MacGregor et al., "The Motorola MC68020," *IEEE Micro*, 4(4):103–118 (1984).
Office action of Dec. 21, 2007 in U.S. Appl. No. 90/008,227.
Interview summary of Feb. 12, 2008 in U.S. Appl. No. 90/008,227.
Complaint for Declaratory Judgment filed Feb. 8, 2008 by *HTC* vs. *TPL, Patriot, and Alliacense*, case #C08 00882 JL.
First Amended Complaint filed Feb. 13, 2007 by *Asustek and Asus* vs. *TPL, Patriot, MCM, and Alliacense*, case #C 08 00884 EMC.
Complaint for Delcaratory Judgment filed Feb. 8, 2008 by *Acer and Gateway* vs. *TPL, Patriot, and Alliacense*, case #C08 00877 HRL.
Complaint for Declaratory Judgment filed Feb. 8, 2008 by *Asustek* vs. *TPL, Patriot, and Alliacense*, case #C08 00884 EMC.
Request for Reexamination of US Patent 5,440,749 as filed Feb. 11, 2008 (ARM).
Daniels Deposition transcript, Aug. 10, 2007, in 2–05CV–494 (TJW).
Exhibit 1 to Daniels deposition of Aug. 10, 2007 in 2–05CV–494 (TJW): Subpoena of Aug. 1, 2007 for Gary Daniels in 2–05CV–494 (TJW).
Exhibit 2 to Daniels deposition of Aug. 10, 2007 in 2–05CV–494 (TJW): Motorola Semiconductor Products Sector, Microprocessor Products Group, Milestones for Management Review.
Exhibit 3 to Daniels deposition of Aug. 10, 2007 in 2–05CV–494 (TJW): "How to Take Control" product brochure by Motorola (1988).
Exhibit 4 to Daniels deposition of Aug. 10, 2007 in 2–05CV–494 (TJW): "Embedded Control Solutions, Powered by Motorola" product brochure by Motorola.

Exhibit 5 to Daniels deposition of Aug. 10, 2007 in 2–05CV–494 (TJW): Oct. 20, 1988 Letter to Daniels from Fisher.
Exhibit 6 to Daniels deposition of Aug. 10, 2007 in 2–05CV–494 (TJW): List of Motorola Microcontroller business major goals for 1989.
Exhibit 7 to Daniels deposition of Aug. 10, 2007 in 2–05CV–494 (TJW): Sales brochure, "Motorola Microcontroller Division, Customer Management Briefing Summary".
Exhibit 8 to Daniels deposition of Aug. 10, 2007 in 2–05CV–494 (TJW): Document titled "Motorola's MC68332 Microcontroller".
Exhibit 9 to Daniels deposition of Aug. 10, 2007 in 2–05CV–494 (TJW): Die photo.
Exhibit 10 to Daniels deposition of Aug. 10, 2007 in 2–05CV–494 (TJW): Article by Daniels, "A Participant's Perspective," *IEEE Micro*, 16(6):21–31 plus cover page and 2 unnumbered at back of document (1996).
Exhibit 11 to Daniels deposition of Aug. 10, 2007 in 2–05CV–494 (TJW): "A legacy of leadership," *Mos Talk*, 22(9): 4 pages (1997).
Exhibit 12 to Daniels deposition of Aug. 10, 2007 in 2–05CV–494 (TJW): Photo of 68332 with other support chips.
McDermott Deposition transcript, Aug. 9, 2007, in 2–05CV–494 (TJW).
Exhibit 1 to McDermott deposition of Aug. 9, 2007 in 2–05CV–494 (TJW): Subpoena of Aug. 1, 2007 for Mark McDermott in 2–05CV–494 (TJW).
Exhibit 2 to McDermott deposition of Aug. 9, 2007 in 2–05CV–494 (TJW): "Motorola's MC68332 Microcontroller" layout design.
Exhibit 3 to McDermott deposition of Aug. 9, 2007 in 2–05CV–494 (TJW): Photos of wafers pre–chip I and II and final wafer and die photo of chip.
Exhibit 4 to McDermott deposition of Aug. 9, 2007 in 2–05CV–494 (TJW): Photo of Motorola's GMP–X 32–bit Microcontroller.
Exhibit 5 to McDermott deposition of Aug. 9, 2007 in 2–05CV–494 (TJW): Photo of individual die from pre–chip I, II and the final chip.
Exhibit 7 to McDermott deposition of Aug. 9, 2007 in 2–05CV–494 (TJW): Patent Application transmittal letter received by USPTO Aug. 26, 1988 for application 237022.
Exhibit 8 to McDermott deposition of Aug. 9, 2007 in 2–05CV–494 (TJW): Schematic used to lay out chip.
Exhibit 10 to McDermott deposition of Aug. 9, 2007 in 2–05CV–494 (TJW): McDermott et al., "Testability Features Of the MC68332 Modular Microcontroller," *1989 International Test Conference*, paper 28.2, pp. 615–623 (1989).
Exhibit 11 to McDermott deposition of Aug. 9, 2007 in 2–05CV–494 (TJW): McDermott et al., "Modular Design of a High Performance 32–bit Microcontroller," *IEEE 1989 Custom Integrated Cirucits Conference*, pp. 23.8.1–23.8.4 (1989).
Exhibit 12 to McDermott deposition of Aug. 9, 2007 in 2–05CV–494 (TJW): Notes from class taken at University of Texas (Sep. 1987).
Jan. 15, 2008 letter by fax from Rangel (PTI) to McFarlane, Hoge, Agarawal & Spears re: non–confidential status of deposiiton transcripts of Daniels and Mcdermott.
Jan. 17, 2008 letter via e–mail from McFarlane to Hoge, Agarwal, & Spears re: "Attorney Eyes Only" status of depositions of Daniels and McDermott.
"8 bit Dual 1–chip Microcomputer MN1890 Series User's Manual," translation of original Japanese language document, by Matsushita Electric Industrial Co., Ltd. Semiconductor Sales Division.
"Public Availability Date Request," from matt Antonelli of Weil Gotshal & Manges LLP re: Transputer Reference Manual, INMOS, Ltd., 1988.
Sibigtroth, J. M., "Motorola's MC68HC11: Definition and Design of a VLSI Microprocessor," *IEEE Micro*, 4(1):54–65 (1984).
"Specification Sheet, MN18882 (Book[1])," translation of the Japanese language original, Code No. MIG0175, Matsushita Electronics Industry Corporation, Microcomputer Products Division, Oct. 2, 1990.
"DS 5000 Soft Microcontroller User's Guide Preliminary V 1.0," Dallas Semiconductor.
MEI Invalidity Contentions on '148 and '336 patents filed Aug. 22, 2007 in case # 2–05CV–494 (TJW).
MEI claim charts on Mostek 3873 chip, filed Sep. 8, 2007 in case # 2–05CV–494 (TJW).
Defendants MEI, PNA, and JVC Preliminary Invalidity Contentions filed Sep. 18, 2006 in case # 2–05CV–494 (TJW).
Defendant NEC Preliminary Invalidity Contentions filed Sep. 18, 2006 in case # 2–05CV–494 (TJW).
Defendant Toshiba Preliminary Invalidity Contentions filed Sep. 18, 2006 in case # 2–05CV–494 (TJW).
Defendant NEC Preliminary Invalidity Contentions filed Sep. 25, 2006 in case # 2–05CV–494 (TJW).
Defendant ARM Preliminary Invalidity Contentions filed Oct. 12, 2006 in case # 2–05CV–494 (TJW).
MN188166 User's Manual, Japanese language document with English translation.
Order of Dismissal of NEC Electronics of Dec. 20, 2007, case # 2:05–CV–00494 (TJW).
Order of Dismissal of Matsushita, Panasonic, JVC Americas, and Toshiba of Dec. 20, 2007, case # 2:05–CV–00494 (TJW).
Order of Partial Judgment of Non–Infringement of Sep. 12, 2007, case # 2:05–CV–00494 (TJW).
TPL Amended Notice of Appeal filed Oct. 22, 2007 in 2:05–CV–0049 (TJW).
TPL Amended Notice of Appeal filed Oct. 18, 2007 in 2:05–CV–00494 (TJW).
TPL Notice of Appeal filed Sep. 27, 2007 in 2:05–CV–00494 (TJW).
TPL Opening Brief, Appeal, filed Dec. 10, 2007 in 2:05–CV–00494 (TJW).
TPL Reply Brief, Appeal, filed Feb. 19, 2008 in 2:05–CV–00494 (TJW).
Arm's Corrected Brief, Appeal, filed Jan. 28, 2008 in 2:05–CV–00494 (TJW).

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 29 is determined to be patentable as amended.

Claims 1–28 were not reexamined.

29. In a microprocessor system including a central processing unit, memory, and an instruction register, a method for providing instructions and *literal* operands from said memory to said central processing unit comprising the steps of:

providing instruction groups to said instruction register from said memory;

*wherein said instruction register is connected to circuits that decode instructions;*

*wherein each of said instruction groups is structured to comprise a set of locations, including a first location, that contain either instructions or operands or both, said operands comprising either literal operands or variable-length address operands, and said instructions including opcode bits or both opcode bits and address selection bits but not including variable-length address operands; and further* wherein certain of said instruction groups include at least one instruction that, when executed, causes an access to an *instruction, or to a literal* operand [or] *and* an instruction [or both], said *accessed literal* operand or *said accessed* instruction being located at a predetermined position from a boundary of said instruction groups, *said accessed instruction positioned at only the first location of an instruction group*;

decoding said at least one instruction to determine *at least* said predetermined position *of said accessed instruction as only the first location of the set of locations of the instruction group containing said accessed instruction*;

locating *at least* said predetermined position; and supplying *said accessed instruction, or said accessed literal operand and said accessed instruction*, from said instruction groups *to said central processing unit*, using [the] *at least said* predetermined [location, said operand or instruction or both to said central processing unit] *position*.

* * * * *

(12) EX PARTE REEXAMINATION CERTIFICATE (8894th)

United States Patent
Moore et al.

(10) Number: US 5,784,584 C2
(45) Certificate Issued: Mar. 6, 2012

(54) HIGH PERFORMANCE MICROPROCESSOR USING INSTRUCTIONS THAT OPERATE WITHIN INSTRUCTION GROUPS

(75) Inventors: Charles H. Moore, Woodside, CA (US); Russell H. Fish, III, Mt. View, CA (US)

(73) Assignee: Charles H. Moore, Incline Village, NV (US)

Reexamination Request:
No. 90/009,591, Oct. 2, 2009
No. 90/011,169, Aug. 20, 2010

Reexamination Certificate for:
Patent No.: 5,784,584
Issued: Jul. 21, 2009
Appl. No.: 08/484,935
Filed: Jun. 7, 1995

Reexamination Certificate B1 5,784,584 issued Jul. 21, 1998

Related U.S. Application Data

(62) Division of application No. 07/389,334, filed on Aug. 3, 1989, now Pat. No. 5,440,749.

(51) Int. Cl.
| | |
|---|---|
| *G06F 9/30* | (2006.01) |
| *G06F 12/08* | (2006.01) |
| *G06F 7/78* | (2006.01) |
| *G06F 9/32* | (2006.01) |
| *G06F 7/48* | (2006.01) |
| *G06F 15/76* | (2006.01) |
| *G06F 15/78* | (2006.01) |
| *G06F 9/38* | (2006.01) |
| *G06F 7/52* | (2006.01) |
| *G06F 7/76* | (2006.01) |
| *G06F 7/58* | (2006.01) |

(52) U.S. Cl. ............. 712/200; 711/E12.02; 712/E9.016; 712/E9.028; 712/E9.046; 712/E9.055; 712/E9.057; 712/E9.058; 712/E9.062; 712/E9.078; 712/E9.08; 712/E9.081

(58) Field of Classification Search ................... 395/376
See application file for complete search history.

(56) References Cited

To view the complete listing of prior art documents cited during the proceedings for Reexamination Control Numbers 90/011,169 and 90/009,591 please refer to the USPTO's public Patent Application Information Retrieval (PAIR) system under the Display References tab.

*Primary Examiner* — Sam Rimell

(57) ABSTRACT

A high-performance microprocessor system using instruction that access operands and instructions located relative to the current instruction group rather than located relative to the current instructions, as is the convention, is disclosed herein. The microprocessor system includes a central processing unit, memory, and a bus connecting the central processing unit and memory. An instruction fetching unit, connected to the bus, is provided for fetching instruction groups from the memory for use by the central processing unit and for storage within an instruction register. An instruction supplying unit operates to supply, in succession from the instruction register to the central processing unit, one or more instructions from each of the instruction groups. The system further includes an instruction decoder for configuring the instruction supplying unit to select, from the instruction register, operands associated with instructions from particular instruction groups.

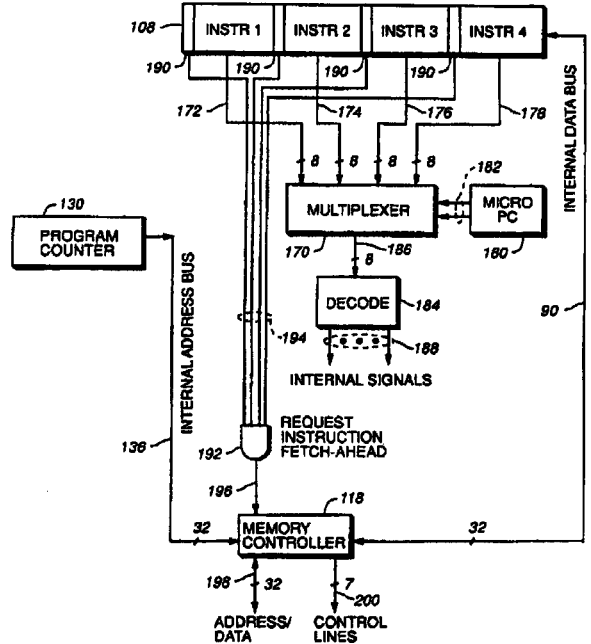

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claim 29 is confirmed.

Claims 1-28 were not reexamined.

* * * * *